US007779058B2

(12) United States Patent
Shea

(10) Patent No.: US 7,779,058 B2
(45) Date of Patent: Aug. 17, 2010

(54) METHOD AND APPARATUS FOR MANAGING A DIGITAL INVENTORY OF MULTIMEDIA FILES STORED ACROSS A DYNAMIC DISTRIBUTED NETWORK

(76) Inventor: Ronald Raymond Shea, P.O. Box 5584, Sherman Oaks, CA (US) 91413

( * ) Notice: Subject to any disclaimer, the term of this patent is extended or adjusted under 35 U.S.C. 154(b) by 336 days.

(21) Appl. No.: 12/036,216

(22) Filed: Feb. 22, 2008

(65) Prior Publication Data
US 2008/0228821 A1 Sep. 18, 2008

Related U.S. Application Data

(60) Provisional application No. 60/891,136, filed on Feb. 22, 2007.

(51) Int. Cl.
G06F 7/00 (2006.01)
G06F 17/30 (2006.01)
(52) U.S. Cl. .................. 707/913; 707/914
(58) Field of Classification Search .............. 707/999.1, 707/999.107, 999.01, 999.103
See application file for complete search history.

(56) References Cited

U.S. PATENT DOCUMENTS

| 5,515,511 | A | * | 5/1996 | Nguyen et al. .............. 725/117 |
| 5,778,368 | A | | 7/1998 | Hogan |
| 5,784,562 | A | | 7/1998 | Diener |
| 5,845,070 | A | | 12/1998 | Ikudome |
| 5,920,854 | A | | 7/1999 | Kirsch |
| 6,366,907 | B1 | | 5/2002 | Fanning et al. |
| 7,165,071 | B2 | | 5/2002 | Fanning et al. |
| 7,307,293 | B2 | | 12/2003 | Fjelstad et al. |
| 7,308,524 | B2 | | 7/2004 | Grundy et al. |
| 7,280,372 | B2 | | 11/2004 | Grundy et al. |
| 6,845,215 | B1 | | 1/2005 | Greenwold |
| 7,014,472 | B2 | | 5/2005 | Fjelstad et al. |
| 7,061,096 | B2 | | 5/2005 | Fjelstad et al. |
| 7,192,320 | B2 | | 10/2005 | Yasumura et al. |
| 7,278,855 | B2 | | 10/2005 | Yasumura et al. |
| 7,227,759 | B2 | | 2/2006 | Grundy et al. |

(Continued)

OTHER PUBLICATIONS

U.S. Appl. No. 10/659,210, filed Sep. 10, 2005, Grundy et al., Entire Document.

(Continued)

Primary Examiner—Charles Rones
Assistant Examiner—Fariborz Khoshnoodi
(74) Attorney, Agent, or Firm—Ronald R. Shea, Esq.

(57) ABSTRACT

A video network includes public kiosks having digital storage capacity. Centralized inventory control manages the video files stored at individual kiosks or network LANs. A user requests a multimedia file for download, and selects various ancillary files and control features, such as languages, subtitles, control of nudity, etc. The requested file is encrypted according to an encryption key, watermarked, and downloaded from a high-speed port of a public kiosk to a hand-held proprietary high speed memory device of a user. Payment is received at the time of request or at the time of download, and royalties are distributed by the video network to copyright holders. Computer applications or playback devices allow users to store and/or play video files that have been downloaded to a hand-held device while managing and enforcing digital rights of content providers through the watermarking and/or encryption.

18 Claims, 42 Drawing Sheets

U.S. PATENT DOCUMENTS

| | | |
|---|---|---|
| 7,111,108 B2 | 9/2006 | Grundy et al. |
| 7,310,629 B1 | 12/2007 | Mendelson et al. |
| 2002/0087999 A1 | 7/2002 | Kashima et al. |
| 2004/0094328 A1 | 5/2004 | Fjelstad et al. |
| 2004/0107356 A1 | 6/2004 | Shamoon |
| 2006/0200259 A1 | 9/2006 | Hoffberg |

OTHER PUBLICATIONS

U.S. Appl. No. 11/123,863, filed May 6, 2005, Yasumura et al., Entire Document.

Lee W. Young, authorized officer for PCT International search Report and Reasoned Opinionm, pp. 1-9, Mailed Aug. 20, 2008.

"On the Application of Multimedia Processing to Telecommunications," Cox et al., AT&T Labs-Research, Florham ParklNewman Springs, New Jersey, USA.

IEEE Abstract on "On the Applications of Multimedia Processing to Communications" by Cox, http://ieeexplore.org/xpl/absprintf.jsp?arnumber=664272&page=FREE.

* cited by examiner

| Title | Actor | Actress | Release Year |
|---|---|---|---|
| Goldfinger | Connery, Sean | Blackman, Honor | 1964 |
| Live and Let Die | Moore, Roger. | . | 1973 |
| . | . | . | . |
| . | . | . | . |
| . | . | . | . |
| . | . | . | . |
| . | . | . | . |
| . | . | . | . |
| . | . | . | . |
| . | . | . | . |
| Casino Royale | | | |

801　　　803　　　805　　　807

Display according to likelihood of match

| Video File Identifier | Cache Priority | Download by | Retain until | Expunge on Download | Expunge by |
|---|---|---|---|---|---|
| The Four Horsemen of the Apocalypse | N/A | 5:45 PM | 8:00 AM | YES | 12:00:00 AM |
| Goldfinger | E | -- | -- | -- | -- |
| The Terminator | B | -- | -- | -- | -- |
| The Matrix | A | | | | |
| Modern Times | Protect | | | | |
| -- | -- | -- | -- | -- | -- |
| -- | -- | -- | -- | -- | -- |
| -- | -- | -- | -- | -- | -- |
| -- | -- | -- | -- | -- | -- |
| -- | -- | -- | -- | -- | -- |

1101  1103  1105  1107  1109  1111

Local Video Kiosk Cache Management Index

Fig. 11

| Device Type | Publicly Disclosed Identifier | Unique Digital Device ID (not publicly retrievable) |
|---|---|---|
| Memory Device | M-07-27-08-6245 | A214467B3KK4 |
| Memory Device | M-07-27-08-0974 | 62WJ9112X14C1B |
| Memory Device | M-07-27-19-99417 | j96BT774C910T |
| -- | -- | -- |
| -- | -- | -- |
| -- | -- | -- |
| Kiosk - Rev 01 | K-01-01-08-612 | SR651127732D8M |
| Kiosk - Rev 02 | K-01-03-08-85 | 5R494L63UT814 |
| Kiosk - Rev 01 | K-09-02-08-127 | CU136FW98624 |
| -- | -- | -- |
| -- | -- | -- |
| -- | -- | -- |
| Player - Rev 01 | P-07-03-08-9645 | ZP774RH2E8NH |
| Player - Rev 01 | P-07-03-08-74013 | 4002C5NF09DR2 |
| Player - Rev 01 | P-07=03=08=31012 | 64R00CMV32B95 |
| -- | -- | -- |
| -- | -- | -- |
| -- | -- | -- |

Fig. 14

| Date | Watermark | Video Kiosk | Hand-Held Memory Device | Video File ID | User ID |
|---|---|---|---|---|---|
| 1-Apr-08 | BB497LM62TA | FL-63978-US | HH11G43JW648 | Tarzan=0038 | US01030709 |
| -- | -- | -- | -- | -- | -- |
| -- | -- | -- | -- | -- | -- |
| -- | -- | -- | -- | -- | -- |
| 7-Apr-08 | QT238JQ99417 | TX-113269-US | L49588ET113 | Goldfinger-001 | US00935702 |
| 1701 | 1703 | 1705 | 1707 | 1709 | 1711 |

Central Transaction Record File

Fig. 17

| Watermark | Video File ID | Authentic? | Download Date | Information Discovery Date |
|---|---|---|---|---|
| WM-BA033CJM94I | Spiderman I | Yes | 15-Jun-08 | 1-Aug-08 |
| RY-74412SD400P2 | Spiderman I | Yes | 21-Jun-07 | 1-Sep-07 |
| -- | -- | -- | -- | |
| -- | -- | -- | -- | |
| KM-NV342XEY77 | Gone with the Wind | No | N/A | 1-Mar-08 |

1900 — (table); 1901, 1903, 1905, 1907, 10-0

Central Pirated Watermark Index

Fig. 19

| Video Player Device ID | Last Update of List of Pirated Watermarks | Sequential Number of Last Pirated Watermark | Last authentication certificate received |
|---|---|---|---|
| VP-02-18-08-69124 | 13-Jan-08 | 613 | KK1976-B-2X44W |
| VP-02-20-08-09703 | 24-Dec-08 | 1280 | 5327R-6-94STQ7 |
| -- | -- | -- | -- |
| -- | -- | -- | -- |
| P-12-31-09-77889 | 19-Jun-08 | 904 | IA6ZR2-7-911R14 |
| -- | -- | -- | -- |
| -- | -- | -- | -- |

2100  2101  2103  2105  2107

Central Pirated Watermark Update Index

Fig. 21

Central Inventory

| Video ID | Video Kiosk | Cache Priority | Advertising Parameters | Available Languages | Profanity |
|---|---|---|---|---|---|
| Spiderman I | 913 | Protect | JPEG,MPEG trailer, | English French | Yes,Parameter control |
| -- | 3417 | A | JPEG,MPEG trailer, | -- | Yes,Parameter control |
| -- | -- | -- | -- | -- | -- |
| -- | -- | -- | -- | -- | -- |
| The Queen | 106288 | A | JPEG,MPEG trailer, | Englsh French Spanish | Yes, Not parameter controled |
| -- | -- | -- | -- | -- | -- |
| -- | -- | -- | -- | -- | -- |
| Ben Hur | 4632 | D | JPEG | English | |
| | 4911 | Protect | JPEG | | |
| -- | -- | -- | -- | -- | -- |
| -- | -- | -- | -- | No | -- |
| Gone with the Wind | 42062 | Protect | None | English | Yes, Not parameter controled |
| -- | -- | D | -- | -- | -- |
| -- | -- | -- | -- | -- | -- |
| Modern Times | 4305 | C | None | Silent | N/A |
| -- | -- | -- | -- | -- | -- |
| -- | -- | -- | -- | -- | -- |

| User | Rating | Title | Download Dates |
|---|---|---|---|
| Dad | M | Dirty Harry | 1-Jul-08 |
| -- | -- | -- | -- |
| -- | -- | -- | -- |
|  | M | Guns of Navarone | 15-Apr-10 |
| Mom | M | Terms of Endearment | 17-Jul-08 |
| -- | -- | -- | -- |
| -- | -- | -- | -- |
|  | M | Steel Magnolias | 17-Apr-10 |
| Emily | M | Legally Blond | 9-Sep-08 |
| -- | -- | -- | -- |
| -- | -- | -- | -- |
|  | M | Legally Blonde V | 10-Dec-10 |
| Jeff | M | Dogs of War | 22-Aug-08 |
| -- | -- | -- | -- |
| -- | -- | -- | -- |
|  | M | Triple XXX | 17-Apr-10 |

METHOD AND APPARATUS FOR MANAGING A DIGITAL INVENTORY OF MULTIMEDIA FILES STORED ACROSS A DYNAMIC DISTRIBUTED NETWORK

CROSS-REFERENCE TO RELATED APPLICATIONS

This application claims priority from, and incorporates by reference, U.S. Provisional Patent Application No. 60/891,136, filed on Feb. 22, 2007 by Colin Mick et al., and entitled "Video Network Including Method and Apparatus for High Speed File Download."

This application is related to, and incorporates by reference in their entirety, U.S. patent application Ser. No. 12/036,206 filed on Feb. 22, 2008 by Colin Mick et al., and entitled "Video Network Including Method and Apparatus for High Speed Distribution Of Digital Files Over A Network"; U.S. patent application Ser. No. 12/036,209 filed on Feb. 22, 2008 by Colin Mick et al., and entitled "Digital Multimedia Network Including Method and Apparatus for High Speed User Download of Digital Files"; U.S. patent application Ser. No. 12/036,211 filed on Feb. 22, 2008 by Colin Mick et al., and entitled "Method and Apparatus for Distributing A Multimedia File to A Public Kiosk Across a Network"; and U.S. patent application Ser. No. 12/036,214 filed on Feb. 22, 2008 by Colin Mick et al., and entitled "Method and Apparatus for Protecting Digital Rights of Copyright Holders of Publicly Distributed Multimedia Files".

This application herein hereby incorporates by reference in their entirety U.S. patent application Ser. No. 10/426,930 Filed on Apr. 29, 2003 by Fjelstad et al., and entitled DIRECT-CONNECT INTEGRATED CIRCUIT SIGNALING SYSTEM FOR BYPASSING INTRA-SUBSTRATE PRINTED CIRCUIT SIGNAL PATHS; U.S. patent application Ser. No. 10/659,210, filed on Sep. 9, 2003 by Fjelstad et al., and entitled, CABLE SIGNALING SYSTEM AND COMPONENTS THEREOF; U.S. patent application Ser. No. 10/757,000, filed on Jan. 13, 2004 by Grundy et al., and entitled, MEMORY CHAIN; U.S. patent application Ser. No. 10/756,924, filed on Jan. 13, 2004 by Fjelstad, et al., and entitled, SYSTEM FOR MAKING HIGH-SPEED CONNECTIONS TO BOARD-MOUNTED MODULES; U.S. patent application Ser. No. 11/055,578 filed on Feb. 9, 2005 by Grundy et al., and entitled, INTERCONNECT SYSTEM WITHOUT THROUGH-HOLES; U.S. patent application Ser. No. 10/947,686, filed on Sep. 23, 2004 by Fjelstad et al., and entitled, MULTI-SURFACE IC PACKAGING STRUCTURES AND METHODS FOR THEIR MANUFACTURE; U.S. patent application Ser. No. 10/990,280 filed on Nov. 15, 2004 by Grundy et al., and entitled, STAIR STEP PRINTED CIRCUIT BOARD STRUCTURES FOR HIGH SPEED SIGNAL TRANSMISSIONS; U.S. patent application Ser. No. 11/093,266 filed on Mar. 28, 2005 by Yasumura et al., and entitled, ELECTRICAL INTERCONNECTION DEVICES FOR ESTABLISHING REDUNDANT CONTACT POINTS FOR REDUCING CAPACITIVE STUBS AND IMPROVED SIGNAL INTEGRITY; U.S. patent application Ser. No. 11/055,579 filed on Feb. 9, 2005 by Yasumura et al., and entitled, HIGH SPEED, DIRECT PATH, STAIR-STEP, ELECTRONIC CONNECTORS WITH IMPROVED SIGNAL INTEGRITY CHARACTERISTICS AND METHODS FOR THEIR MANUFACTURE; U.S. patent application Ser. No. 11/097,450 filed on Apr. 1, 2005 by Grundy et al., and entitled, SIGNAL-SEGREGATING CONNECTOR SYSTEM; U.S. patent application Ser. No. 11/123,863 filed on May 6, 2005 by Yasumura, and entitled, TORSIONALLY-INDUCED CONTACT-FORCE CONDUCTORS FOR ELECTRICAL CONNECTOR SYSTEM; U.S. Pat. No. 7,111,108 filed on Apr. 12, 2004 by Grundy et al., and entitled, SIGNAL-SEGREGATING CONNECTOR MEMORY SYSTEM HAVING A MULTIPLEXED HIGH-SPEED CHANNEL; U.S. Pat. No. 6,366,907 B1 to Fanning et al., entitled "Real Time Search Engine," which issued on Apr. 2, 2002; U.S. Pat. No. 7,165,071 to Fanning et al., entitled "Real Time Search Engine," which issued on Jan. 16, 2007; U.S. Pat. No. 7,310,629 to Mendelson et al., entitled "Method and Apparatus for Controlling File Sharing of Multimedia Files over a Fluid De-Centralized Network," which issued on Dec. 18, 2007; and U.S. Patent Publication No. 2002.0087999 to Kashima and entitled "Scalable Filtering Table" filed on Aug. 22, 2001.

BACKGROUND OF THE INVENTION

Today, there are several methods for customers to obtain specific videos and movies for viewing at consumers' homes. Video rental and retail stores such as Blockbuster warehouse movies and video files pre-stored on digital storage media such as DVDs. Alternatively, a consumer may pay for cable or satellite subscription services where "videos on demand" (VOD) are available. For satellite customers, true VOD is difficult an uneconomical to support, and has resulted in growing deployment of digital video recorders (DVRs). Consumers subscribing to satellite video delivery services can only obtain the video content which the satellite company selects to make available in their satellite network, severely limiting consumer options. Typically, those options are limited to "first run" movies or current releases. Video games can also be purchased at stores for performance on personal computers, or specialized "game boxes."

Consumer options can be enhanced in cable distribution since old-run movies may be archived at the cable-head end. Unfortunately, building VOD delivery infrastructures is expensive due to the upgrades required in both the cable-head end and the user-end decoder boxes. Moreover, this form of distribution typically limits the multimedia files available to consumers to a hand full of digitized feature length films. The availability of archived news clips is limited to links appearing on the web, and is usually in a low definition "PIP" (picture inside a picture) format. Typically, video games and other multimedia files are even less available on demand.

Because the digital distribution of cinematic films is a major consumer market readily appreciated by the average consumer, many specific examples herein are described in terms of cinematic feature length films (also known as movies). However, the embodiments described herein are fully envisioned to include the widest range of multimedia files, including, but not limited to cinematic feature length films, movie trailers and previews, news broadcasts, sports events, political speeches, and games, and further including, but not limited to distinct digital files systems within a multimedia file, such as audio files, video files, effect files (such as vibrating, tilting or rotating a platform or object), and ancillary files (such as time stamps, sub-titles, "director's cut" version of a movie, such as scenes that were removed prior to theater distribution, configurable files for editing nudity or profanity from a feature length film, advanced "levels" of a game, or other game options which may be available, including more expensive versions of a game) etc. Accordingly, specific examples that are directed to a digital file easily appreciated by a consumer, such as the video file of a feature length film, are offered for purposes of brevity, and to enhance reader comprehension by referring to consumer products most widely recognized by the greatest segment of the public. These specific are not intended to limit the scope of the appended claims, and should not be construed to limit the scope of the appended claims.

The distribution of multimedia files incorporates a wide variety of objectives, some of which are often in conflict according to models used today. For thousands of years, it has been recognized that speed and accuracy are often in conflict in the transmission of information. Any consumer who has had to "uninstall" a software application and confirm the uninstallation to the software producer through the internet can appreciate that consumer flexibility is often in conflict with protecting the interests of copyright holders and even patent holders for some digital applications. The digitizing of audio and video files for storage on digital media have enabled audio and video reproduction that is essentially impervious to corruption, and substantially error free, thereby allowing duplication with no loss of content quality. However, this as enabled, and frequently results in, large scale copyright violations of digitally copied material, from software to feature length films. With satellite and cable systems, a certain level of protection is built-in, as the video content is not provided in a form that hackers can easily copy and pirate for unlawful distribution or personal use. On the other hand, video rental chains, such as Blockbuster, Netflix, etc., are typically unconcerned about content security. Rather, it is the producers of feature length film that are typically faced with the enormous problems of copy protection. To ameliorate these copyright violations, a set of encoding schemes have been adopted within feature length DVD films. An additional level of DVD protection is produced by segmenting DVD players into "zones." DVDs mastered for a particular zone cannot be played on a player set for different zones. Despite these protections, hackers have typically circumvented these protections and have continued the unlawful pirating, sale and distribution of copyrighted videos.

SUMMARY OF THE INVENTION

FIG. 1 depicts an overview of an embodiment of a video distribution network 101 including a plurality of video kiosks 105-A, 105-B, 105-C . . . and 105-D in communication with a central server 118 via the internet. As used herein, the term "kiosk" includes, but is not limited to island-type structures that might be found in the concourse of a shopping mall. The term "kiosk" further comprehends apparatus as described herein against a wall of a structure, or even disposed partially within a wall, as is common with automatic teller machines or other dedicated transmission channels and apparatuses. As traffic demands of the network described herein increase, it is anticipated that the network demands described herein compete for limited bandwidth with other internet traffic, phone usage, cable TV, etc. Embodiments are envisioned wherein a dedicated fiber optic wide area network (WAN) is developed to reduce the dependency of the network on the existing internet infrastructure. Accordingly, the term "internet" as used herein encompasses public, private, general access, limited access and dedicated communication infrastructures in any combination.

Each video kiosk is configured to download a video file to a portable high-speed digital storage device 131. The portable high-speed digital storage device has, at a minimum, sufficient storage capacity for a high definition, feature length Hollywood movie. The central server includes a central processor 122, a central data storage member 119 with a central data base index 120, and a central search engine 121. The video kiosks and central server can be separated by thousands of kilometers, and distributed across a country, or even across the globe. The dotted lines 125 represent communication paths, which can include, but are not limited to, fiber optical lines, wireless signal transmission paths, and electrically conductive signal transmission paths. The architecture of FIG. 1 depicts a "web" interconnection, such as the Internet or the world wide web, wherein individual kiosks and the central server are interconnected in a web architecture. Although the descriptions herein often refer to internet connections and communication, references to the internet are intended only as an example. Embodiments are envisioned, which include local area networks (LANs) of various architectures, including web architecture, star-networks, and trunk-line/drop-line networks. Embodiments are envisioned that include combinations of web and LAN architectural schemes. FIG. 2 illustrates a LAN (local area network) 203 forming part of the greater video network 101. Returning to FIG. 1, those skilled in the art of network architecture will appreciate that, although the nodes such as kiosks 105 and the central server 118 are depicted in FIG. 1 as "point-to-point" connections, intermediate stations or nodes, such as relays, routers, repeaters, filters and amplifiers, may be interposed between any two members shown in FIG. 1.

Ancillary files and selectable parameters can be stored in conjunction with video files. Ancillary files include, but are not limited to, subtitles, one or more audio files, and time stamps for connecting specific segments of an ancillary file to the video file. Parameters include, but are not limited to, parameters controlling alternative video scenes related to nudity, profanity, sexual situations, violence, etc. Because parameters are, in many cases, selectable by the user, the term "selectable parameters" is frequently used throughout this disclosure. It is understood, therefore, that some content providers may upload files in which certain parameters are fixed, and do not provide the user an opportunity to select the parameter setting, such as editing of violent scenes. The term "selectable parameters" is therefore descriptive, and may, in some instances, include fixed parameters as well.

In view of the fact that ancillary files and selectable parameters may be linked to a video file, it will therefore be appreciated that, throughout this disclosure, reference to a video file, or to the digital transmission, storage, encryption, watermarking, segmenting, queuing, etc. of a "video file," should not be construed as to limit these operations exclusively to the video portion of a digital file. Transmission, storage, encryption, watermarking, and so forth may be applied to any of the files linked to, or associated with a video file.

Video Kiosk 105-A includes a video display 107, a user input 109, shown, by way of example, as a keyboard and mouse, a financial transaction interface 111, shown by way of example as credit-card/debit-card reader, a local data storage member 123 for storing data locally within a kiosk, and a high-speed port 113 for coupling with the portable high-speed memory device 131 shown in FIG. 1 as being held in the hand of user 103.

Throughout this disclosure, specific details are offered by way of example, and not for purposes of limitation. For example, a user input to a computer or digital computing device may include, but is not limited to, a keyboard, a mouse, a touch pad, a joy stick, a track ball, "j-mouse," a wand, a keypad, a microphone operating in conjunction with voice detecting software, a "touch-screen" video output, and a virtual keyboard such as laser projection or holographic imaging. Combinations of these devices, such as "clicking with a mouse," and "tapping," or "double-tapping" on a touch screen, may be used to initiate or confirm a user input. To name each of these devices or operations in conjunction with each embodiment disclosed herein that utilizes a user input would make the disclosure cumbersome to read, and unnecessarily long. Within this disclosure, therefore, many references to user input described only one, or a few, of the above input devices, such as a keyboard and mouse. These specific examples are offered to enable the reader to more easily understand the descriptions contained herein, and to make and use the various embodiments described herein. These specific examples, therefore, are not intended to limit the appended claims, which comprehend alternative embodiments within the spirit and scope of the invention described herein.

In a similar manner, the financial transaction interface 111 may be in the form of a card reader for reading credit and debit cards, finger print or retinal scan identifier, voice identification, and so forth. Those skilled in the art will further appreciate that credit approval often encompasses user input to several different input members, such as a credit card reader for receiving a credit or debit card, and a keypad for entering a personal identification number (PIN). Again, these specific examples are offered for clarity, and should not be construed as limiting.

Similarly, throughout this disclosure, an embodiment of a digital download device is described as a portable high-speed memory device. Embodiments are envisioned, however, where a digital download device may be a fixed member of a large, or even an immobile apparatus. Such an immobile apparatus may integrate multiple network or user apparatuses described herein. Accordingly, repeated reference to a portable high-speed memory device is offered by way of example, and is not intended to limit the appended claims, which comprehend in alternative embodiments, including large and immobile memory devices.

The portable high-speed digital memory device 131 and high-speed memory port 113 envisions using high-speed electrically conductive connections as described in greater detail conjunction with the United States Patent Applications incorporated by reference herein. The appended claims, however, are not limited to the electrical connections described herein, and comprehend alternative high-speed signal paths and connectors.

An advantage of using high-speed signal conductors in conjunction with the video network described herein deals with the marketability of the video distribution system described herein. Commercial download speeds currently available are nominally 3 to 6 megabits per second. At this speed, download of a high definition feature length film could take close to a day. Although compression techniques and other advances may reduce this time significantly, even if a download were reduced to half an hour, most consumers will not be willing to wait this length of time to retrieve a feature length film. As a consequence, technologies currently on the market place cannot address these commercial deficiencies.

BRIEF DESCRIPTION OF THE SEVERAL VIEWS OF THE DRAWINGS

FIG. 8 depicts a video screen display representing an embodiment of a search result generated by the video network of FIG. 1;

FIG. 11 depicts an embodiment of a local inventory management index for managing the inventory of video files stored within the local video kiosk of FIG. 1;

FIG. 14 depicts a data table for correlating publicly disclosed identifiers of the various devices of FIGS. 1 and 3 with a unique digital device ID that is stored or embedded within various devices and not discoverable by the user;

FIG. 17 depicts an embodiment of a Central Transaction Record for recording video file downloads by users, including a correlation of specific video files and their unique watermark;

FIG. 19 depicts a data table within a network storage location that stores the watermarks of pirated videos;

FIG. 21 is a data table within a network data storage member for storing information relating to the update of user-end apparatuses with information relating to pirated watermarks;

FIG. 23 depicts a data table within the central server indexing all of the video files available within the network of FIG. 1;

FIG. 27 depicts a data table recording the video file download history of a portable high-speed memory device;

FIG. 28 depicts an embodiment of a video screen display generated by the video network of FIG. 1 immediately after a user has logged in;

FIG. 33-B depicts a top-plan view of a layer of FIG. 33-A showing a-stub formed by the coupling of a conducive trace to a conductive via in a layered electrical device;

DETAILED DESCRIPTION

Figure 1:
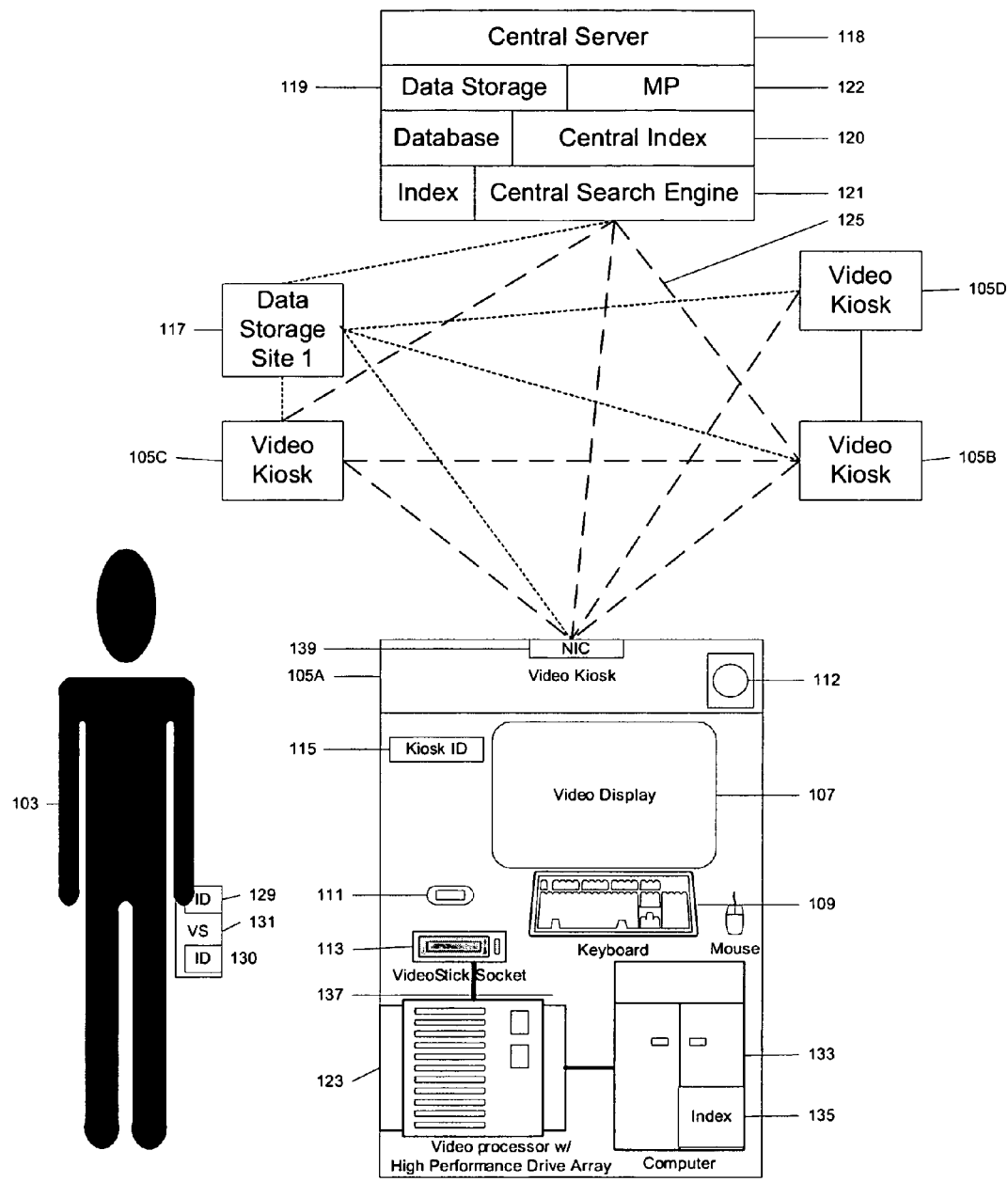
FIG. 1 depicts an overview of a video network, including a user accessing the video kiosk of the video network with a portable high-speed digital recording device.

The network 101 of FIG. 1 depicts video kiosks 105-A, 105-B, 105-C etc. Each kiosk is configured to allow users to download video files. The network further includes a central server 118 to govern and manage information transfer and storage on the network 101. The network may optionally include one or more stand-alone memory devices 117. In an embodiment, the stand-alone memory devices do not have the user interface functionality of a kiosk, or the management and control capabilities of the central server. However, in a distributed network embodiment, stand-alone memory devices may perform certain information management functions described herein as being performed by the central server 118 or a local video kiosk 105. Although many embodiments described herein ascribe certain functions to the central server 118, and certain functions to a video kiosk, these examples are not intended to limit the network functions described herein. The elements of the central server 118 can be disposed within a central location, or distributed in alternative architectural schemes. Accordingly, the specific architecture and distribution of functionality described herein is offered by way of example only.

Figure 2:
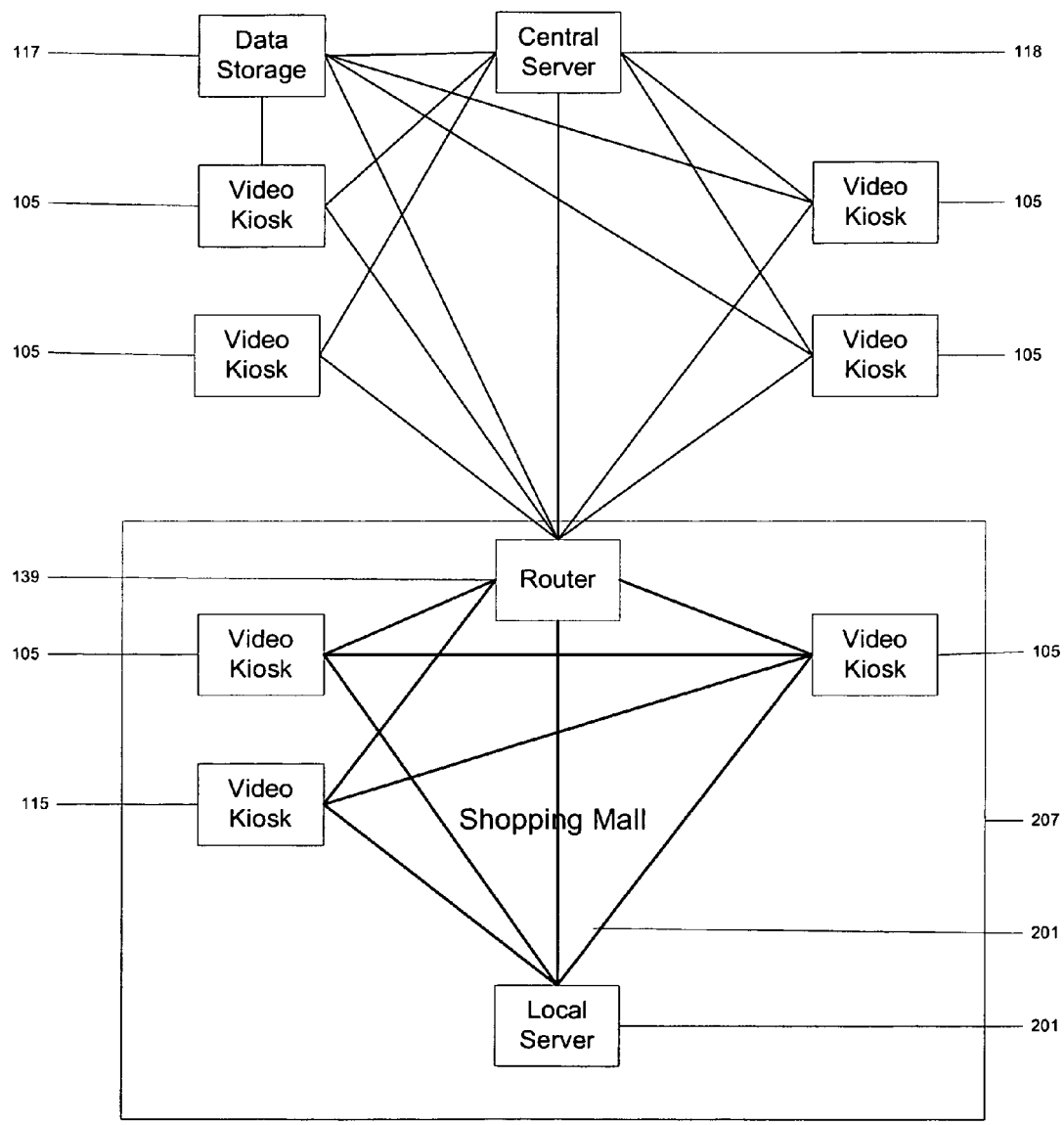
FIG. 2 depicts an architectural embodiment of the network of FIG. 1.

A local video kiosk 105 includes network interface 139 shown in FIG. 2 as a router, local data storage member 123 for storing video files, a user interface 109 such as a keyboard and mouse, a video display 107, speakers 141, a financial transaction interface 111 such as a credit/debit card reader, one or more processing devices 133 such as a CPU, a high-speed port 113 configured to couple with a portable digital high-speed memory device 131 and for downloading video files (including any related ancillary files and a selectable parameters) to the high-speed memory device 131, and a high-speed signal path 137 from the local memory 123 to the high-speed port 113. Each video kiosk 105, includes a unique device ID 115. In an embodiment, the unique device ID 115 is a non-volatile, non-erasable digital value. The device ID 115 may be stored in the hardware at the IC chip level or printed circuit board level at the time of manufacture. Alternatively, the device ID 115 many stored in PLD or fusible link circuitry, an EPROM, a UV prom, or laser readable media such as that used in compact disc technology. As discussed in greater detail below in FIG. 13, the unique device ID 115 of a video kiosk may be utilized in an encryption or watermarking process when a digital video file is downloaded from a local kiosk 105 to a portable high-speed memory device 131 of the user.

In operation, a user 103 couples the portable high-speed digital memory device 131 to high-speed memory port 113, and provides relevant information, both in the way of a search request, and any financial information necessary to complete the transaction. Information may be input through either the financial transaction input 111, the user interface 109, or both. The search process for a particular video file is interactive, and may be refined by successive selections of the user 103, as described in greater detail in conjunction with FIGS. 6-8. The portable high-speed digital memory device 131 may comprise a unique device ID 129. A device ID may also store a the unique device ID 130 of one or more devices, such as video players 305 or video display devices 323 (FIG. 3) thereby "linking" the portable high-speed memory device to one or more video players or video display devices.

Figure 3:
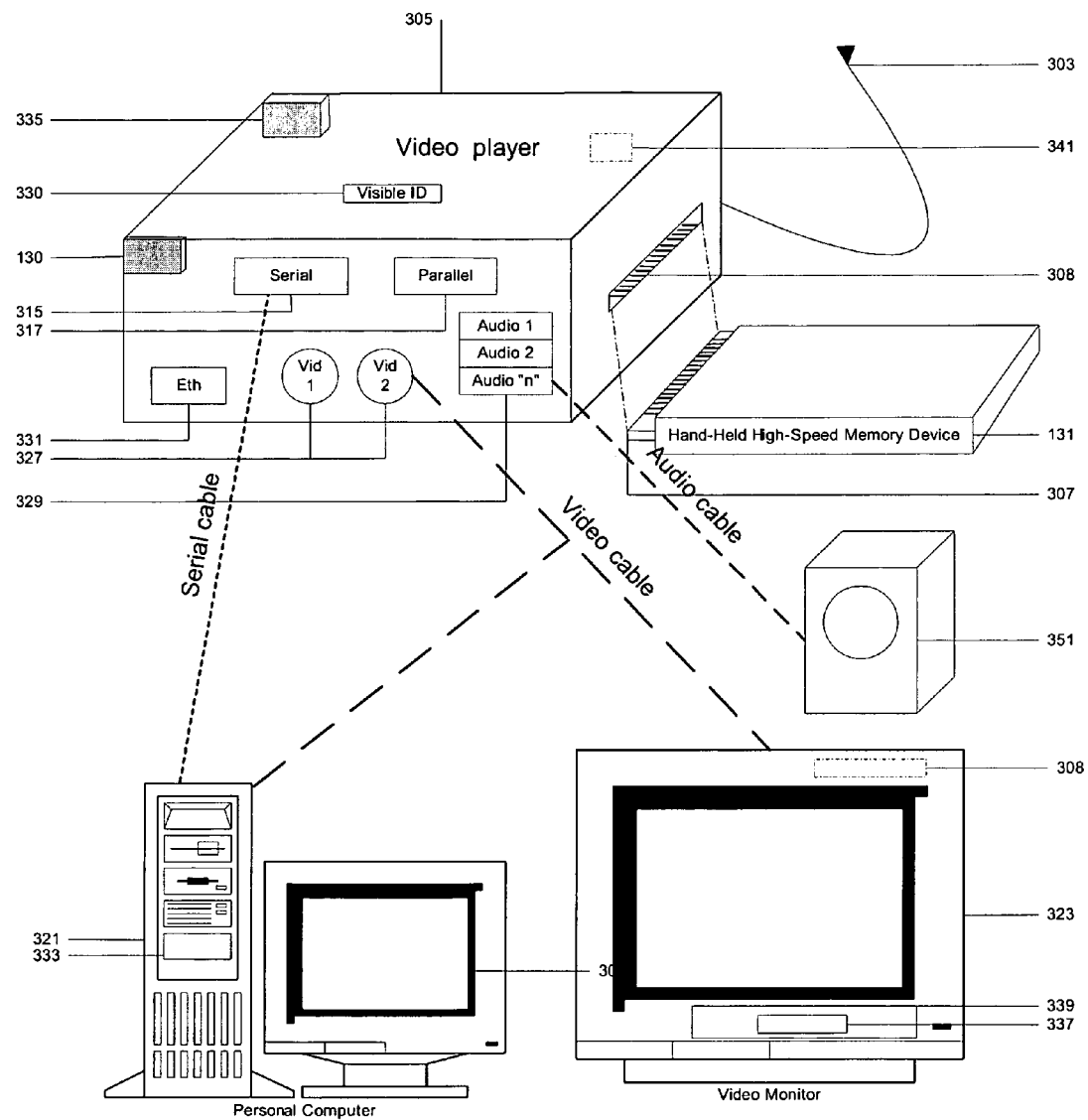
FIG. 3 depicts a personal computer coupled to a video player configured to mechanically and electrically coupled with a portable high-speed digital recording device of FIG. 1.

Although FIG. 3 depicts the video player 305 as a separate entity from the video display device 323, this depiction is intended only as an embodiment. In a preferred embodiment, some or all of the functionality of a video player 305 described herein can be integral to the video display device 323. This functionality can include, but is not limited to, a high speed port having high speed contacts 308 configured to mate with a hand held proprietary high speed memory device, a decryption module 341, a unique device ID, an ID register for storing the device ID numbers of other digital devices, and combinations of such functionality. Accordingly, throughout this disclosure, many specific details offered with respect to the video player 305, or components thereof comprehend both embodiments wherein a video player is integral to a video display device, and embodiments wherein a video player is physically distinct from a video display device. Specific details in terms of one particular embodiment or the other are therefore offered for ease of comprehension, and are not intended to limit the scope of the appended claims. As used herein, the term "video display device," can include, but is not limited to, a computer monitor, TV screen, a projection display device, or other hardware or software applications associated with displaying a video image.

As will be further appreciated in conjunction with FIGS. 13 through 22, the unique device ID 130 of the video player 305 (FIG. 3), (which, as noted above, may include, or be distinct from the unique device ID 337 of a video display device 323), the unique device ID 129 of a portable high-speed memory device 131 (FIGS. 1 and 3), the unique device ID 115 of the video kiosk 105, or combinations of these device IDs, may be utilized in the generation on encryption keys and watermarks. The encryption and watermarking schemes described herein, whether used separately, or in conjunction with each other, can substantially reduce the practice of video piracy. Any of the unique device IDs described herein may comprise a non-volatile, non-erasable digital value stored at the transistor level of an IC die or printed circuit board level at the time of manufacture, or programmed as a non-erasable digital value after IC die manufacture. Programming and storage techniques may borrow from various storage technologies including, but are not limited to PLD or fusible-link circuitry, EPROM, UV prom, or laser readable media such as that used in compact disc technology.

In a first embodiment, the unique device ID of one or more video players 305 may be stored within a portable high-speed memory device 131. As noted above, some or all of the components and functionality of the video player may be integral to, or separate from, the video display device. In this embodiment, the unique device ID 130 of a digital player is first uploaded from the playback device 305 to the proprietary high-speed memory device, and subsequently from the proprietary high-speed memory device to a publicly accessible kiosk. As noted, the storage of a unique playback device ID within a proprietary high-speed memory device may be erasable, or non-volatile and non-erasable, thereby linking a portable high-speed memory device to a particular player on a temporary or permanent basis. The device IDs of additional video players 305 or video display devices 323 may be stored within a portable high-speed memory device through user programming, thereby permitting a functional coupling between a single portable high-speed memory device and alternative, or multiple video players. In this manner, a user could download a movie from a kiosk with the intent of viewing the movie on a new TV, or at a friends house, by storing an identification number of the second video player in the memory device, and downloading a movie encrypted according to that new ID number.

After the user selects a video file for download, the kiosk search engine 133 searches a local data base index 135 to determine whether or not the requested video file (and any related ancillary files or selectable parameters) are stored within the local data storage member 123 of the local video kiosk 105-A. If the video file is stored locally, the video file is downloaded into the video recording device via a high-speed signal path 137. If the video file is not stored locally, a search request is sent to the central server 118. If the requested video file is stored on the central server, the central server may initiate a file transfer to the requesting kiosk 105-A. Alternatively, the central server searches through an index, locating one or more digital memory storage locations at which the requested video file is stored. These storage locations may be associated with other central servers 118, other video kiosks 105-B, 105-C, 105-D etc 05, or stand alone data storage members 117. After a storage location with the requested video file is identified, a file transfer is initiated from one of the storage locations having the requested video file to the requesting video kiosk 105-A. The video file is received and digitally stored by the requesting kiosk. The portable high-speed memory device 131 is coupled with the high-speed port 113, and the requested video file, along with ancillary files and selectable parameters, are downloaded from the kiosk to the portable high-speed digital memory device over a high-speed digital signal path 137 for subsequent use by the user 103.

Throughout this disclosure, specific examples used herein often depict a "user" in terms of an end-user (such as an individual securing a video file for home viewing). However, alternative embodiments are envisioned wherein users include commercial or mid-level entities such as movie theaters, which, after downloading a video file, then display the video for a consumer audience. In conjunction with this, specific examples throughout the disclosure refer to the portable high-speed memory device 131 depicted in FIGS. 1 and 3. It will readily be appreciated that commercial or mid-level entities such a movie theater downloading videos for subsequent public display may utilize a large, or fixed high-speed memory device which is not portable. References to the portable high-speed memory device or references to individual persons as users are therefore specialized examples, and should not be construed so as to limit the scope of the appended claims.

The stand alone memory 117, the local data storage member 123 within a kiosk, the central data storage member 119 within the central server, and the portable high-speed digital memory device 131 may comprise, but are not limited to, volatile, non-volatile, magnetic, optical and quantum memory devices. Accordingly, memory types and structures may variously include electrically erasable memory devices, optically erasable memory devices, magnetic digital storage media such as disk drive technology, flash memory, optical memory such as DVD, and combinations thereof.

Because the average consumer is not likely to spend more than a few minutes waiting for a video download, the video kiosk 105A incorporates a novel architecture to facilitate the generation, processing and high-bandwidth transmission of video files from the kiosk to the portable high-speed memory device 131 in a high-bandwidth data-stream sufficient to make the download of a high definition feature length file commercially viable. To achieve this, the minimum required download rate will be in the general range of 5 Gbps-40 Gbps or greater, and download rates in the more specific range of 10 Gbps-25 Gbps are probably sufficient to satisfy consumer demands in both costs and download times. The socket (113) uses a high-speed connector capable of supporting data transfer rates capable of effectively addressing these anticipated consumer requirements. In an embodiment, the signal path connection between the portable high-speed memory device and the kiosk is an electrically conductive connection, and may utilize technology described in the United States Patents and Patent Applications incorporated herein by reference. Alternative signal path embodiments are envisioned, however, including optical signal paths between the video kiosk 105 and the hand-held high-speed memory device 131.

The video kiosk 105 includes multiple processors, or a multi-core high-performance processor that can receive, process and export multi-channel data streams, preferably in excess of 10 Gbps per channel. The memory 123 is depicted in FIG. 1 as a high performance disk array comprising multiple large capacity hard drives which, operating in concert, are collectively configured to deliver the high bandwidth data stream required to satisfy consumer expectations or requirements. The collective capacity of the high-performance drive array is preferably least 1 TB.

Because the storage capacity of a video kiosk is limited, file transfers of digital video files including feature length movies may be transmitted via the Internet from one video kiosk 105-B to another video kiosk 105-A, thereby making network movies available at any kiosk at which a user requests to download a video file. Because of current limitations, however, it may take a day or more to transmit a high definition feature length movie over the internet from one video kiosk to another. FIG. 2 illustrates a LAN 203 as part of the greater video network 101. By way of illustration, a shopping mall 207 with high consumer density and volume could have multiple video kiosks 105 on the LAN 203. The LAN pictured in FIG. 2 has its own local server 201 and router 205 which provide an Internet gateway, thereby providing video kiosks 105-L1 through 105-L4 full access to the entire video network 101, while insulating the LAN of burdensome unwanted Internet traffic. Because intra-LAN data traffic is limited to video file transfers between kiosks within the shopping mall, the file transfer rate between video kiosks within the LAN can be many times faster than a file transfer rates typically experienced over crowded Internet pathways, thereby increasing the speed at which many video files are available to certain kiosks. The multiple storage members 123 among the LAN video kiosks 105-L provide for a greater number of video files to be stored among video kiosks 105-L1, 105-L2, 105-L3, 105-L4 within the LAN 203, when compared to a single video kiosk of similar or equal size to those video kiosks within the LAN. Similarly, a stand-alone data storage site 117 within the LAN 203 can further enhance the selection of video files to users at a shopping mall 207. The greater video selection available to mall shoppers with minimal delay enhances the commercial utility of the video network.

FIG. 3 illustrates a system overview of components used to "play" (display) the digital video file on a display screen of a user. High Speed connectors 307 of the portable high-speed memory device 131 are inserted into the high-speed port 313 of the video player 305 with complementary high-speed connectors 308. The video player may include a unique digital device ID 130 stored on a digital storage medium, or embedded in circuitry within the video player 305. The unique digital device ID 130 of the video player can be read by the portable high-speed memory device. As noted in FIG. 1, device ID 130 is depicted as being stored in the portable high-speed memory device 131, thereby "linking," the portable high-speed memory device to one or more video players. As discussed in greater detail below in conjunction with watermarking and encryption, by linking the unique device ID 130 of the video player or the device ID 337 of a video display device 323 to one or more portable high-speed memory devices 131, video files may be encrypted or watermarked in such a manner that they can only be viewed on pre-selected video players, thereby enhancing security and digital rights management, and hampering video piracy.

A visible identifier 330 is a fixed somewhere to the video player. By this means, the user can input this value to a computer or kiosk which will then access a central database to identify the unique digital ID corresponding to that visible ID 330, thereby linking the unique digital device ID 130 of the video player to a portable high-speed memory device 131 without user knowledge or detection of the actual unique digital device ID 130 of the video player. Such concealment of the actual unique device ID 130 further enhances the security of anti-piracy measures described herein.

The video player 305 includes a power cord 303 and a variety of communication ports, including serial ports 315, parallel ports 317, optical interface 319, Ethernet 331, and USB ports 329. The enumeration of these specific port types are offered by way of example. The embodiments described herein can be adapted to any known communication port, as well as communication ports and protocols developed in the future. A decryption module 339, 341 may be located within the video player 305 or video display device 323. A personal computer 321 may be coupled to one of the ports 315 of the video player 305 via communication cable 325. In FIG. 3, the personal computer is shown coupled to a video screen 123 on which the video file will be viewed. Alternative embodiments are envisioned in which the video player 305 is coupled directly to the video screen as illustrated by the dotted line 327 representing a communication cable coupled between the video screen and port 319. In a preferred embodiment, however, the decryption module is disposed within the video display device and the need for a separate video player 305 is eliminated. Functions described herein in conjunction with a video player 305 may be divided between the video display device 323 and a personal computer.

Those skilled in the art will appreciate that it is possible for a hacker to "split" a signal cable, and analyze, record, or process the signals detected therein. It can therefore be appreciated that, in embodiments wherein the video player 305 and decryption module 341 are separate from the video display screen 323, an unencrypted signal would be transmitted through a cable connecting the video player 305 and the video display device 323. By extracting an unencrypted signal, a sophisticated hacker may be able to produce a high quality digital "knock off" of the content transmitted from the video player to the video display device. Whether such as knock off is sold through the black market, or distributed freely as a prank, the profitability of a cinematic movie, video game, or other digital commodity can be seriously impacted.

In a preferred embodiment therefore, the decryption module 339 is integral to a video display device 323, significantly reducing hacker access to an unencrypted signal. Embodiments of a decryption module include software, firmware, hardware, and combinations thereof. By forming at least part, if not all of a decryption module from hardware at the transistor level, it would be difficult, if not impossible for a pirate or hacker to read the software code and try to reverse engineer a decryption module.

A decryption module formed, at least in part, by proprietary transistor logic within an IC package could be further enhanced for added security against hackers. To prevent a hacker from accessing video output terminals of an IC package, additional design features may be incorporated in a decryption device, as illustrated in FIGS. 39A, 39B, 40 and 41.

Figure 39A:
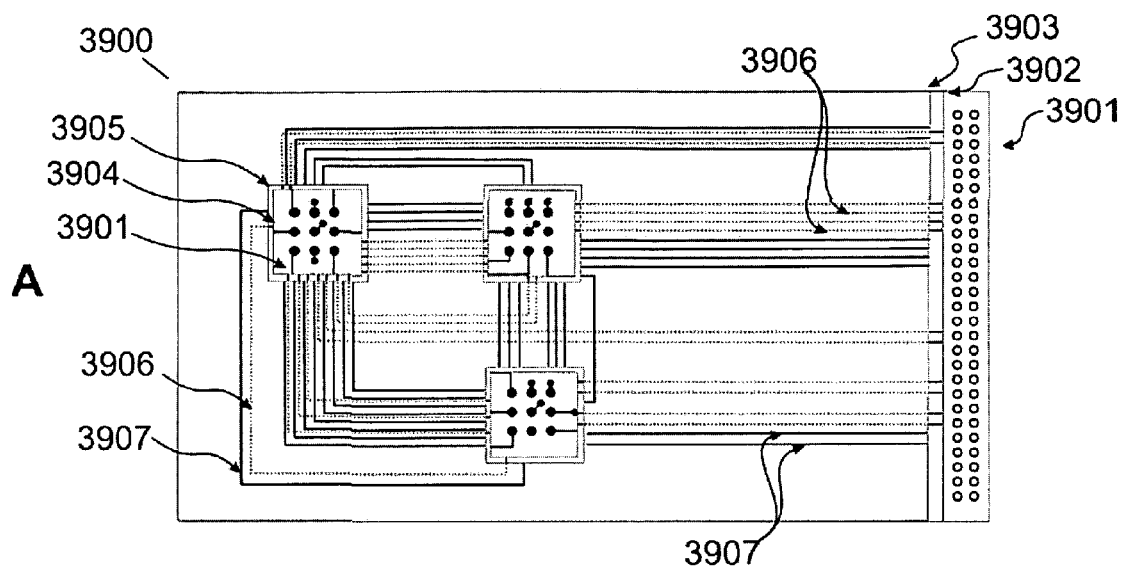
FIG. 39A depicts a top plan view of an embodiment of a printed circuit board constructed with a stair step cavities.
Figure 39B:
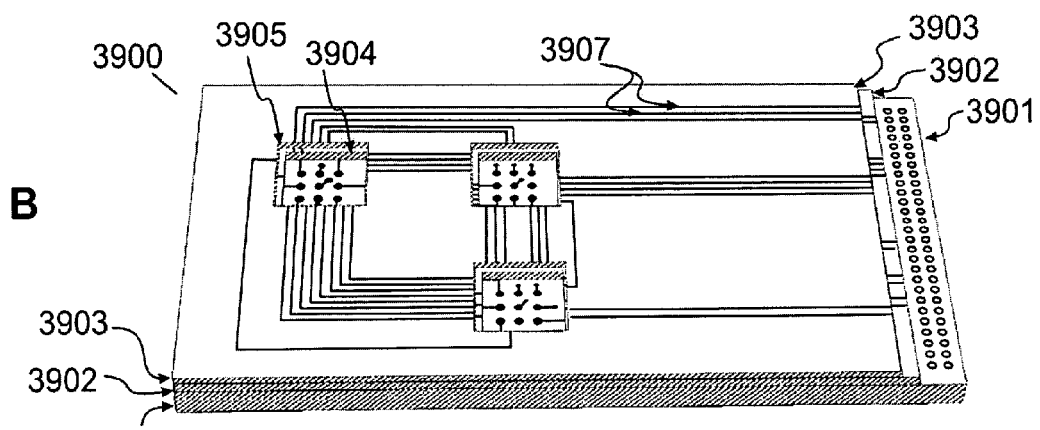
FIG. 39B depicts a perspective view of the printed circuit board of depicted in FIG. 39A.

FIGS. 39A and 39B illustrate a top and perspective views of an embodiment of a printed circuit board (PCB) structure 3900 with multiple circuit layers, 3902 and 3903, on which circuit traces 3906, 3907 are formed. For illustrative purposes, circuit traces on the top layer 3903 are represented by solid lines, circuit traces on the middle layer 3902 are shown in phantom where covered by the top layer, and circuit traces on the bottom layer 3901 are not visible where covered by the layers 3902 and 3903. Concentric apertures 3904, 3905 are formed within layers 3902 and 3903 form a stair step cavity for receiving an integrated circuit package which, in an embodiment described in conjunction with FIGS. 39A-41, is configured to function as decryption module for an encrypted multimedia file. A bottom layer of the PCB, including circuit traces disposed thereon, is visible at the bottom of the stair stepped cavities. The exact number of layers depicted in these figures is offered only by way of example, and do not represent a limitation on the number of stair step layers that can be fabricated in a printed circuit board.

In FIG. 39A, some of the signal traces 3906, 3907 can be seen to be geometrically arranged almost directly above each other. Advantages of this design will be explained momentarily.

Signal traces on the various stair stepped layers extend all the way to the respective edges of their apertures, forming exposed terminals that can electrically couple with the terminals of an integrated circuit package such as an encryption module.

Figure 40:
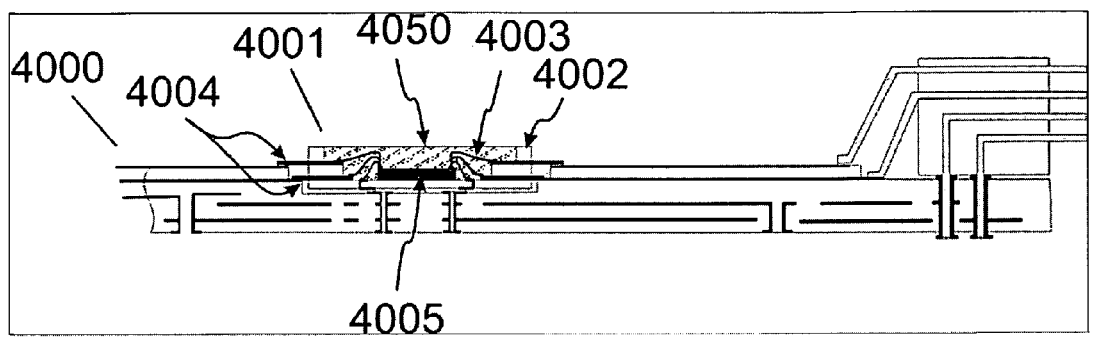
FIG. 40 depicts an embodiment of a stair stepped integrated circuit decryption package having corresponding stair stepped layers disposed within the stair stepped cavity of a printed circuit board.
Figure 41:
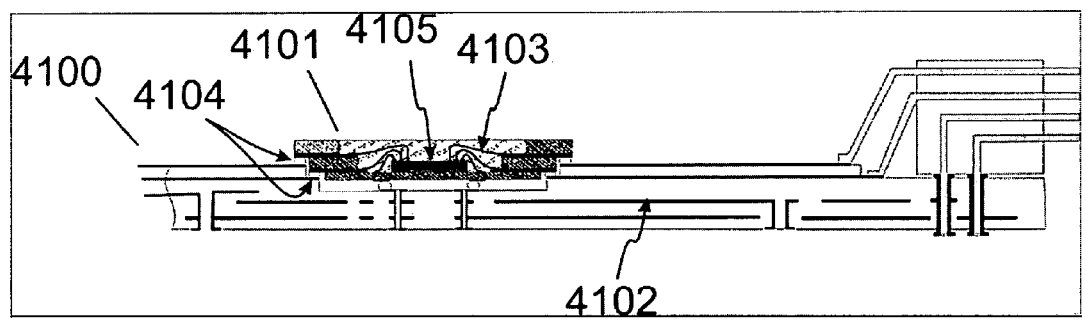
FIG. 41 depicts another embodiment of a stair stepped integrated circuit decryption package having corresponding stair stepped layers disposed within the stair stepped cavity of a printed circuit board.

FIGS. 40 and 41 illustrate embodiments of a stair stepped integrated circuit package 4001, 4101, interfaced with the stair step terminals of a stair stepped PCB. Stair stepped contacts 4004 on IC package 4001 can be created by stacking lead frames in a common package and which egress from its body 4002 for interconnection to the stair stepped PCB terminals. Inside the package, an IC die 4005 is interconnected by wires 4003 and the die and wires are encapsulated with a suitable encapsulant material 4050.

FIG. 41 depicts a cross section view of another embodiment of a package and stair stepped PCB assembly structure 4100 wherein a decryption module in the form of an IC package 4101 comprises an IC die 4105 coupled to stair stepped contacts 4104 of a decryption package by wires 4103. The stair stepped contacts can be created by laminating metal clad laminates that allow package circuit traces to accessed from both sides of the metal at their distal ends to allow stair stepped access for assembly to a stair stepped PCB. By orienting the stair-step terminals of the encryption package 4101 directly against the stair step terminals of the PCB, exposure of terminals carrying decrypted signals is minimized, thereby further impeding a hacker from accessing these terminal to intercept an unencrypted signal.

Within FIGS. 40 and 41, the encapsulant 4050 is limited to be coupling the IC die to the IC package, and protecting the wires connecting die terminal to the stair step package terminals. However, epoxy or other encapsulating agents can be used more lavishly so as to inseparably couple the encryption package to the PC board, and to more thoroughly encapsulate the entire IC package. By this design, attempts to access decrypted signal carriers by separating the IC package from the PC board will result in the destruction of the circuit's functionality. Additionally, as described in conjunction with FIG. 39A, "protective" circuit traces can be used to shield any terminal or circuit trace carrying a decrypted circuit, such that the decryption package is configured to malfunction if discontinuity is experienced in any of the protective traces. By this design, an attempt by a hacker to access decrypted signals by drill through the PC board or the IC decryption package will render the decryption circuit inoperative, thereby preventing unauthorized access to decrypted signals.

In addition to these mechanical safeguards, more sophisticated safeguards, such as electronic detection circuitry, may also be incorporated to impede unauthorized access to unencrypted signals. For example, an impedance detection circuit can be programmed with a non-erasable circuitry at the time of manufacture. The impedance detection circuitry in video display device is calibrated to detect any change in the impedance of a signal path carrying a decrypted signal, and to disable the decryption module if signal path impedance fluctuates above a predetermined threshold. If sufficiently accurate, the same calibration could be universally applied to the impedance detection circuitry of identical video display devices. Alternatively, embodiments are envisioned wherein measurements are made on every video display device at the time of manufacture, and every impedance detection circuit is individually calibrated.

The mechanical and electronic design features described in conjunction with FIGS. 39-41 are not intended to be exhaustive, but are offered as examples to illustrate how various design features can be utilized to enhance the tamper resistance of a decryption circuit. By these and other techniques, hacker access to unencrypted signals can be significantly impeded.

Still referring to FIGS. 1 and 3, by allowing a user to access the video network via personal computer 321 over the internet, a user can search for a video listed on the video network 101 at their leisure from a personal computer at home or work, and select a video they desire to view. By this embodiment, if the video file selected by a user is not stored in a local video kiosk of the user's preference, a video file selected by a user (and any ancillary files), can be transferred from their current storage location on the network to a video kiosk 105 designated by the user.

In an embodiment, the system can calculate the expected file transfer time and advise the user accordingly. In an embodiment, the video network notifies the user when the file transfer is completed. The notification can be sent to the user via any messaging medium, including, but not limited to, e-mail, SMTP, text messaging, "instant messaging," voice mail, and auto-dialed voice phone message, "pager" notification, or combinations of these methods. The notification of completed file transfer can also be posted within the video network and accessed via personal computer. In an embodiment, any user may log onto the video network to monitor the contents of a particular video kiosk or LAN. A user may also log onto a personal user file within the network by means of a password or other identification, and access data relating to file requests, file downloads, and/or the status of file transfer requests.

Information about various cellular networks, such as the "keystroke" required by a particular cellular network to initiate a "pager" message, or the time delay between keystrokes for certain notices, is also stored within the video network. By this means, various notices may more efficiently be sent to a user. When setting up an account with the video network, the user may simply advise the cellular network used in conjunction with a cell phone number, work phone and extension numbers, and so forth. In setting up the account, the user simply identifies the preferred data formats for various messages that may be initiated by the network, such as "video now available," or "video available at alternative kiosk location," "credit card information not responsive," etc. When the network generates a message to a user, the particular type of message may be sent to the user through specific channels or data formats requested by the user.

Content Provider Access and Support

In existing distribution schemes, such as Netflix or Blockbuster, a physical inventory must be maintained geographically proximate any potential user to maintain viable market penetration of a video. This can prevent low budget or "niche" movies from acquiring any market share. For example, if a movie is so rarely requested by the public that only one out of one hundred rental outlets can expect a request or rental of that movie in any given year, it may not commercially possible for distributors to maintain a physical inventory of the DVD that movie at most outlets. It is definitely not commercially viable to maintain a physical inventory of the DVD at every commercial outlet. As a consequence, films which do not need a minimal reckless level of public demand are not inventory, and become virtually inaccessible to the public. Low budget films, silent films from the early years of cinema, and even "first run" or academy award winners more than a few years old may become commercially marginalized through a physical inventory system. In contrast to current "inventory based" models of video distribution, in the embodiments described herein, no physical inventory of DVDs is maintained at a video kiosk or anywhere within the video network 101. But any video file within the network is commercially available to every kiosk on short notice. A benefit of this feature is that any content provider has market access, no matter how low the commercial demand for a movie may be. In the embodiments described herein, a digital video file need only be stored at one storage location on the video network. The file can be transferred to any kiosk, and even multiplied and distributed among multiple video kiosks within the network on short notice.

In an embodiment, select content providers are required to pay the video network a monthly or annual fee to maintain a specific video file on the network and available for download by users. According to an alternative embodiment, video files may be maintained on the network without cost to the content provider. Any user-pay embodiment, royalty payments can be awarded to content providers or other appropriate parties according to the frequency with which a video file is downloaded by users. By this means, the video works of any provider can be made available to the general public in a manner that provides genuine market penetration to any content provider.

Advertising for Content Providers

According to an embodiment, a content provider can produce one or more advertisements relating to a video file. The advertisements are digitally stored within the video network 101 (also referred to herein by the inclusive term "the system"). In an embodiment, an advertisement is triggered by a match of one or more terms in a search request. According to an alternative embodiment, an advertisement can be displayed even without a search match. Various pricing schemes can provide advertising rights in different formats, different frequency, or different triggers, and so forth. For example, a "still picture" advertisement such as a JPEG, GIF, TIFF or PDF image that is triggered by a search term might cost one cent per appearance. Alternatively, the JPEG advertisement could be executed a fixed number of times for a fixed monthly fee paid by the content provider. A "flash" technology advertisement, or otherwise dynamic or executable advertisement might be offered for a higher price than the cost of a still photographic advertisement, and a still higher price could be required for MPE or MPEG type "movie trailers" or equivalent motion picture advertising. To avoid pestering a user with annoying or even offensive movie trailers, embodiments are envisioned that include a means by which a user may "turn off" a movie-trailer type advertisement.

Figure 4A:
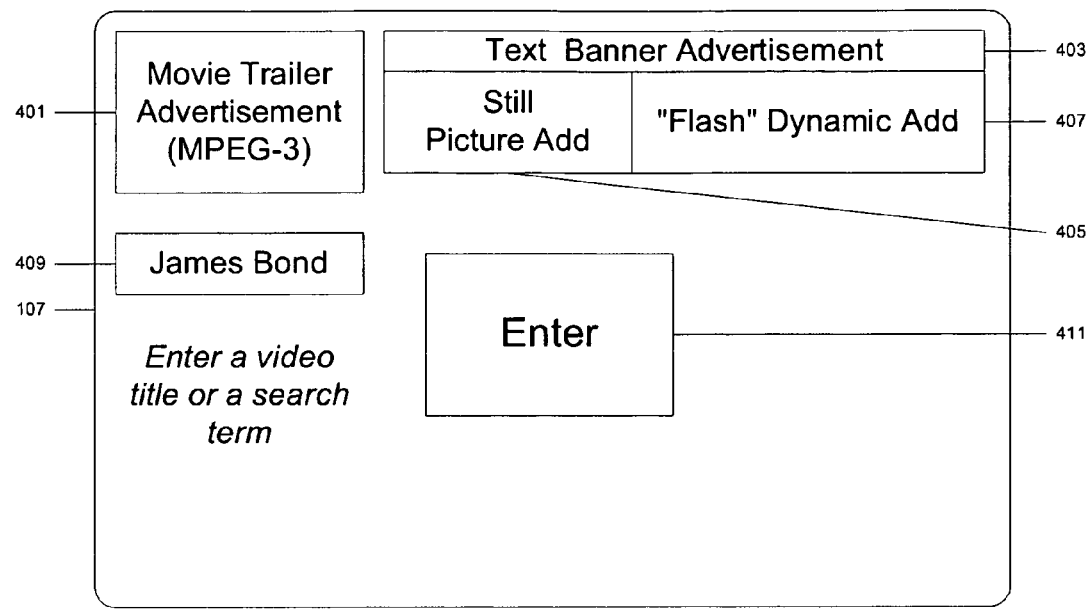
FIG. 4 depicts an embodiment of video screens generated by the video network of FIG. 1, displaying video advertisements.
Figure 4B:
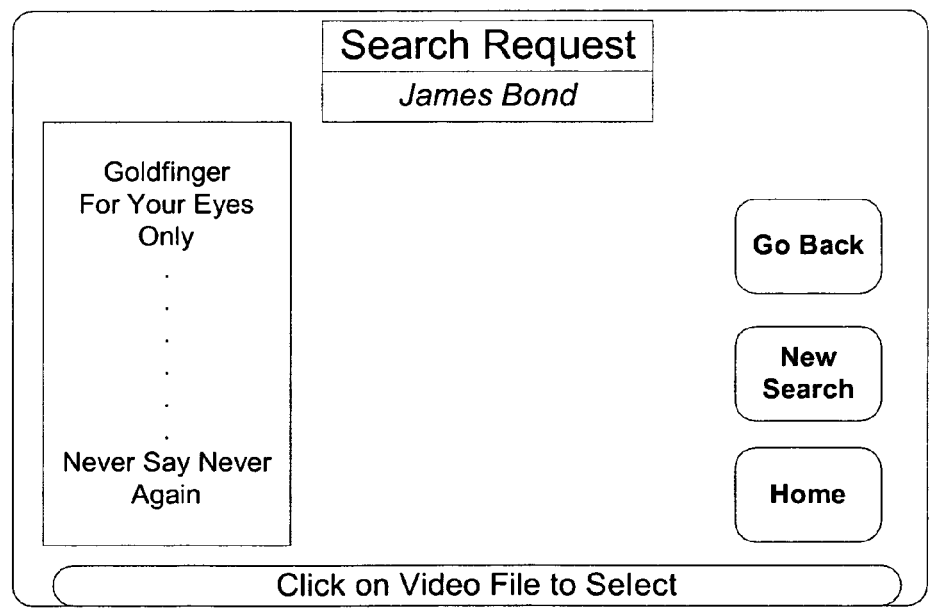

FIG. 4-A illustrates a kiosk screen 107 with a user interface field 409 for entering a movie title or search term by keystroke, and interfacing the virtual enter key 411 to execute a search. FIG. 4-B depicts an embodiment of the search screen resulting from the search request of FIG. 4-A. On the left-hand side of FIG. 4-B is a column of James Bond movies. Instructions are printed at the bottom of the screen for selecting a particular movie from among that list. The right-hand side of the screen depicts keys allowing a user to go back to the previous screen, begin a new search, or go to the home screen of the video network.

Returning to FIG. 4-A, at the top of the screen 107, various screen portions are respectively devoted to a movie trailer advertisement 401, such as might be produced by MP3 or MPEG-4 technology, a text banner advertisement 403, a still picture advertisement 405 such as a JPEG picture, and a dynamic "flash" advertisement 407. Different portions of the screen 107 may be permanently reserved for specific forms of advertising, as illustrated in the example screen on FIG. 4. Alternatively, screen portions may be dynamically selected for advertising. Audio advertising can also be conducted by a speaker 141 (FIG. 1, also see elements 2401, 2403 on FIG. 24) in conjunction with a video advertisement, or independent from a video advertisement. The network may charge higher rates for advertisements that include both audio and video components. The enumeration of these specific advertisement forms and options are offered as examples of potential advertising formats, however, and are not intended to limit the scope of the appended claims.

Embodiments are envisioned wherein the advertisements displayed on a personal computer may be different from advertisement displayed by a video kiosk 105. A customer's video file history, including feature length films that a customer has downloaded, and "trailers" that the customer has not "clicked off" by a mouse, but has viewed in total, can be used to create a customer profile. This profile is recorded within the central server in conjunction with the user's PIN. The central server analyzes the customer profile to select films and other video files likely to appeal to the user.

Targeted advertising to individual customers may then be generated according to the films and videos likely to appeal to a particular customer. Targeted advertisements however, are not limited to advertisements for movies or video files. For example, viewers who continually watch movies related to World War II and imperial or Napoleonic Europe, may be statistically good candidates for European vacation if properly motivated. Airlines and/or travel agencies could produce advertisements tailored to movie buffs attracted to European genres.

Targeted advertising may include links to URL sites related to a product. For example, a commercial airline may target select users with an advertisement of a European vacation. Included in the advertisement is a link on which the user may "click" with a mouse or other user interface member to gain more information. Accordingly, advertising related to any product or service may be displayed on the video network to select users. In an embodiment, statistical data may be collected by the system, and analyzed, or sold to competitive marketing companies, who identify statistically promising correlations between products and network users meeting certain demographic criteria, and who could then sell advertising for market research according to their analysis.

In addition to the selection of movies, targeted advertising to a particular user may be formulated by other user data, including, but not limited to, the ZIP code of video network member, the location(s) of the video kiosk(s) from which the user downloads video files relating to European themes, the age of the user, the sex of the user, occupation, education, income, credit history, shopping habits, hobbies, etc. This marketing information may include information provided to the network directly by a user, and use information gained indirectly, such as through credit history, or other data providers.

System Log on at a Video Kiosk

Figure 5:
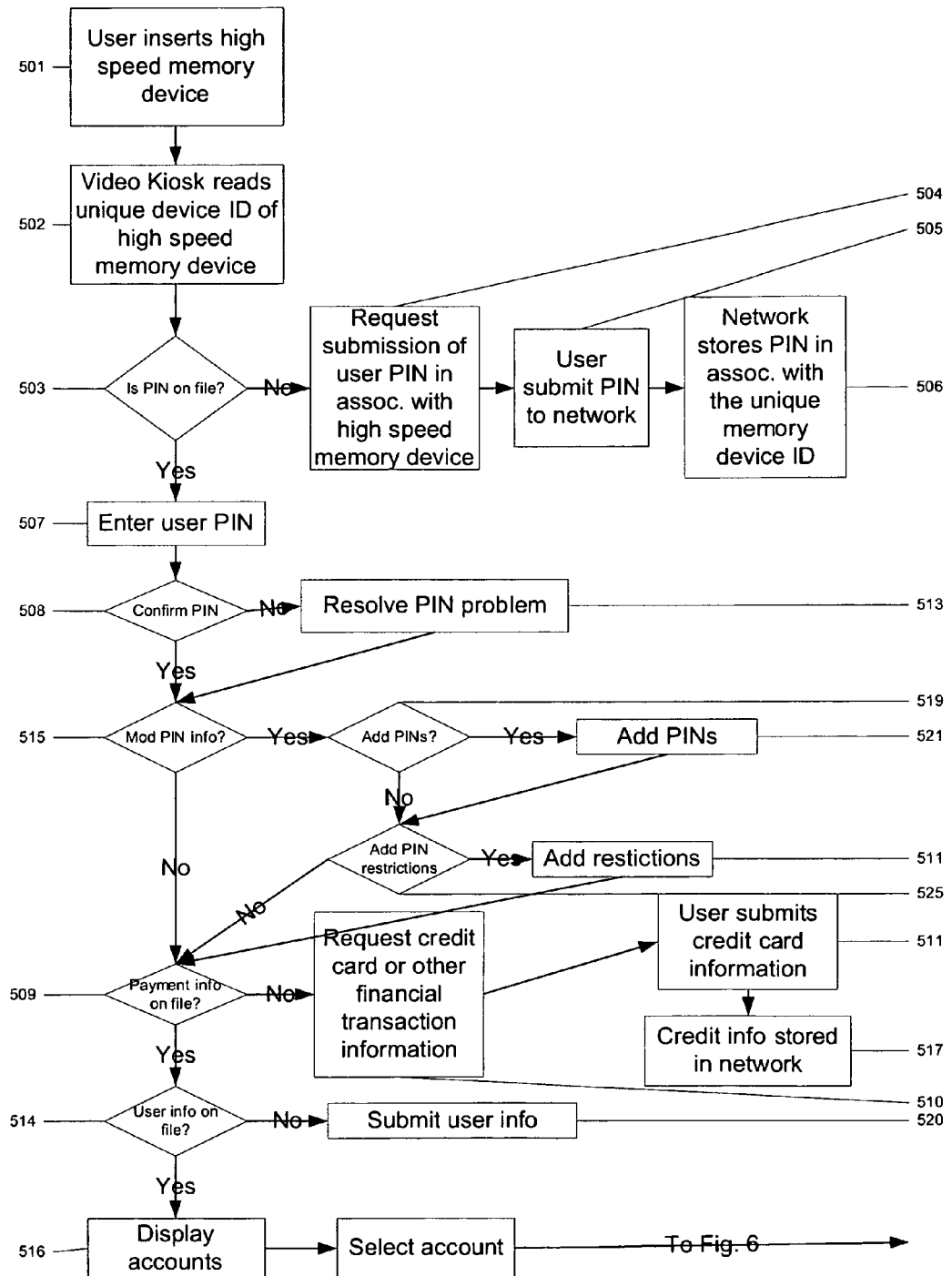
FIG. 5 depicts of flowchart of a process in which a user accesses the video network of FIG. 1.

FIG. 5 discloses a method for a user to log on to the video network. In step 501, a user inserts a portable high-speed memory device 131 into an interface port 113 of a video kiosk 105.

In step 502, the kiosk reads a unique device ID 129 associated with the portable high-speed memory device 131, as well as any other unique device IDs (e.g. device ID 130 of a corresponding video player 305) that may be stored in a portable high-speed memory device.

In step 503, the video network determines whether there is a PIN on file corresponding to the unique device ID of a high-speed memory device.

If no PIN is on file, in the step 504, the kiosk requests the user to submit a PIN (Personal Identification Number of the user) to be associated with the high-speed memory device. In Step 505, the user submits a PIN. In the step 506, the network stores the PIN in association with the unique device ID of the high-speed memory device.

If, in step 503, a PIN is found on the network data base corresponding to the unique device ID, in step 507, the user enters a PIN. In step 508, the network confirms whether the PIN matches the PIN on file. If the PIN submitted by the user does not match those listed in the network, in step 513, the network initiates steps to resolve the PIN problem. If, in step 508, the user pin is confirmed, and in step 515, the user is given the opportunity to modify an information. In step 519, the user is invited to add additional PINs to the portable high-speed memory device. In step 521, the user adds additional PINs.

In step 523, the user is given an opportunity to add restrictions to select PINs associated with a portable high-speed memory device. As will be discussed in greater detail herein, this feature allows an entire family to use the same portable high-speed memory device, while ensuring that minors do not download objectionable material. It will therefore be appreciated that, in applications where multiple PINs are stored on the same portable high-speed memory device, one of the PINs will have to be a primary PIN. A user logged in under the primary PIN will be able to restrict the non-primary PINs in step 511, but a non-primary pin will not be able to restrict a primary pin.

In step 509, the network searches for payment information on file that is associated with the user, or the memory device. If no payment information is found on file, in step 510, the user is prompted to provide payment information.

In step 517 the user submits financial transaction information. The submission may be by way of credit card reader, keyboard input, or both. A question or series of questions may be presented by the kiosk which the user is required to answer to confirm his or her right to use a financial account.

In step 512, the credit or financial transaction information is stored in the network. Credit information may include credit cards, checking account information, or debit accounts such as "Pay Pal," etc. Throughout this disclosure, specific reference to a credit card or a credit card reader are offered only as an example, and should not be construed as to limit the scope of the appended claims.

In step 509, if payment information is on file, than, in step 514, the user is asked if they want to use one of the financial accounts on file. If multiple accounts are on file, in step 516, the available credit accounts are displayed. In step 518, the user elects the account by which the transaction will be paid. If, in step 514, a user does not want to use credit information on file, in step 520, the user submits new credit information.

Throughout the above process, reference to the input of certain information through a video kiosk 105 is offered by way of example. The steps of downloading financial information, registering a portable high-speed memory device to a particular user, and similar steps, may also be done over a personal computer via the Internet.

File Download

Figure 6:
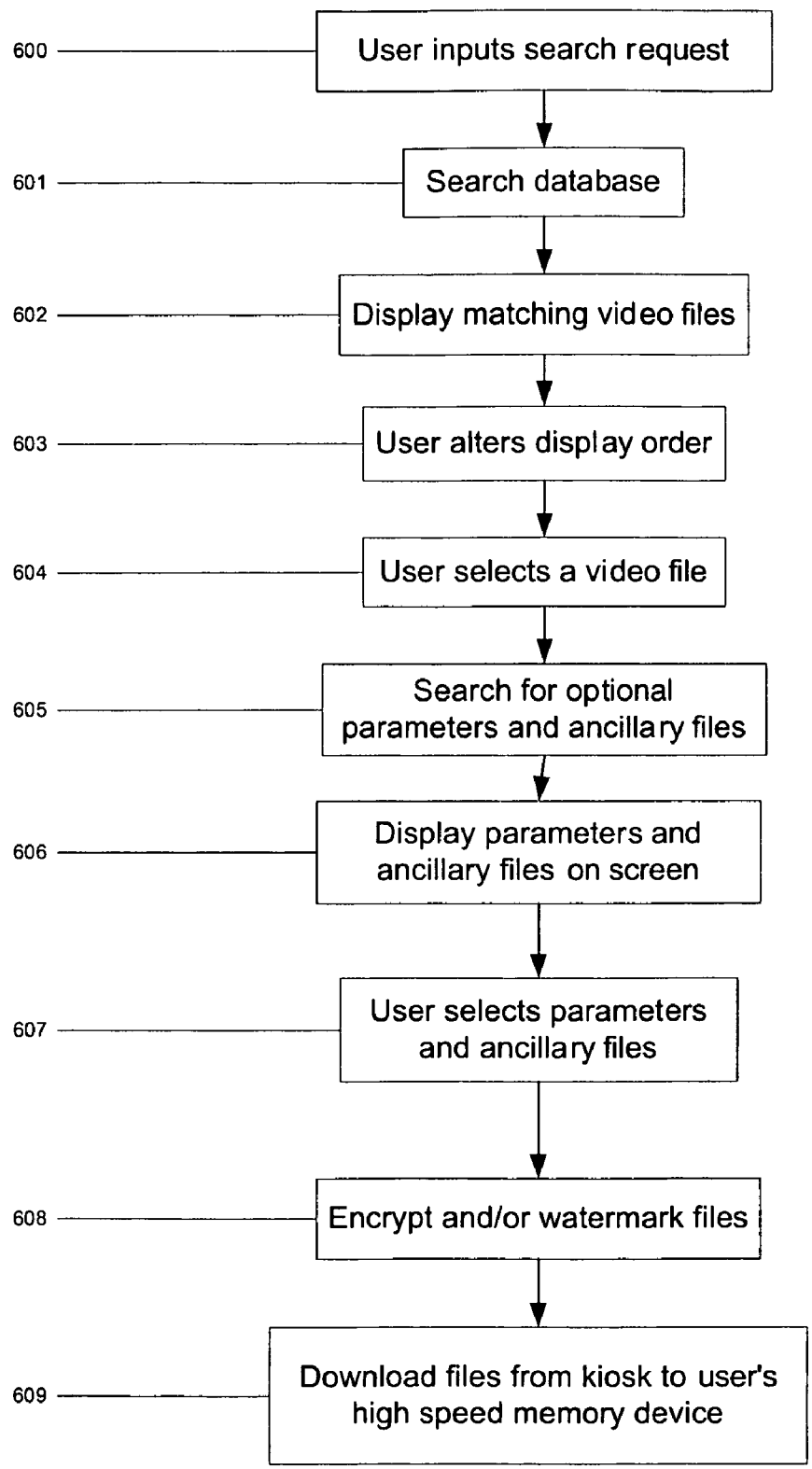
FIG. 6 depicts a flowchart of a process by which a user downloads a video file from a video kiosk of FIG. 1 to the portable high-speed memory device in FIG. 1.

FIG. 6 describes an embodiment of a video file search process. Throughout the discussion at FIG. 6, reference is also made to the video screen displays of FIGS. 4, 7, and 8. In step 600 the user inputs a search request. The search request may be entered through the user input 109 of a video kiosk, or maybe entered through a personal computer 321 communicating with the video network 101 via the Internet. In step 601 the video network 101 searches a database for matches to the search. FIG. 4 illustrates a keyword search field that might be used in conjunction with the steps described in FIG. 6. Within keyword field 409 of FIG. 4, a search term, such as a film title, film character, actor or producer is entered by the user. The search is activated by an input command such as "hitting" the enter key 411 which is shown on video screen 107 as a virtual key.

Figure 7:
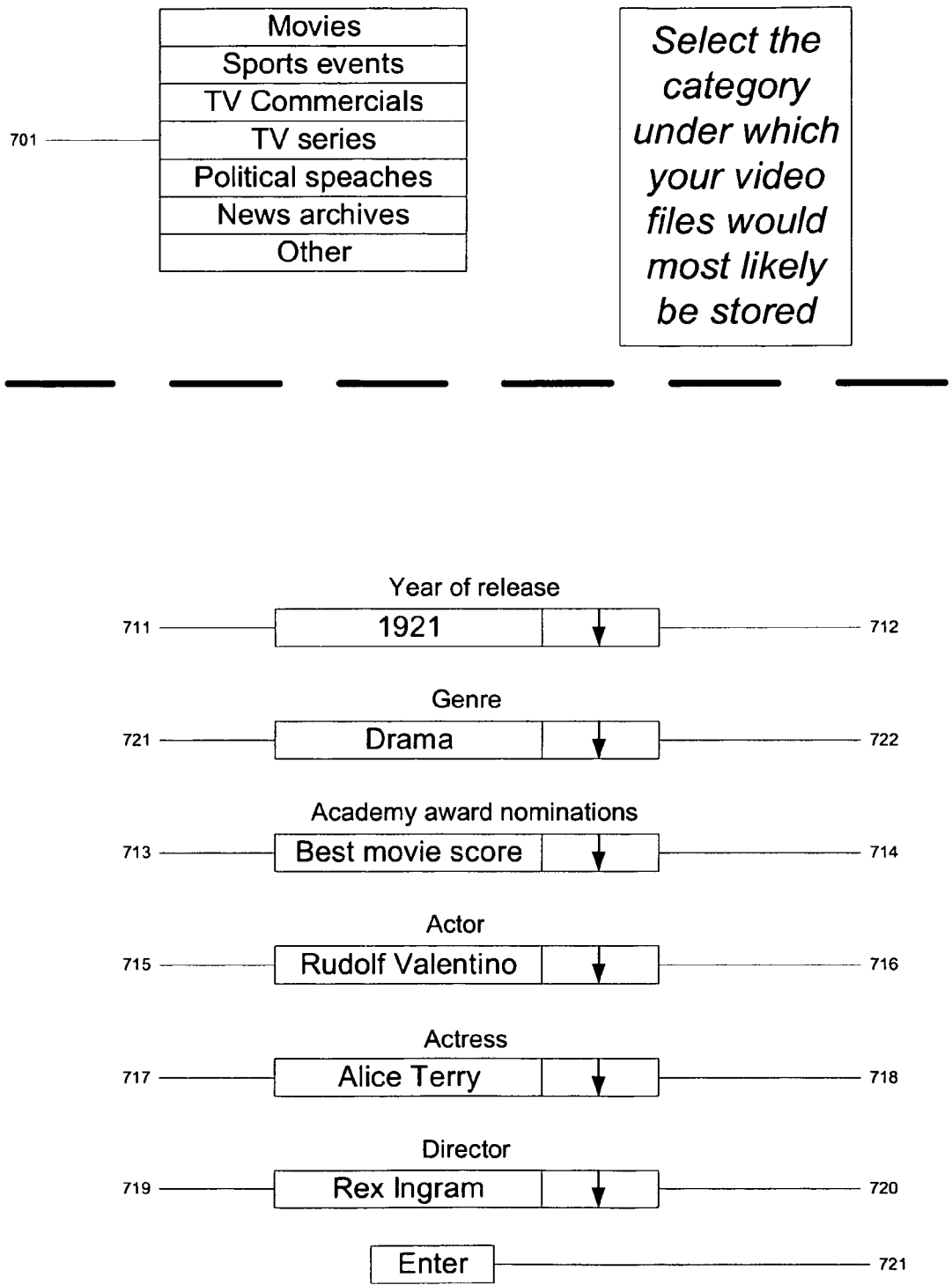
FIG. 7 depicts an embodiment of search parameters displayed on a video display generated, at least in part, by the video network of FIG. 1.

Referring briefly to FIG. 7, a video screen display is depicted including various navigational type searches that can be used in place of, or in conjunction with the key-word search of FIG. 4. If a use selects "movies" from pull down menu 701, a second level search will appear, as illustrated by the pull down menus 711, 713, 715, 717, 719, and 721 illustrated in the bottom half of FIG. 7. The pull-down menus are intended only as an example, and can also be navigational links, text fillable fields, or other navigational searching tools. The pull-down fields illustrated in FIG. 7 include, as examples, categories including the year of release of the movie 711, Academy award nominations/awards 713, actors 715, actresses 717, director 719, genre 721, etc. The menus may be text fillable and/or activated by pull-down chance at 712, 714, 16, 718 and 720. And "enter" key 727 shown by way of example as a virtual key, initiates a search.

Within FIG. 7, the data in the pull-down menus correspond generally to the 1921 silent film "The Four Horsemen of the Apocalypse" with Rudolph Valentino. However, "The Four Horsemen of the Apocalypse" was a silent movie. The user has mistakenly identified the movie as having received the Academy award for best music score in pull-down menu 713. According to an embodiment, if multiple search features are entered, but no exact match is found, the search engine will identify those movies or video files having the "closest fit." A simple "closest-fit" algorithm for this would be to select movies or video files matching the most categories defined by the user. A more complex algorithm could assign a weight to the various selectable categories. For example, it is more likely that someone would miss-define the movie genre than they would an actor. The genre of same the movie may be variously regarded by different persons "action," "drama," "spy," or "romance". In view of the likelihood of mismatches within the "genre" category, the search algorithm may ascribe more weight to the lead actor than the movie genre. The algorithm could assign a weight of "5" to an identified actor and a weight of "2" to an identified genre. Embodiments are envisioned wherein artificial intelligence programs monitor the final selection by a user, and adjust the weight ascribed to each category to increase the search accuracy. Similarly, artificial intelligence or other dynamic statistical applications may note that users frequently misidentify actor "A" as actor "B." In view of this, search requests directed to actor "B" may generate a listing of movies which include actor "A." Other movie search criteria can include, but are not limited to the location of filming, the name of a character in the story of a movie, the producer, or a keyword or famous quote within a movie.

Searches for video files of sports events can similarly be specified by team name, city, sport, league, country, player, or even record breaking performances. In addition to movies and sporting events, other searchable video categories include, but are not limited to, news stories, political speeches, television commercials, archived weekly television serials or shows, and "made for TV" movies.

The "text-field fill" embodiment of FIG. 4, and the pull-down menu embodiment depicted in FIG. 7 are offered by way of example, and are not intended to limit searching and navigational techniques that may be used in conjunction with the embodiments described herein.

Returning again to FIG. 6, in step 602, video files deemed to be a best match are displayed on the kiosk screen (or, on the screen of a personal computer if the search is being done via PC). Search "hits" fitting the search criteria are listed on an output display by an appropriate identifier, such as a movie title. In searches resulting in more than one match, some, or all of the matching titles are all displayed on the screen. In an embodiment wherein multiple matches are displayed, the display order will preferably be according to a default algorithm. For feature-length movies, and example of a default algorithm may operate by generating an alphabetical listing by actor, director, title, etc. Another example of a default algorithm can include displaying a list of exact matches to the search request in order of frequency of consumer download, followed by a list of non-exact matches in order of frequency of consumer download, the closeness of the match, but the combination thereof. The description of the above search algorithms are offered as an example, and are not intended to limit the scope of the appended claims, which envisions alternative algorithms for displaying "matches" to a search request.

Turning briefly to FIG. 8, an example of a video screen display of a search result depicts a four-column field 800 listing search request matches to the search request "James Bond." Four fields include movie title 801, actor 803, actress 805, and the date of release 807. These for fields are offered by way of example, and other fields are possible. Fields can be tailored for the type of video file, such as feature length movies, sports events, TV commercials and so forth.

Using the example of FIG. 8 referencing featuring length James Bond films as an example, in an embodiment, the order of the matches listed can be altered by selecting one of the columns. For example, clicking on the word "title" in column 801 will organize the matches alphabetically by title. Clicking on the word "actor" in column 803 will organize the matches alphabetically by the last name of the lead actor. Clicking on the word "actress" in column 805 will organize the matches alphabetically by the last name of the lead actress. And clicking on the phrase "date of release" in column 807 will organize the matches chronologically by the date the movie was released. Clicking on the virtual button "display according to likelihood of match" will arrange the display of movies in FIG. 8 according to the likelihood of user download based on download history of the Video Network 101. Any one of these arrangements may be used as the default arrangement of the initial screen display.

Returning to FIG. 6, in the step 603, the user adjusts or alters the display of video files as described above in conjunction with FIG. 8. This is part of a dynamic search process.

In FIG. 604, a user selects a video file. The selection may be by clicking on a movie title with a mouse according to the embodiment depicted in FIG. 8, or through other input devices in other embodiments.

In step 605, in response to the user selection, the data base is searched to identify any optional parameters or ancillary files associated with the selected video file. An example of variable parameters include control of nudity, control of sexually suggestive scenes, control of profanity, scenes with excessive violence, etc. Examples of ancillary files include, but are not limited to, alternative languages available for use in the audio portion presented in conjunction with the video file, language of subtitles, inclusion of "director's cut" versions, overlay sound tracks with director's comments, omitted scenes, interviews with actors, etc.

Figure 26:
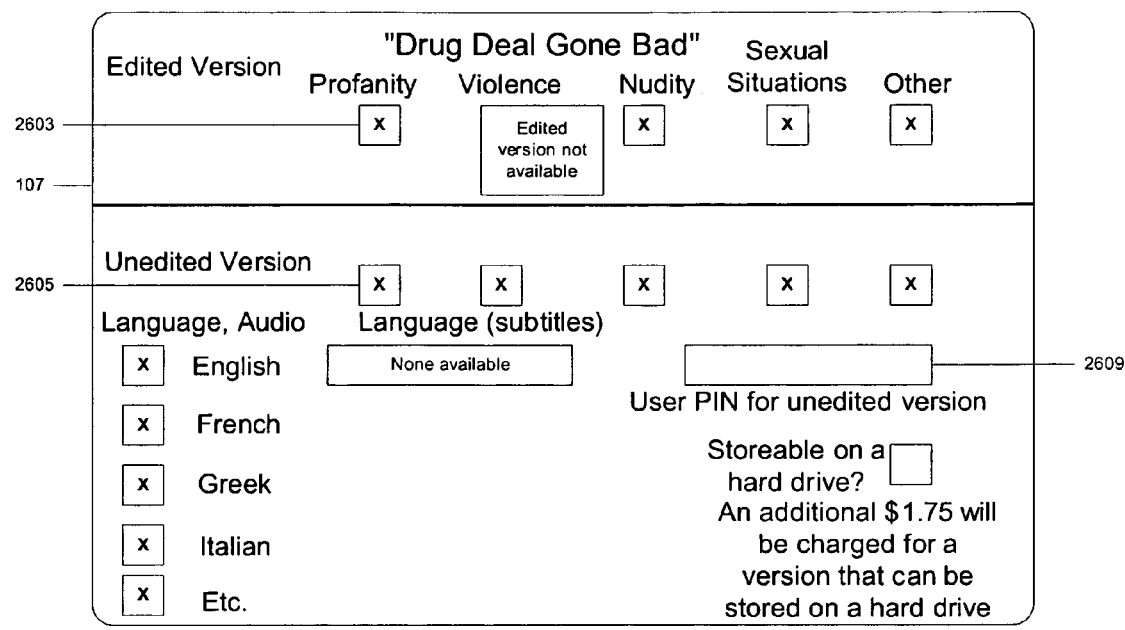
FIG. 26 illustrates an interactive screen display for selecting optional parameters related to a video file prior to the download the video file.

In step 606, the controllable parameters and selectable ancillary files are displayed on a screen. Not all ancillary files may be displayed, however. For example, a sound track may be divided into a music track, and a separate voice track. Because a voice track may be selected from among multiple languages, these language options may be displayed on the screen. On the other hand, ancillary files such as the music track or timestamps are not user selectable, and therefore, will not appear on the screen. FIG. 26 discussed below, illustrates a video screen example of selectable parameters and ancillary files.

In step 607, the user selects from among the available parameters and ancillary files. Embodiments are envisioned wherein select parameters are not mutually exclusive. For example, alternative sound tracks including, censored and uncensored language can be downloaded, and the specific parameter can subsequently be selected or controlled for a particular viewing. According to this feature, parents could watch an unedited version of a movie, and then, from the same downloaded data, allow their children to view an edited version of the movie. Timestamps, flags, and other control elements required for parameter selection can be selected prior to download, or downloaded automatically with a video file and selected at time of use. The process of parameter selection described herein is therefore flexible. Similarly, alternative audio portions in different languages could be downloaded with the video file automatically, with language selected at the time of viewing, or, language options could be selected at the time of purchase, allowing guests or relatives from another country to view the video file with the audio portion in their native language, while the user is able to view the video file and listen to the audio portion in his own native language.

In step 608, the video file is encrypted or watermarked. Steps 601 through 607 may be conducted from the personal computer via web access. To reduce the consumption of memory within a video kiosk, the process of encryption or watermarking in step 608 is preferably executed only after a portable high-speed memory device 131 has been inserted into the high-speed port 113 of the video kiosk. Embodiments are envisioned however, where a video file is encrypted or watermarked and then stored within the video kiosk until the user arrives to download the file.

In step 609, the video file, and any ancillary files and controllable parameters are downloaded to the portable high-speed memory device 131 of the user. According to this process, a true "one-to-one" video download process is provided. A video file is not stored on a digital media prior to customer purchase. Rather, a customer purchases a video file, and an individualized video file is generated in response to the request of the purchaser, and downloaded to an erasable consumer-usable memory module such as the portable high-speed memory device 131 shown in FIGS. 1 and 3.

Because a digital file can be encrypted in segments, or watermarked in segments, steps 608 and 609 need not be sequential, but maybe simultaneous. Watermarking and encryption are discussed in greater detail in conjunction with FIGS. 13-22.

File Transfers

Because of the high and ever-growing number of movies, sports events, TV commercials and other video files, it is not possible for the local storage 123 in a local video kiosk 105 to store every possible video file available through the network. According to an embodiment, video files are stored within the local databases 123 of individual kiosks 105 located throughout the video network. Individual video kiosks 105, may be separated by many miles, or even thousands of miles. Video files may also be stored in the central server 118, or in stand-alone data storage members 117 as shown in FIG. 1. As a consequence of this distributed architecture, video files are continually transferred over the internet from one storage location to another according to user requests.

Figure 9:
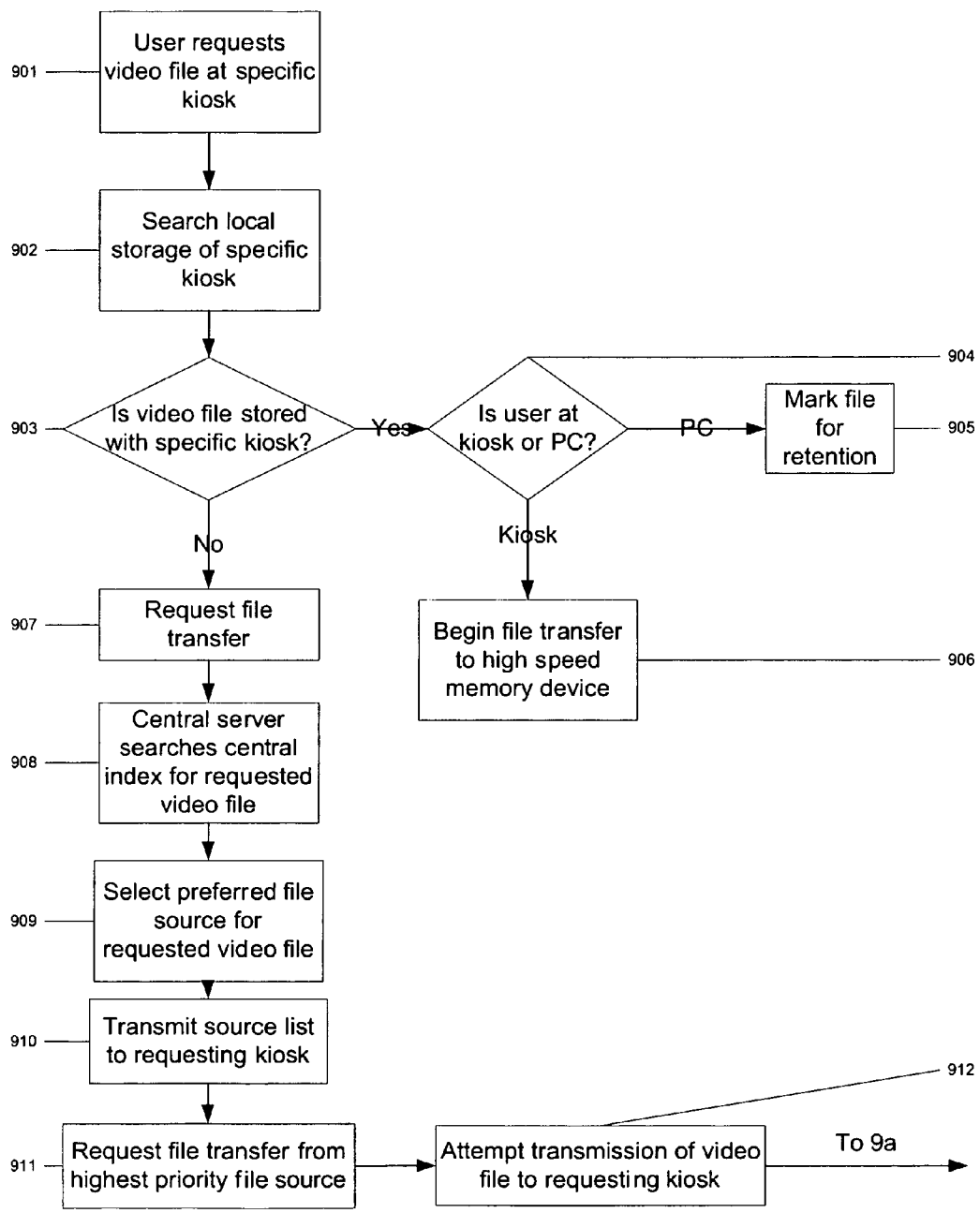
FIG. 9 depicts an embodiment of a response to a search request that is submitted to the network of FIG. 1.
Figure 9A:
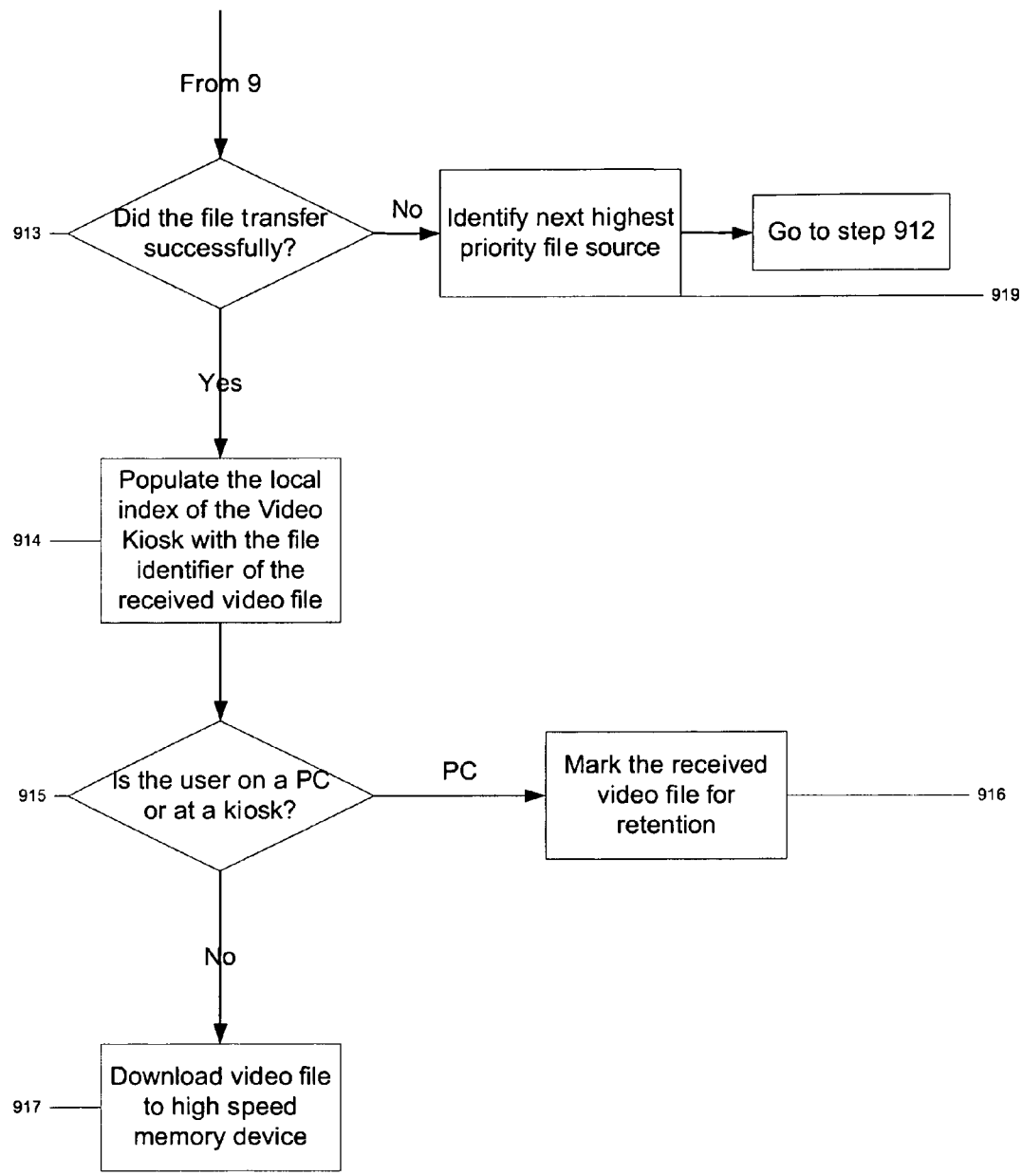

FIG. 9 depicts an example of a process for executing a video file transfer. In step 901, a user accesses the video network 101 and enters a request for particular video file. The request may be from a kiosk interface 109 of a particular video kiosk 105-A, or the request may be entered from a personal computer 305 via Internet connection. If the request is made from a personal computer however, the user must also designate the local video kiosk 105-A at which he desires to download a copy of the digital file.

In step 902, the local video kiosk 105-A searches its local database 123 to determine whether the requested video is currently stored within its own local database. According to step 903, if the video file is stored within the local kiosk, then in step 904, a determination is made as to whether the user is at the video kiosk, or placing the order from personal computer. If the user is placing the order from a personal computer, then, in step 905, the requested video file is marked for retention in the local memory 123 of the local video kiosk 105-A. The purpose of marking a video file for retention and a local memory will be better appreciated in conjunction with the discussion of the local and network level inventory management systems as described in conjunction with FIGS. 10-12. If, in step 904, the user is at a video kiosk, then, in step 906, the video kiosk commences file download of the requested video file to the portable high-speed memory device 131 of the user.

Returning to step 903, if the requested video file is not a stored within the local database 123 of the local video kiosk 105-A, then, in step 907, the local video kiosk 105-A transmits a file transfer request to the central server 118. File transfers are governed, at least in part, by the central server 118. In step 908, the central server 118 searches the central index 120 (FIGS. 1 and 23) to identify those locations at which the requested video file is currently stored.

In the step 909, one of the storage locations that currently stores the requested video file is selected as the file source which will transmit a copy of the digital video file to the requesting video kiosk. In an embodiment, the file source selected for transmission is designated by the central server 118. According to an embodiment, a priority value is assigned to a plurality of potential sources. Criteria for determining a priority value, or for selecting a preferred file source from among a plurality of storage locations may include, but is not limited to, the backlog of file transfer requests in a particular storage location, the file transfer history and reliability of a particular storage location, and the proximity of the file source to the requesting video kiosk. Proximity may be determined by a simple calculation of distance, or may involve a more complex algorithm determining how circuitous route the transmitted data is likely to take in light of current Internet traffic patterns. Reliability of a file source can include such features as error rate during previous transmissions, average transmission time for a given file size, or the number of times they transmitting kiosk or file source has been deselected due to transmission problems. The selection of a source location for a file transfer may be made by the central server 118.

In an alternative embodiment shown in step 910, the central server 118 transmits a list of potential sources of the requested video file to the requesting kiosk 105-A. The information transmitted to the local kiosk includes file sources, and the priority value associated with each potential source. By this means, the kiosk can initiate the file transfer process, beginning with the highest priority file source. If a file transfer request from the highest priority file source fails, the requesting kiosk can identify the next highest priority file source from which to request file transfer.

In step 911, a request is transmitted to the highest priority file source to transmit the requested video file to the requesting video kiosk 105-A. The request can be sent from the central server 118, or from the requesting kiosk 105-A.

In step 912, an attempt is made to transmit the requested video file from the identified storage location for the requesting kiosk 105-A. In the step 913, if the file transfer is unsuccessful, then in step 919, the next highest priority file source is identified, and the process returns to step 912. If, according to step 913, file transfer is successful, then according to step 914, the local index 1100 (FIG. 11) of kiosk 105-A is populated with the file identifier of the received video file. The identifier can be a movie title (as shown in column 1101 of FIG. 11, or a less descriptive digital value unrelated to the video title, generated by the video network and assigned to a video file when added to the network. In step 915, if the user has entered the file transfer request from a PC via the Internet, then in step 916 the video file received by transmission is marked for retention. As in step 905, this is because the requesting party is not at the kiosk to download the video file. As explained in conjunction with the local and network level inventory management systems, the file may be retained until the user arrives and downloads it, and then immediately expunged from the local memory 123 of the video kiosk 105-A. Alternatively, the video file may be retained in the local memory for a time after the use has downloaded a copy of the video file. For example, because of the limited storage space of the local memory 123 of the video kiosk, the video file may be marked for deletion within 48 hours (or some other time frame) if the requesting user never arrives to download a copy of the video file. The decision to retain or expunge a specific video file from a local kiosk is governed by the local inventory management system described in conjunction with FIGS. 10-12. If, in step 915, the user is at the video kiosk 105-A and has inserted a portable high-speed memory device 131 into the high-speed port 113 of the video kiosk, then in step 917, the requested video file is downloaded to the portable high-speed memory device of the user.

High Speed Processing and Storage

Figure 36:
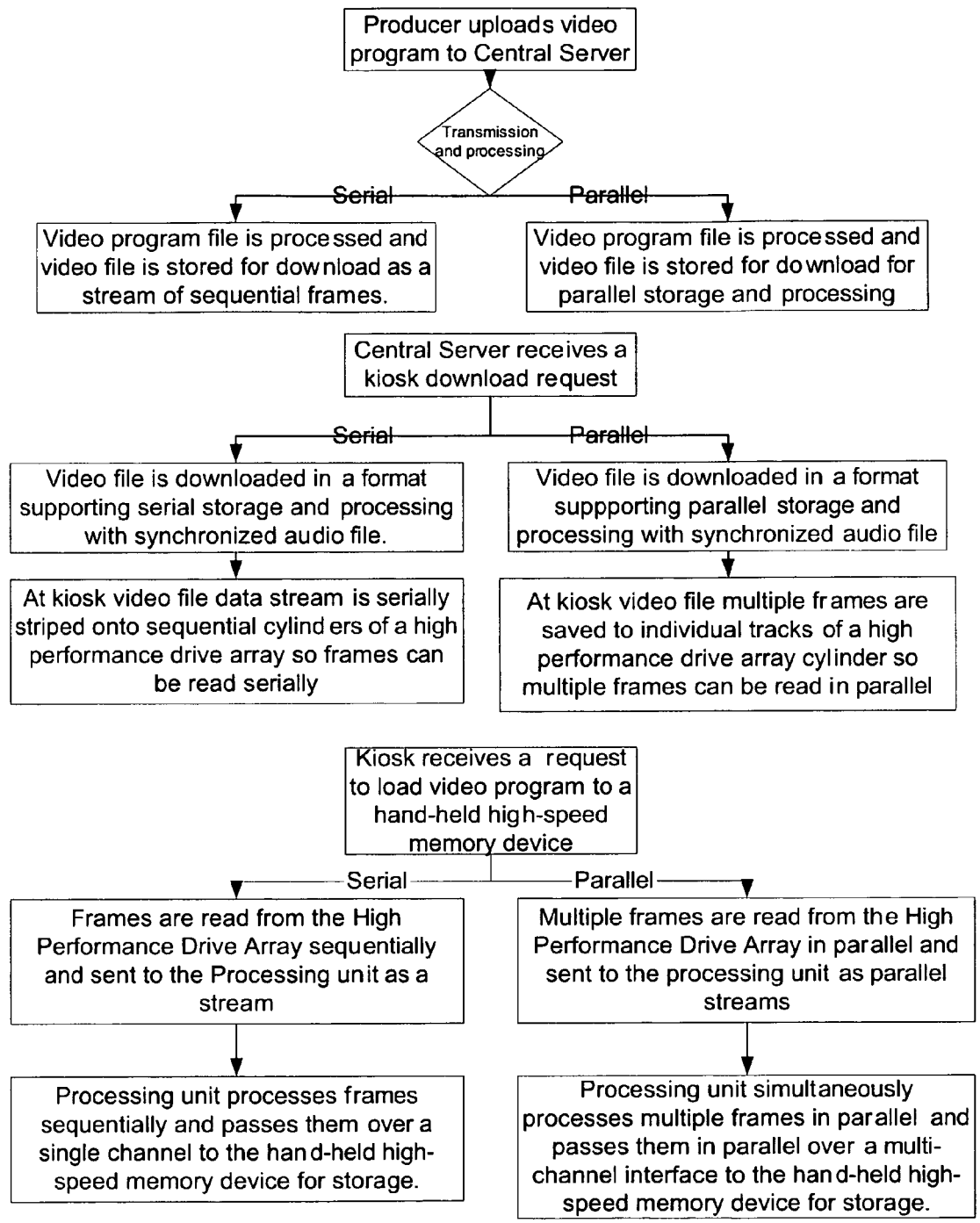
FIG. 36 depicts embodiments of alternative processes for downloading a video file to a local kiosk and downloading a video file from a local kiosk to a hand-held proprietary high speed memory device.

Because many video files contain massive amounts of data, high speed processes are required to upload data from a content provider or producer to the network, to transmit a video file (and associated files) to a local video kiosk storage member 133, and to subsequently upload the video file from the storage member 133 to the high-speed port 113 for storage in the portable high-speed memory device 131 of the user. FIG. 36 describes alternative embodiments of a method for data transfer. In step 3601, a producer uploads a video program to the central server. In step 3603, the information being uploaded is processed by the central server. Processing decisions may include, but are not limited to, determining whether data transmission and/or storage will be conducted serially or in parallel. In step 3605, the video program file is processed in the video file is stored as a stream, or sequence of frames. The term "frame" derives from cellulose movies. As used throughout this disclosure with respect to digital video files, the term "frame" is used conceptually, and is not intended to be technically limiting. For example, data relating to a single frame of cellulose film may correspond to a single packet of digital information. Alternatively data from a single frame of cellulose film to be distributed across multiple data packets, or digital data representing multiple frames of cellulose film may be transmitted within a single or common data packet. Digital "motion algorithms" may include, but are not limited to, algorithms comprising a basic video file representing a single cellulose movie frame, information identifying the portions of that cellulose frame which remain unchanged for one or more subsequent cellulose frames, information describing those portions of the cellulose frame which change in subsequent frames, and/or extrapolation algorithms describing the motion of subsequent cellulose movie frames. Throughout this disclosure, therefore, the term "frame" is used conceptually to identify discrete aspects of a video file, but is not intended to limit a digital file to any one embodiment for depicting video motion.

In step 3607, the video program file is processed and stored in parallel. In an embodiment, a fixed number of parallel data storage members are assigned to the video file. For example, a video file may be distributed among "N" storage members. The value of N may be determined by the size of the video file, or my network characteristics. For example, the network may be configured to store video file among up to twenty distinct memory media. According to the size of the video file provided in step 3601, however, the network determines to fragment the video file among only 10 distinct memory members in a parallel storage format.

In an alternative parallel embodiment of step 3607, separate frames of the video file may be assigned values 1-N such that a video file is distributed across all "N" memory media members within a memory device.

In step 3609, the central server 118 receives a request for the video file from a video kiosk 105. The video file is transmitted from a central server (or from any other stores location, such as a local kiosk at a store the video file) to the requesting kiosk. The transmission may be over the Internet, or a LAN, and maybe in a serial, parallel, or fragmented format.

According to step 3611, the video file is downloaded by the video kiosk in a format supporting serial storage and processing with a synchronized audio file.

In step 3615, the video file data stream is stored in a manner such that sequential packets or frames can be accessed serially. This includes an embodiment wherein sequential data packets, frames, etc are stored on sequential cylinders of a high-performance drive array.

Figure 37:
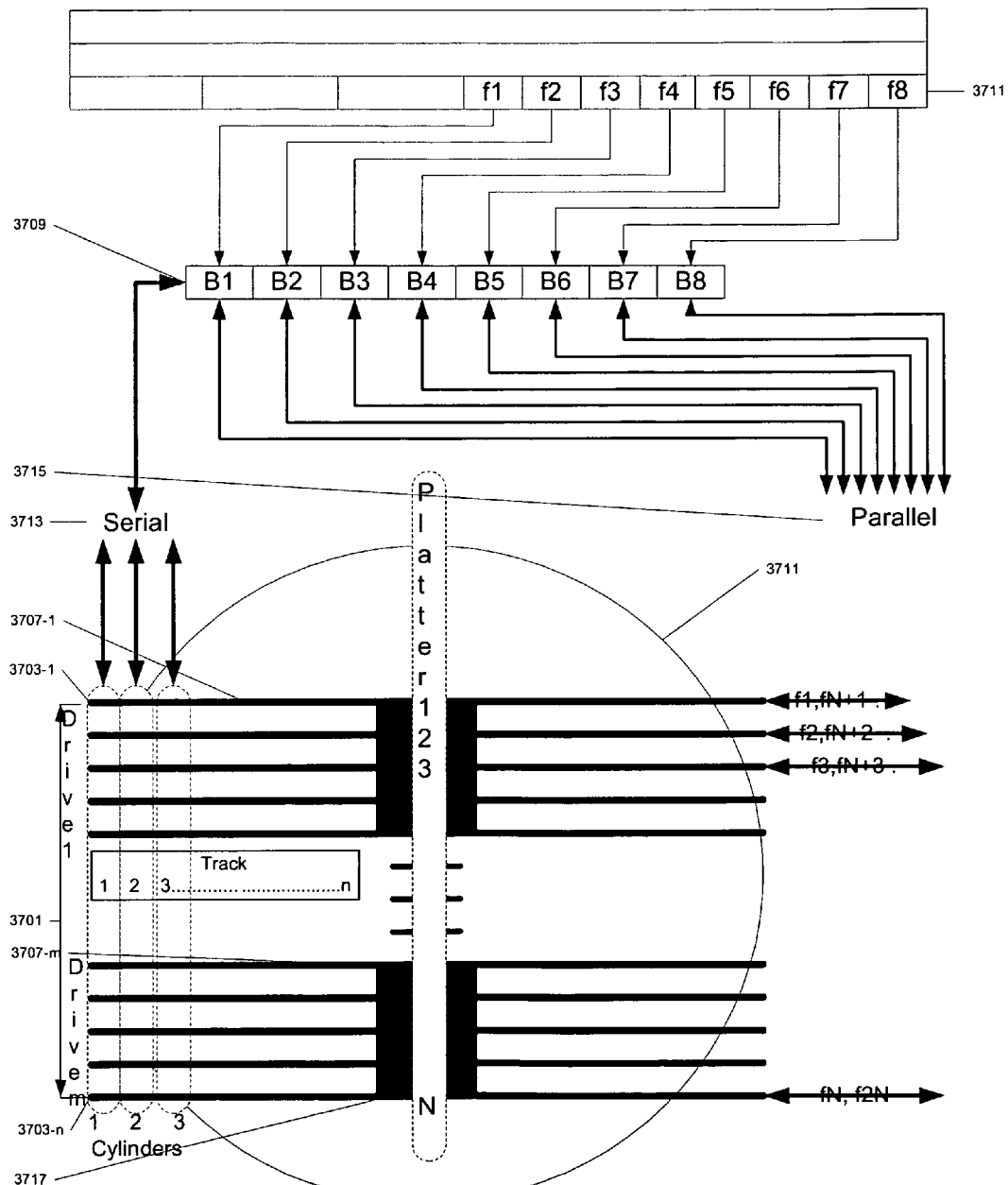
FIG. 37 depicts a high-performance drive array, including serial and parallel download paths of in incoming video file.

FIG. 37 depicts a digital file 3711 comprising digital frames f1, f2, f3 . . . through a fn being loaded onto a high-performance drive array 3701 through the agency of a data buffer array 3709. FIG. 37 includes alternative serial 3713 and a parallel 3715 embodiments for loading the digital file 3711 onto the high-performance drive array.

As discussed above, the use of the term "frame" in reference to f1, f2 . . . fn is not limited to an exact digital equivalent of a cellulose frame of the movie. Rather, the term "frame" is used for ease of explanation throughout this disclosure, and may refer to any file-portion of a digital video file.

Data buffer array 3709 is shown as including eight data buffers B1-B8. The exact number of data buffers is offered by way of example, and the data buffer array 3709 may include more or fewer data buffers.

High-performance drive array 3701 includes a plurality of platters 3703-1 through 3703-n distributed among one or more drives 3707-1 through 3707-m. The use of the value "n" as a termination number of sequential elements is not intended to show an intrinsic relationship between unrelated members sharing the terminal value "n." There is a one-to-one correspondence between the number of tracks and the number of cylinders. However, there is no correspondence between the number of tracks and the number of platters.

In an embodiment, platters within a same drive are configured to rotate in unison. The means by which independent platters rotate together can be mechanical coupling, pictured in FIG. 37 as a common spindle 3717, or independently rotatable platters controlled by an exact positioning device such as a servo-feedback mechanism. Combinations of mechanical coupling with minor position adjustment by an optical or electronic means are also envisioned. Similarly, separate drives 3707-1 through 3707-m may be configured to rotate simultaneously, either by mechanical coupling such as a common spindle 3717, or electronic control such as a servo-feedback, or combinations thereof.

Each individual platter 3703 comprises a digital media capable of storing digital information. In an embodiment, the digital media of a platter is divided into a series of tracks, shown as tracks T1, T2, T3 . . . T ω. Tracks are defined by logical partitions and/or magnetic orientations that divide a common recording media. Digital recording media may be divided and subdivided into any number of sections and sub-sections. Terms commonly used to denote these sections and sub sections include, but are not limited to, "tracks," and "sectors." The use of the term "track" within this disclosure is not intended to be limited to any particular level of sectioning or sub-sectioning, nor to any particular magnetic orientation, nor to any particular digital or magnetic means of defining separate sections. Rather, the term is offered in the most generic sense. In an embodiment, the tracks referred to herein comprise a ring oriented around the geometric center of a platter, or a portion of such a ring.

According to the embodiment of FIG. 37, each platter 3703-1 through 3703-n is divided into identically numbered tracks T1, T2, T3 . . . Tn, which are identically positioned on the respective platters, such that a group of identically numbered tracks form a logical "cylinder," C1, C2, C3 . . . Cn. For example, all of the tracks T1 among the various platters are logically grouped within cylinder C1.

In a download operation, the sequence of frames f1, f2 . . . fn, representing "frames" of digital video file 3711 are loaded into the data buffer array 3709, one frame per data buffer, and then loaded onto the high-performance drive array 3701. In an upload operation, frames of a digital video file are uploaded from the high-performance drive array 3701 into the data buffer array 3709. Downloading is performed for purposes of file storage within the high-performance drive array 3701. Uploading from the high-performance drive array may be performed for the purpose of loading a video file onto a portable high-speed memory device 131, or for the purpose of transferring the video file over the Internet (or a LAN) to another video kiosk 105. The serial and parallel data transfer operations described below are therefore directed to a download operation only for the purposes of example.

In a serial download embodiment 3713, the data frames f1, f2 . . . fn within the data buffer array are loaded from the incoming video file 3711 into the data buffer array 3709, and then down-loaded sequentially, one frame at a time, into the to the high-performance drive array 3701. In a serial embodiment, therefore, the data buffer array behaves, in some manner, similarly to a "FIFO" stack. Frames f1 through fn are thereby loaded one at a time onto the high-performance drive array 3701.

Because there is not necessarily a one-to-one correspondence between the data size of the video frame and the storage size of a track, embodiments are possible wherein a single video file is stored across multiple tracks, or multiple video files are stored on the same track, or wherein a single video frame is optimally stored in a single track. In the examples described herein in conjunction with FIG. 37, however, a video frame is depicted as having a digital size greater than the storage capacity of a single track, thereby requiring multiple tracks for storage.

In a serial embodiment, data is stored on sequential platters 3703-1 through 3703-n within a single cylinder before moving to the next cylinder. In embodiments wherein the drive heads of the respective platters are mechanically coupled, this approach reduces the frequency with which the drive-heads must be moved. By this approach, when data storage within a cylinder is completed, drive heads for the respective platters are simultaneously moved to the next cylinder. In an embodiment wherein a single frame requires memory space greater than a single track, a single frame is thereby distributed across multiple platters. For example, data buffer B1 begins loading frame f1 onto track 1 of platter 3703-1 until no usable storage space remains. Storage of frame f1 then commences on track 1 of platter 3703-2. The process continues distributing the data within data buffer B1 over successive platters until the storage of frame f1 is completed. Storage of Frame f2 from data buffer B2, will commence on the next available track of the same cylinder. When all tracks on cylinder 1 are consumed, writing begins with track 2 of platter 1.

Alternative embodiments may use different serial frame read/write protocols. For example, an expanded embodiment may support fragmented storage when the video frame cannot correspond perfectly to sequential tracks within a cylinder, or successive cylinders. In one embodiment, fragmentation may be achieved by thereby skipping over unavailable track(s) and going on to the next available track within the cylinder. A track may be unavailable the data is stored thereon, if the media is damaged, or for other reasons. Embodiments are variously envisioned wherein fragmentation will skip to a "next" platter within a cylinder, a next cylinder, or even skip to another storage drive. In an embodiment, a digital flag will indicate if data storage continues on the next track within the cylinder, or is fragmented to some non-sequential storage location. When successive frames of a video file are fragmented into non-sequential storage locations, digital addressing structures may utilized to identify a storage location of the next video frame. By utilizing flags to indicate whether or not storage is fragmented, processing resources for determining a next address are only consumed when a digital flag indicates that storage is not commenced at the next sequential track.

Referring still to FIG. 37, a parallel storage operation 3715 is depicted by a plurality of lines marked "parallel." In the first load cycle, successive frames f1 through f8 are loaded into data buffers DB1 through DB8 of data buffer array 3709. Each data buffer is assigned to a specific platter 3703 for storage of the data temporarily stored in the data buffer, and the contents of data buffers B1 through B8 are transmitted to respective platters of a single cylinder, shown, for purposes of example, as platters 3703-1 through 3703-n. In a "common cylinder" embodiment of a parallel storage operation, a single storage cycle in will direct individual frames to separate platters within the same cylinder 3705, such as cylinder C1 for load cycle one.

Assume, for example, a video frame requires three tracks for storage. In the first cycle of a parallel data download, the write heads (not pictured) of the various platters 3703 are uniformly disposed above track 1 of their respective platters, thereby aligning in cylinder C1. After usable storage within track 1 of the respective platters is exhausted, the write-heads of the various platters uniformly orient above track 2 of their respective platters, thereby aligning in cylinder C2. After usable storage within track 2 of the respective platters is exhausted, the write heads of the various platters uniformly orient above track 3 of their respective platters, thereby aligning in cylinder C3. According to the example, a single video frame may be stored on three tracks. Accordingly, video frame f1 is now stored across tracks 1, 2, and 3 of platter 3703-1, video frame f2 is now stored across tracks 1, 2, and 3 of platter 3703-2. Video frame f3 is now stored across tracks 1, 2, and 3 of platter 3703-3, and so forth. In the next load cycle, frames f9 through f16 are downloaded into the data buffer array 3709, and stored simultaneously on to respective platters.

In the parallel embodiment described above, the contents of data buffer B1 was always written onto data tracks of platter 3703-1, the contents of data buffer B2 was always written onto data tracks of platter 3703-2, and so forth. In an alternative parallel embodiment, after the contents of data buffer B1 has been written across successive tracks of platter 3703-1, data buffer B1 is reloaded with another video frame which is written on a different platter. This alternative embodiment can be appreciated in an example assuming a five data-buffer array B1 through B5, and two drives 3707-1, 3707-2, each drive having five platter, respectively defined as platters 3703-1 through 3703-5, and 3703-6 through 3703-10. In the first cycle, data buffers B1 through B5 right to successive tracks on respective platters 3703-1 through 3703-5. During a second download cycle, as the write heads corresponding to platters 3703-1 through 3703-5 are physically shifted, the next sequence of video frames f6 through f10 are loaded into data buffers B1 through B5, and respectively stored on platters 3703-6 through 3703-10. Again, write-heads respectively assigned to platters 3703-6 through 3703-10 simultaneously write to their respective platters within the same cylinder before the write-heads are collectively shifted to the next cylinder. The write heads continue to shift across successive cylinders until the contents of the data buffers has been completely stored. During the third download cycle, data is again written onto platters 3703-1 through 3703-5 as the write heads corresponding to platters 3703-6 through 3703-10 are repositioned. Other embodiments may incorporate alternative platter use patterns.

As described in conjunction with serial storage techniques described above, parallel storage techniques may similarly skip tracks, platters, or cylinders in the event of a defect. Fragmentation, such as skipping over a corrupted track or a corrupted cylinder, may be accomplished by the use of flags indicating fragmentation. When a status flag indicates data has been fragmented, address structures may be used to direct the write controller to the next storage address. Alternatively, the write controller (or, when the data is being uploaded, the read-controller) may simply skip to the next available data storage area in the normal read/write sequence.

Returning now to FIG. 36, steps 3613 and 3617 describe a parallel storage embodiment. The video file is downloaded by a local kiosk 105 in a format supporting parallel storage and processing with synchronized audio file. In parallel storage embodiments, video frames (or digital "packets" or some other sub-section of a video file) are stored in a manner whereby multiple frames may be stored or retrieved simultaneously. As illustrated in FIG. 37, parallel storage may be achieved on a physically separate storage media such as separate platters of a high-performance drive array. Alternatively, parallel storage may be accomplished on a common storage media accessible by multiple read-devices simultaneously. Examples of multiple read devices accessing common storage media, including those existing in those yet to be developed, may include, but are not limited to, multi-ported flash memory devices, and rotating media with multiple read-heads.

Step 3617 describes an embodiment wherein multiple frames are simultaneously stored on separate tracks within a cylinder of a high performance drive array, such as depicted in FIG. 37.

In step 3619, the video kiosk receives a request to load the video program into a hand-held high-speed memory device 131. Steps 3621 and 3625 describe an embodiment whereby the video file is serially transmitted and/or stored in a hand-held high-speed memory device. In step 3621, separate frames of the video file are read sequentially and sent to the processing unit is a stream. In step 3625, the processing unit processes of frames is sequentially and passes them over a single channel to the hand-held high-speed memory device for storage.

Steps 3623 and 3627 describe a parallel embodiment for transmission from the video kiosk to the hand-held high-speed memory device and or storage within the hand-held high-speed memory device. In step 3623, multiple frames of the video file are read simultaneously from their respective storage locations and loaded into the processing unit in parallel streams. In step 3627, processing unit simultaneously processes multiple frames in parallel, and transmits them over a multi-channel interface to the hand-held high-speed memory device for storage.

The alternative serial and parallel processing steps described above may also be used for transferring a video file from the hand-held high-speed memory device 131 to the video player 305 of FIG. 3, and/or the personal computer 321 of FIG. 3.

Network Management and File Seeding

Figure 10:
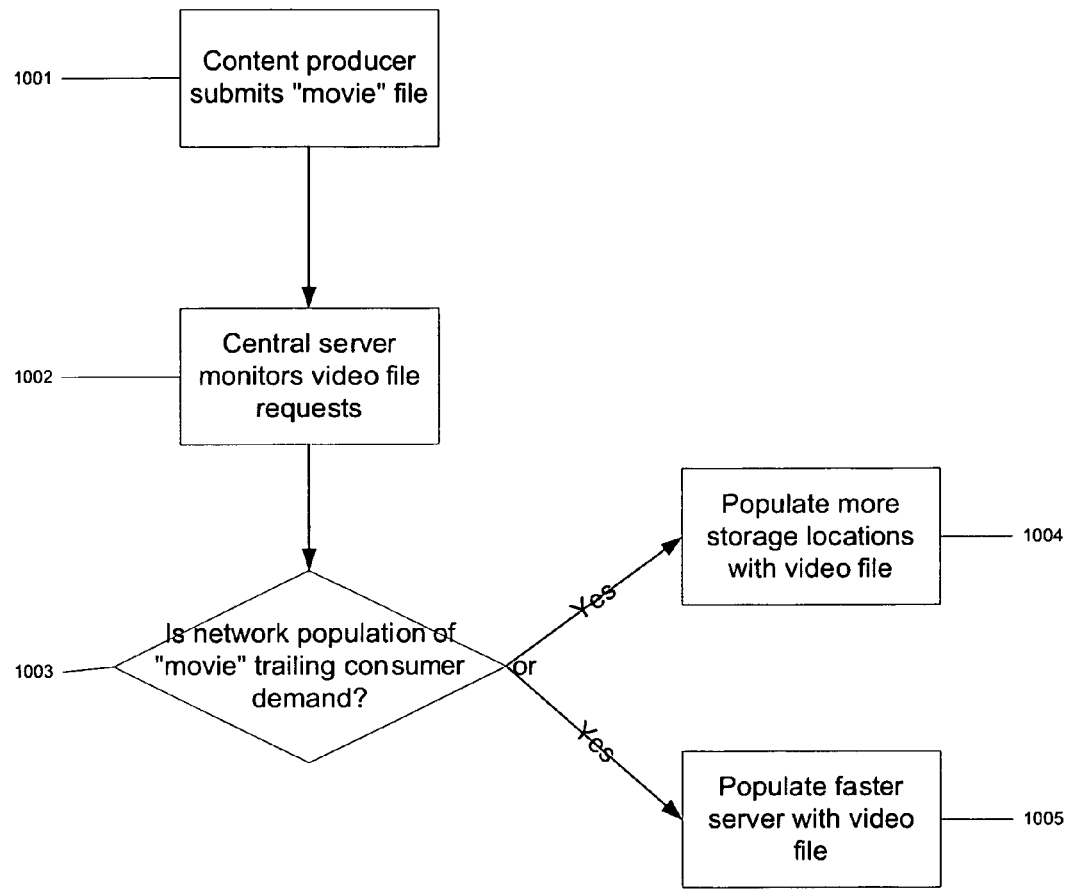
FIG. 10 depicts an embodiment of a process for populating the video network of FIG. 1 with a particular video file at a sufficient number of the network locations necessary to satisfy consumer demands.

FIG. 10 discloses a process by which the video network 101 is seeded with video files. In step 1001, a content provider submits a video file to the video network 101. Submission includes uploading the video file, ancillary files such as languages in some titles, and controllable parameters which determine whether the movie is shown with or without scenes of nudity, sexual situations, profanity, violence and so forth. The submission also entails business prerogatives such as triggers governing advertising, the frequency of advertising, the formats of advertising, and so forth. A content provider may also designate the number of video kiosks in which the file is to be stored. This option can be appreciated in view of the fact that video file download of a high-definition feature-length movie may be accomplished in a matter of minutes if the video file is resident within a kiosk, but may take a day if the video file must be transferred from another kiosk or storage site via the Internet. As "next generation kiosks" become available, a business prerogative may also include selection of a particular type of video kiosk or storage location having greater or lesser speed and reliability than other storage locations. Contractual agreements with a content provider may also identify specific or general locations at which a copy of the video file must be stored. Depending on the need of a local kiosk to incorporate various business prerogatives in its operation, some contractual business prerogatives may be transferred to a local kiosk, and other contractual business prerogatives may be stored exclusively in the central server 118.

In step 1002, the central server monitors video file requests. In step 1003, if a particular video file is subject to frequent requests by users, then in step 1004, the central server may determine to populate more kiosks and storage locations with the video file. Alternatively, or in conjunction with step 1004 the central server may determine to populate faster servers with the video file, according to step 105. By the process described in FIG. 10, and video file is seeded throughout the video network in a manner that will ensure rapid file transfer to facilitate file download by users, thereby maintaining a higher level of customer satisfaction.

Local and Network Wide Inventory Management

Video files are stored within distributed storage locations throughout the network 101, such as various local video kiosks 105. When a request is made for a video file at a video kiosk that does not currently store that specific video file, the file must be transmitted to the requesting kiosk from another storage location. It can readily be appreciated, however, that if no video files were ever purged from the memory of a local kiosk, each kiosk would have to be equipped with an extraordinary, and ever growing, amount of digital storage space.

The term "cache management" is typically used to refer, at least in part, to the algorithms and methods for identifying data to be retained and data to be expunged from a data cache. Because data transmission, even at the speed of light, takes time, the nearer that data is stored to a processing unit, the more quickly the processing unit can process that data. A "data cache" is typically a small digital storage area, such as one integral to a microprocessor, which eliminates the need to access data in a separate memory area, thereby speeding up the processing of that data. Various mathematical and logical algorithms are used to estimate the likelihood that a given piece of data will be required in forthcoming processing activities, and to maintain storage of the highest priority data within a data cache. When the average time for retrieving data is reduced, processing time is also reduced. The decision to keep or expunge data from a cache, introduce new data, and/or prioritize data stored within a cache is typically known as "cache management." Although the scope and scale of local and network wide inventory management described herein involves digital storage capacities many magnitudes greater than commonly associated with the term "cache," many of the objectives, concepts, algorithms, variables and/or considerations commonly associated with "cache management" are relevant in the inventory management at the local (kiosk) and network level. That is, local and network wide inventory management systems control an optimal inventory of multimedia files at individual video kiosks 105 and storage locations 117 throughout the entire video network 101. However, the use of the term "cache management" is not intended to limit inventory management at the local kiosk or general network levels to existing cache management principles and algorithms. For example, network level inventory management ("super-cache management") may be required to maintain a minimum number of identical multimedia files distributed among different local kiosks and/or mass storage devices, a problem one would not expect to find in traditional cache management applications. Additionally, many decision-making functions are optimally delegated to individual kiosks, requiring network level inventory management to consider, as part of its management duties, continually changing inventory levels and allocations that were not specifically directed at the network level. Once again, one would not expect to find a problem of this nature addressed by simpler cash management algorithms commonly in use.

Accordingly, the embodiments described herein fully comprehend known cash management algorithms and methods, as well as envisioning new algorithms and methods uniquely directed to inventory management and allocation of multimedia files within the network described herein.

The local inventory management system identifies video files to be retained and/or video files to be purged from storage within a local video kiosk the local memory 123 of a local video kiosk 105. The local inventory management may include local management duties performed within a local video kiosk, global local inventory management duties performed within the central server 118, and combinations of both.

FIG. 11 illustrates an example of a Local Video Kiosk Cache Management Index 1100, including examples of various cache management parameters that might be found within the Local Video Kiosk Cache Management Index 1100 in association with specific video files. These cache management parameters determine the conditions under which a video file is to be retained or expunged from the local memory 123 of a local video kiosk 105. Within the example of FIG. 11, the video file of the movie "The Four Horsemen of the Apocalypse," the 1921 blockbuster starring Rudolph Valentino, is not assigned a cache priority. Lack of a cache priority indicates that it will be scheduled to be expunged from the local memory 123 of video kiosk 105-A at some future time, as determined by parameters 1107, 109, and 1111. According to column 1105, "The Four Horsemen of the Apocalypse" has not been downloaded to the local video kiosk yet. It is scheduled for download to video kiosk 1105-A no later than 5:45 p.m. for the convenience of the user who ordered this film. According to column 1107, it is guaranteed to be retained within the local memory 123 of video kiosk 105-A until at least 8:00 p.m. According to column 1109, download by the user who ordered "The four Horsemen of the Apocalypse" will trigger the expunging of this video file from the local memory 123 of video kiosk 105-A. This determination is made by the central server 118 in view of consumer demand of this video. Alternatively, if the user who ordered this movie does not show up by midnight, the movie will be expunged at midnight.

If there is a lengthy backlog of file transfer times between video kiosks, a user placing an order and kiosk could be advised to come back at a later time.

Figure 12:
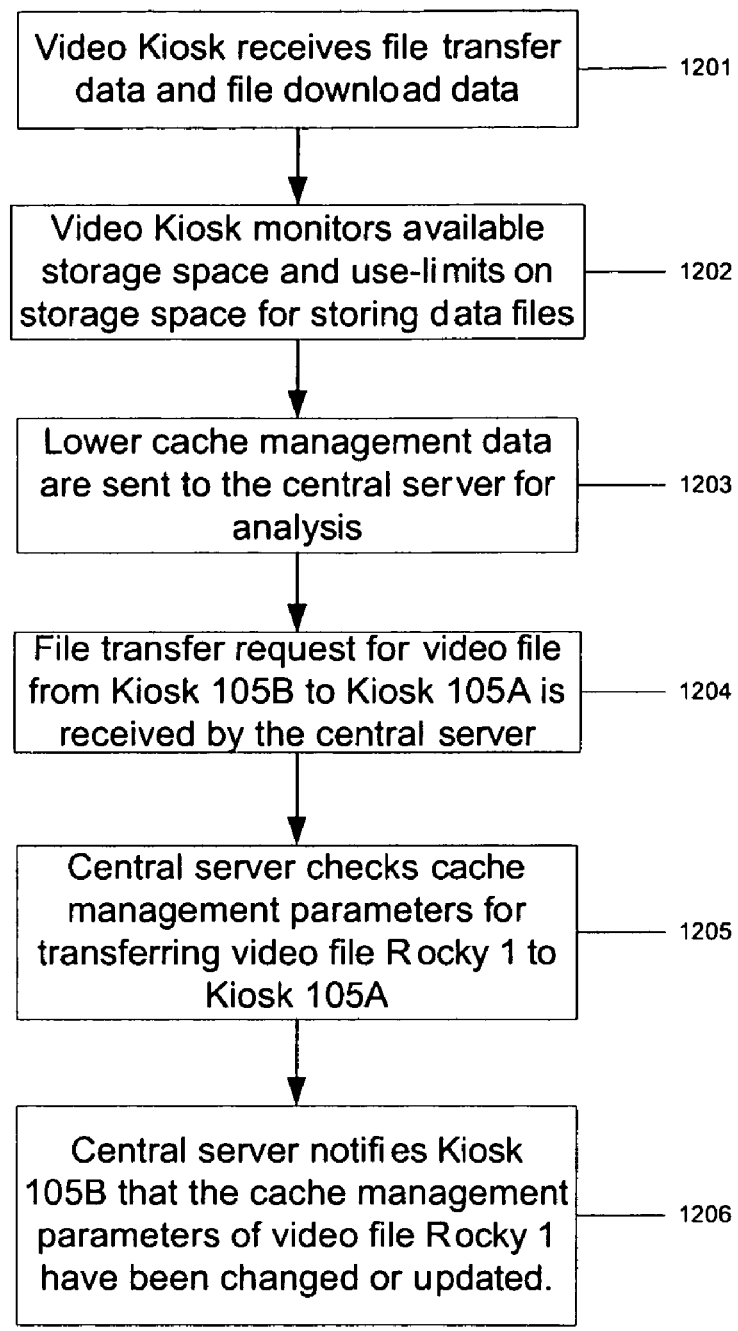
FIG. 12 depicts an embodiment of a super-cache management algorithm for managing the inventory of video files distributed throughout the network of FIG. 1.

Within FIG. 11, the video files of the movie, "Goldfinger," "The Terminator", and "The Matrix," are not scheduled to be expunged from the local memory 123, but have been assigned cache priority values. A cache priority value may indicate, among other things, the frequency of download of a particular movie. The higher the cache priority value, the more likely the movie will be requested by additional users. If a movie is requested by users more frequently, expunging the movie from the local memory 123 would mean that an Internet transfer from another storage location will be required as soon as another user again requests that movie from kiosk 105-A. In the example of FIG. 12, letter values A, B, C, D, and E are used for cache priority values, with the letter A being the highest priority value, in the letter E being the lowest priority value. In cache management therefore, the movie "Goldfinger" will be the first to be expunged, if necessary, to free up storage space in the local memory 123 of video kiosk 105-A for incoming video files. Within FIG. 11, no priority value has been assigned to the four "Horsemen of the Apocalypse" since the cache management of this movie is controlled by time driven and event driven parameters, 1107, 1109, 1111, rather than a priority value relative to other movies. In an embodiment, the cache management parameters assigned to a video file are not global, but are dependent upon the geographic location of a video kiosk. For example, a film that is highly artistic in nature, but with little action, may not even receive a cache priority value at the video kiosk of a suburban shopping mall due to the lack of frequency with which it is requested there. It is simply given an expungement time, as illustrated in FIG. 11 with "The Four Horsemen of the Apocalypse." On the other hand, the same highly artistic film may have a greater demand in a more Bohemian geographic locations, such as Cambridge, Mass. or Greenwich Village, N.Y. Accordingly this highly artistic film might be given a cache priority of "D" in Cambridge, Mass., and the cache priority of "B" in Greenwich Village, N.Y.

Within FIG. 11, the movie "Modern Times" with Charlie Chaplin has been assigned a protected cache priority value. This can be used, for example, to ensure that the movie "Modern Times" is never completely expunged from the entire video network 101. The video kiosk associated with the cache management Index of FIG. 11 has been designated as a permanent storage location for the movie "Modern Times" by the central server 118, thereby accounting for its protected status. Movies that are in low demand may be stored in predetermined storage locations on the network with a protected cache priority status. If Modern Times is transmitted from video kiosk 105-A to video kiosk 105-B, the protected status will not be duplicated in the cache management Index of video kiosk 105-B. Rather, the central server 118 will determine the appropriate cache management parameters for kiosk 105-B based, at least in part, on the frequency of user requests for this video file at video kiosk 105-B. The video file however will remain in a protected state within the sending kiosk.

FIG. 12 illustrates an embodiment of a cache management (inventory management) system. In step 1201, each video kiosk 105 within the network records the outgoing file transfer data relating to file transfers to and from other kiosks or storage locations 117. Each video kiosk also records file download data relating to the frequency of file downloads of a particular video file by users. Download data may include but is not limited to the number of file transfer requests or download requests by users over a given period of time, and the speed with which those requests were satisfied.

In step 1202, the video kiosks 105 and stand-alone storage members 117 within the network monitor their available storage space and use-limits on storage space for storing data files. Use-limits are determined by the available memory space, and by cache management parameters assigned to the various files within a video kiosk 105. For example, if a video kiosk has very few movies marked by a high cache priority, and very few protected or "time protected" video files, the local storage number 123 of the video kiosk 105, has a great deal of potential storage space. Movies having a lower cache priority can be expunged without the likelihood that they will be re-ordered by a user minutes after they have been expunged. On the other hand, a kiosk may have a high number of video files that were ordered by personal computer over the Internet, and which have a guaranteed retention time ("time protected"). Until they are downloaded by the user who ordered them, or until their guaranteed retention time has expired, these video files reduce the available storage space for incoming file transfers.

In step 1203, relevant cache management data associated with kiosk 105-A, including but not limited to data described in steps 1201 and 1202, is sent to the central server 118 for analysis. In step 1204, a file transfer request for video file "Rocky" (also called "Rocky 1" due to subsequent movies of the same character) is received from kiosk 105-A. The central server 118 directs video kiosk 105-B to transmit the video file "Rocky" to kiosk 105-A.

By comparing and analyzing local cache management data, the central cache management system can generate commands to update the cache management parameters associated with Rocky at the sending kiosk, as well as kiosks not participating in the data transfer, but which store "Rocky." Update commands may include commands to expunge specific files from specific kiosks. Reports to the central server may be event driven, time driven, or both. An example of an event driver report would be to generate a cache management report (or request) when the less than 10% of the available memory in the local data storage member was available for receiving file transfers. An example of a time driven report (or request) would be an hourly report of local cache management data within a local video kiosk.

In step 1205, the central server assigns cache management parameters to the video file "Rocky" which is being transmitted to the video kiosk 105-A. In step 1206, as a result of analysis of cache management data, the central server notifies kiosk 105-B of a change for the cache management parameters of the video file "Rocky".

An example of a simple cache management algorithm would be to always replace files having a lower cache priority value with incoming files having a higher cache priority value. For example, referring briefly to FIG. 11, if no storage space remained within the local storage number 123, the lowest priority movie, "Goldfinger", would be expunged to create storage space for the incoming video file. This decision could be made by a local cache management module within the local video kiosk 105-A. Notification however would be sent to the central server 118 to ensure that the central index 120 was updated.

More complex aspects of a cache management system can be illustrated by the following example, and still referring to FIG. 11: Statistics within the central server have shown that video file that was ordered through a personal computer over the Internet has only a 5% chance of being downloaded by the requester if the download has not occurred by eight o'clock in the evening, a 1% chance of being downloaded after nine o'clock in the evening, and a 0.02% chance of being downloaded after 10 o'clock in the evening. Prior to seven o'clock, a movie such as "The Four Horsemen of the Apocalypse" slated to be expunged as midnight will be given priority over all other movies. That is, an incoming video will overwrite the lowest priority video, starting with videos having a priority of E. If no videos of priority E are stored within the local video kiosk, and incoming video file will overwrite a stored file of priority D. This process will continue on upward to files having a priority of A. From seven o'clock to 8:00 p.m., "The Four Horsemen of the Apocalypse" will be given cache management priority above file priorities E, D, C and B, but not above A. Accordingly, incoming file transfer requests received between seven o'clock and eight o'clock will first seek available file space. If no file spaces available, the incoming video file will seek to overwrite video files having a cache management priority of E. If no such files are available, an incoming video file will seek to overwrite files having a cache management priority of D. This process will continue up to files having a cache management priority of "B." Before overwriting a file and the cache management priority of "A," and incoming video file overwrite "The Four Horsemen of the Apocalypse," which is scheduled to be expunged at midnight, and only has a 5% chance that the requesting user will show up to download the video file. Between eight o'clock in the evening and nine o'clock in the evening, the four horsemen of the apocalypse will be given cache management priority above priorities C, D, and E. Because there is now only a 1% chance that the user who ordered "The Four Horsemen of the Apocalypse" will not show up, this movie is no longer given cache management priority over popular movies having a file priority of A or B. Between 9:00 p.m. and 10:00 p.m., "The Four Horsemen of the Apocalypse" will be given cache management priority over priority values D and E only. Priority values A, B, and C all have priority over "The four Horsemen of the Apocalypse" by this time. Between 10:00 p.m. and 11:00 p.m., cache management priorities A, B, C, and D are all placed above "The Four horsemen of the Apocalypse." Between 11:00 p.m. and 12:00 midnight, the probability of a user showing up to download "The Four Horsemen of the Apocalypse" becomes so low, that cache management priorities A, B, C, D and E are all given priority above "The Four Horsemen of the Apocalypse." That is, if no storage space is available in kiosk 105-A, after 11:00 p.m., and incoming file will overwrite "The Four Horsemen of the Apocalypse" rather than overwriting any of the files assigned a priority value. It is more complex cache management example, it can be seen that, as the likelihood of the movie being downloaded by a consumer decreases, it is assigned a lower priority.

A first goal of a cache management system is to ensure that no video file is inadvertently expunged entirely from the network. A second goal is to maximize the probability that a user logging onto a local video kiosk will find a requested video file stored locally, thereby eliminating potential Internet delays and consumer annoyance or dissatisfaction. Other important goals may also govern the cache management of video network 101 at the local and network level.

The Central Index

FIG. 23 discloses an embodiment of the central index 120 shown within the central server 118 of FIG. 1. The first column 2301 shows a listing of movies available on the network. The second column 2303 shows the video kiosks at which the various digital videos are stored. Column 2305 shows the cache priority assigned to the various videos within their respective kiosks. To ensure that a video file is never completely expunged from the video network 101, it will be noted that there is at least one protected copy of "Superman I", "Ben Hur", "Gone With the Wind", and "Modern Times", listed within the cache priority column 2005. Because file corruption can take place during the transmission of a video file, the strategy of permanently storing at least one copy of a digital video file in a protected status within a video kiosk ensures that at least one copy of the video file available on the network is uncorrupted.

Column 2307 lists the advertising parameters associated with a particular movie. "Spiderman" one includes both JPEG (still picture) advertisements, and MPEG trailer (a short movie clip). "Ben Hur" and "Gone With The Wind" have contracted only for JPEG advertising, and do not have MPEG trailers available on the network. "Modern Times" with Charlie Chaplin does not have any advertising available on the network. The data displayed in column 2307 is offered as an example. In application, more extensive information governing advertisement on the video network 101 would be associated with each video file. This information would include, but is not limited to, frequency of advertising, size of the video portion of the advertisement, events triggering the advertisement, cost of the advertisement, and so forth.

Column 2309 discloses the available languages for each respective video file. Column 2311 records whether the movie includes profanity, and whether the profanity is controllable. "Spiderman I" is shown to include profanity, but is also shown to be controllable. By selecting this parameter, parents could download the movie "Spiderman I", and include within the download of this movie a controllable parameter such that the movie could be played on a video player 305 and have any profanity replaced by more socially acceptable terms, or "bleeped out". The particular controls available for profanity would be determined by the content provider. The network however would establish standards to ensure uniformity among video files, ancillary files, and controllable parameters. The movie "Ben Hur" is listed as having no profanity occurring. The movie "Gone With The Wind" is listed as having profanity. However, a copyright holder has the option of including or not including various controllable parameters. Referring still to FIG. 23, in the case of "Gone With the Wind," the only "profane" line is the famous line, "Frankly my dear, I don't give a damn." If a copyright holder determines that the profanity is either insignificant, essential to a movie, or both, the copy right holder does not have to provide an ancillary file with time stamps configured to replace the word "damn" with some other word. As a consequence, the option of including an "edited version" (which may simply be flags identifying a phrase for removal with or without a substitute phrase on an ancillary file), this parameter is not subject to user control. The movie "Modern Times" with Charlie Chaplin was a silent film, and therefore has no profanity. Within FIG. 23, column 2309 is representative of one form of an ancillary file that may be associated with the movie, and column 2311 is intended only as an example of the sort of controllable parameters that may be associated with a movie. The ancillary file and parameter categories listed in conjunction with the central index 120 a FIG. 23 are therefore offer by way of example, and are not intended to limit the various categories that may be listed within the central index.

Encryption, Watermarking, and Content Protection

Embodiments of the system described herein include various forms of copy protection, including digital watermarking and digital encryption. Digital values used for digital encryption and/or watermarking can be derived from a variety of sources and method. Accordingly, the listing of sources and methods for generation of watermarks and encryptions described herein are offered by way of example to enable the reader to more fully comprehend, make, and use the embodiments described herein. The appended claims are not intended to be limited by these examples, but rather, fully comprehend alternative embodiments utilizing encryption keys and/or watermarks generated or provided from any source, as well as any known means of encrypting or watermarking, including lossless encryption, and a lossy encryption techniques.

According to an embodiment, watermarks and/or encryption keys may be derived from alternative sources, or any combinations of a unique device ID and alternative sources. Alternative sources include, but are not limited to, a time or date such as the time and/or date at which a download sequence takes place from a local kiosk 105 to the portable high-speed digital memory device 131, the unique device ID 115 of a local kiosk 105, the unique device ID 129 of the proprietary high-speed memory device 131, from the unique device ID 130 of a playback device, values generated by the central server 118, values generated by the local kiosk 105, user IDs assigned to individual users, or any combination of the above values. Two primary embodiments offering distinct copy protection can be derived from these options. These primary alternative embodiments are referred to herein as the "encryption by playback device ID" embodiment, and the "encryption by memory device ID" embodiment. Each offers unique security features.

Encryption By Playback Device ID

Referring briefly again to FIGS. 1 and 3, embodiments are envisioned wherein encryption or watermarking (or both encryption and watermarking) is based, at least in part, on a unique device ID embedded in a digital device. The term "playback device ID" as used herein refers to any device ID in any portion of the playback system, including a video display screen, a decryption module, a personal computer, or a video player physically separate from the video display screen. As noted in conjunction with FIG. 3, the video player 305 is depicted as physically distinct from the video display device 323 more effectively enable the reader to make and use the embodiments described herein. Although the video player 305 may be separate from the video display device 323, in a preferred embodiment, of encryption by playback device ID, the decryption module and a connection port are integral to the video display device 323, and the unique playback device ID is non-erasably embedded in the decryption module within the video display device.

In another preferred embodiment encryption by a playback device ID, the unique playback device ID is inaccessible to users. It cannot be read, and cannot even be upload into a proprietary high-speed memory device, or any other digital probing device. The unique playback device ID may be permanently and non-erasably stored in a register within a decryption module to 339, 341. A unique publicly disclosed identifier corresponding to the unique playback device ID, is digitally stored in, or written on the playback device. Upon presenting the publicly disclosed identifier to the network, the network retrieves the unique playback device ID corresponding thereto from any device ID correlation table. And encryption key is derived, at least in part, from the unique playback device ID, which is inaccessible to users. Additional data such as date and time may also be used in the generation of the encryption key. The video file selected by a user is encrypted according to this encryption key and downloaded to the user's portable high-speed memory device. The video file is then downloaded to the playback device. Unique device ID within the decryption module decrypts the video file during playback. Because the unique playback device ID is only transmitted over proprietary network infrastructure, it is nearly impossible for a hacker to intercept this number. Network security can be even further enhanced by encrypting a unique playback device ID when transmitted from a central server to a kiosk, and decrypting it within the kiosk, thereby eliminating any transmission of the unique playback device ID. By denying a hacker access to any device ID, the execution of unlawful distribution is further frustrated.

Figure 13:
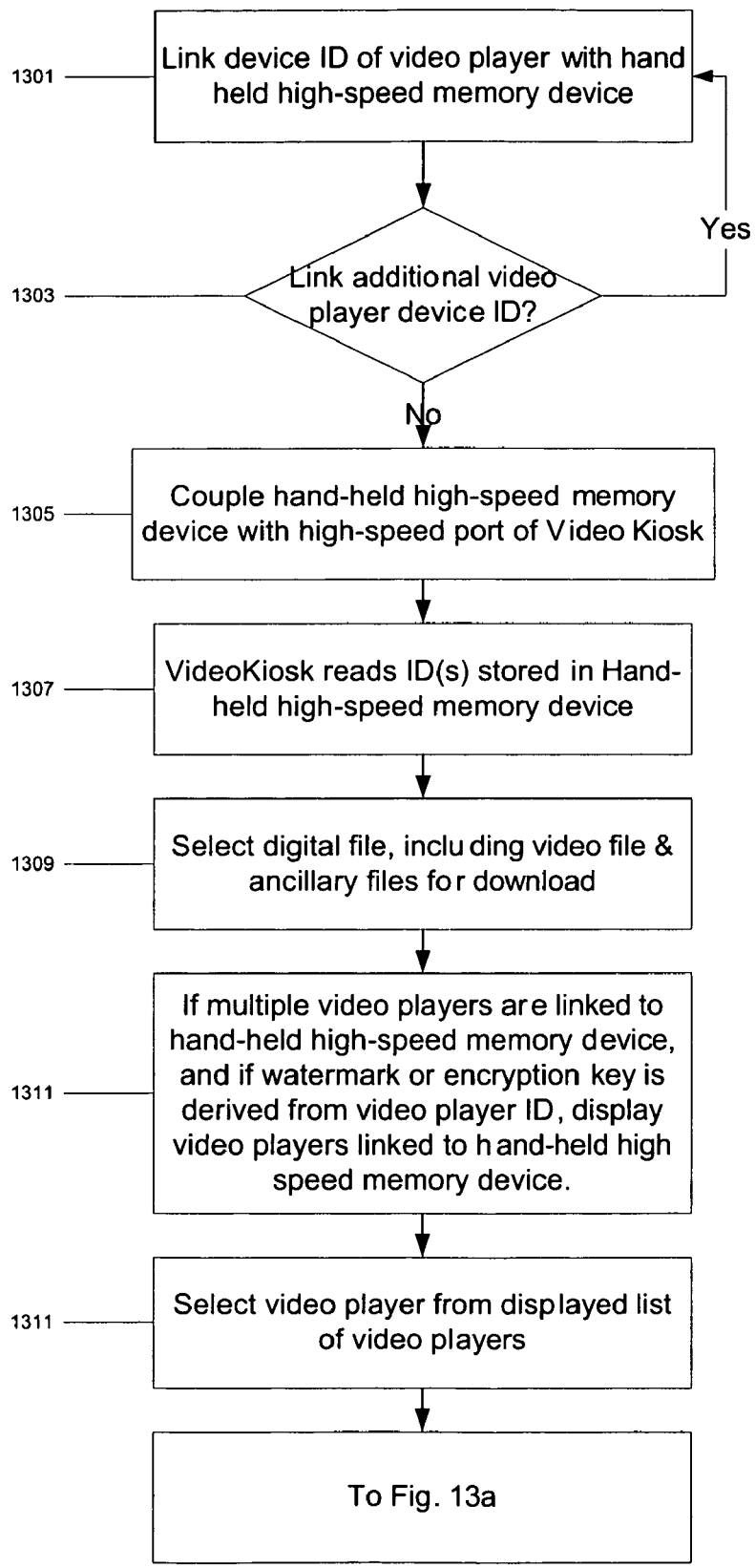
FIG. 13 depicts an embodiment of an encryption algorithm for storing an encrypted video file in a portable high-speed memory device.
Figure 13A:
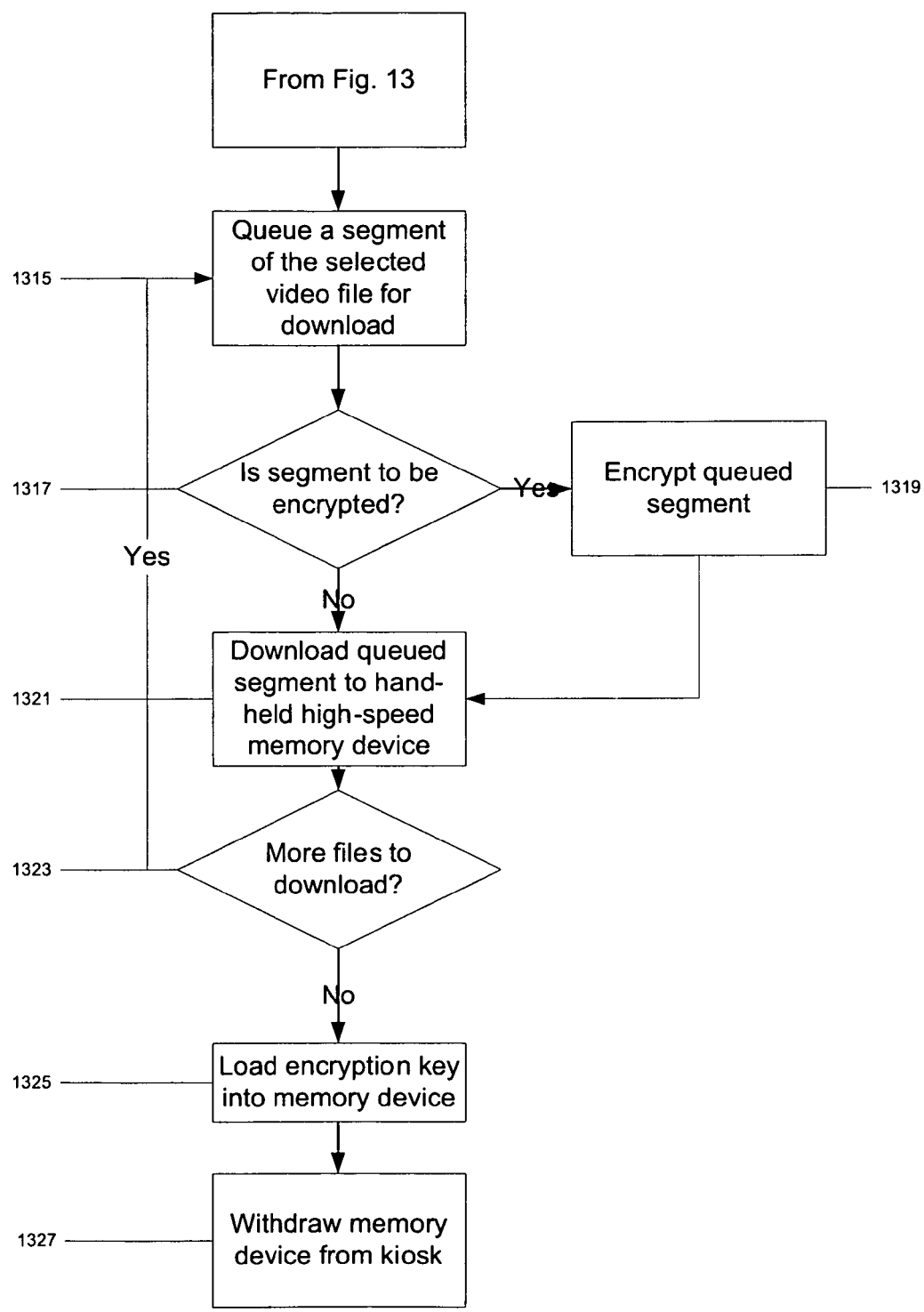

FIG. 13 depicts an encryption process for use in conjunction with the distribution of multimedia files wherein a decryption key resides in a playback device, and more preferably, within a decryption module in a video display device. Although the following steps are described in terms of the preferred embodiments, wherein the actual device ID cannot be read by a user, or even downloaded to a memory device, wherein the device ID is on a recently embedded within the decryption module, and wherein the decryption module is integral to the video display device, these specific features are not essential to the more general application of the steps disclosed in FIG. 13, and should not be construed as limiting those of steps to these specific features.

In step 1301, the unique device ID is embedded in a digital device at the time of manufacture. The unique device ID is preferably stored in a nonvolatile, non-erasable format within a decryption module 339 of a video display device 337, but may be stored in another area of a playback device. According to a preferred embodiment the unique device ID is preferably not readable, and is stored in such a manner as to impede any attempts to detect, read, or download this value. A unique public identifier corresponding to that unique device ID, is also stored within that digital device at the time of manufacture.

In step 1303, a user assigns a name to the device in which the unique device ID is stored. This name is stored within a "name register" within that device.

In step 1305, a portable high-speed memory device 131, is coupled with a playback device.

In step 1307, the unique public identifier and the user assigned device name are uploaded from the playback device to the portable high-speed memory device. Throughout this disclosure, it is understood that the unique public identifier and the user assigned device name are preferred embodiments, but that the steps described herein can be performed directly using the device ID without use of a unique public identifier or of a device name. Last preferred embodiments are also envisioned wherein unique public identifier of a playback device is non-erasably stored in a portable high speed memory device at the time of manufacture, thereby linking the portable high speed memory device to a specific playback device.

In step 1309, one or more additional unique public identifiers representing additional playback devices are uploaded for storage in the portable high-speed memory device, as well as the user assigned device names corresponding to those respective unique public identifier. By allowing a user to store additional unique public identifiers and the corresponding device names single portable high-speed memory device 131, a user is able to select a specific video player for which a video file is to be encrypted.

In step 1311, a user downloads the public identifier of a playback device to the network via a user interface. This interface may include, but is not limited to, a personal computer accessing the network via the Internet, and input interface and a network kiosk. This information may be stored in a user account on the network, or may be limited to a single encryption.

Because many of the steps within FIG. 13 may be executed from the input 109 of a video kiosk 105 or from a personal computer 321 of the user, the order of the steps in FIG. 13 is not fixed, and is offered only as an example of an order in which steps may be arranged. This order of steps may be altered in alternative embodiments.

In step 1313, the portable high-speed memory device is coupled to the high-speed memory port 113 of the video kiosk 105.

In step 1315, the video kiosk reads the publicly disclose identifier(s) (or device IDs) within the portable high-speed memory device.

In step 1317, the video kiosk displays the names of all publicly disclosed identifiers within the portable high-speed memory device on a display screen, requesting that the user select the playback device for which the encryption should take place. This step is optional, and may be dispensed with if only one publicly disclosed identifier is stored within the portable high-speed memory device.

In step 1319, the user selects the playback device for which the encryption should take place.

In step 1321, the user selects a multimedia file for download. If selectable parameters (e.g., censorship of nudity, obscenity, etc.) and/or ancillary files (e.g., alternative languages) are available, the user may also select these options, or may choose to download a default form of the multimedia file.

In step 1323, the kiosk transmits the publicly disclose identifier to the central server and requests the corresponding device ID.

in step 1325, the central server accesses an index correlating each unique public identifiers to a corresponding unique digital device ID 130, and identifies a unique digital device ID requested by the network. An example of a central index is disclosed in FIG. 14.

Referring briefly to FIG. 14, a device correlation table 1400 stored within the central server 118. A device type is disclosed in the first column 1401. The device type may include revision data distinguishing equivalent devices. Device type listed in the first column include portable high-speed memory devices, video kiosks, and video players. The second and third columns 1403, 1405 of FIG. 14 correlates publicly disclosed identifiers of a particular device with the unique digital device ID. The unique digital device ID is not publicly disclosed, and is preferably stored or embedded within a piece of hardware in such a manner as to frustrate detection or decoding by would-be hackers and software pirates. The concealing of the unique device IDs 115, 129, 130 from public discovery thereby adds an additional layer of security to the encryption process.

In step 1327, a central server encrypts the unique digital device ID, and transmits the encrypted value to the requesting kiosk.

In step 1329, the network kiosk decrypts unique digital device ID, and generates an encryption key there from. As discussed above, the encryption key may be generated from a combination of sources in addition to the unique digital device ID.

In step 1331, a file segment of the select video file (including ancillary files and selectable parameters) is queued for download from the video kiosk 105 to the portable high-speed memory device 131.

In step 1333, a determination is made as to whether the select file segment is to be encrypted. If the select file segment is selected for encryption, then, in step 1333, a queued segment is encrypted.

In step 1335, the segment is downloaded to the portable high-speed memory device 131. As noted above, encryption keys may be selected from, but are not limited to a unique device ID 129 of the portable high-speed memory device, 131, a unique device ID 130 of a particular video player 305, a unique device ID of the video kiosk 105 performing the download, the time and date of the download, and combinations thereof.

In step 1337, a determination is made as to whether any file segments remain for download. If file segments remain for download, the process returns to step 1331.

In step 1339, if additional information was used to generate the encryption key, such as the kiosk number, date, time, etc., this information is downloaded to the portable high-speed memory device. It would be downloaded in an encrypted or an unencrypted form. In a less preferred embodiment, the entire encryption key is downloaded to the portable high-speed memory device. As discussed above, in a preferred embodiment, this step is unnecessary since the unique device ID necessary for decryption is stored within the decryption module, or some other area of the playback device.

In step 1341, the portable high-speed memory device is withdrawn from the high-speed port 113 of the video kiosk 105.

In step 1343, the encrypted file is downloaded into the playback device for which it was encrypted. Because the encrypted file can only be played on the specified playback device, storage on the encrypted file in multiple storage locations allows a user to protect against theft, loss, or corruption of the encrypted file without jeopardizing the intellectual property rights of the copyright holders.

To decrypt the digital video file, the decryption module must have the device ID with which the video file was encrypted. The decryption key corresponding to a particular encrypted multimedia file is downloaded into a volatile decryption key register within the decryption module prior to viewing the multimedia file. A volatile decryption register within the decryption module affords a high level of resistance against hackers attempting to identify a device ID or decryption key for unlawful duplication and distribution of copyrighted material.

Embodiments are envisioned for both rental and purchase of a video file. In rental embodiments, a user may be prevented from downloading the encrypted file from the proprietary high-speed memory device to a mass storage device. When purchased, however, and encrypted multimedia file may be stored within a mass storage device.

Encryption By Memory Device ID

In an alternative preferred embodiment, multimedia files are encrypted according to an encryption key derived from the device ID of the hand held high speed video device into which they are downloaded. When the proprietary high-speed memory device is coupled to a publicly accessible kiosk, the device ID, or a publicly disclosed identifier correlated thereto, is uploaded to the kiosk. In a memory device ID embodiment, however, the memory device ID must be downloaded to a playback device to facilitate decryption. An exception to this requirement is one in which a handheld high-speed memory device is paired with a playback device at the time of manufacture. And embodiment which included such pairing, and limited play on a particular playback device however, as the same user limitations as the "playback device ID" embodiment discussed above. The user would be restricted to playing a video file on the paired playback device. Accordingly, the "memory device ID" embodiment discussed herein will not include discussion of a publicly disclosed identifier. However, the following discussion envisions embodiments utilizing a publicly disclosed identifier, as well as embodiments utilizing the memory device ID, or information derived therefrom.

In a first step, the portable high-speed memory device is coupled with a network kiosk.

In the second step, a user selects a movie or multi-media file for viewing, including ancillary files and other options discussed in conjunction with FIG. 13.

In the third step, the memory device ID or information divide there from is uploaded to the network kiosk.

In a fourth step, the selected multimedia file is encrypted according to an encryption key derived, at least in part, from the value uploaded by the proprietary high-speed memory device, and the encrypted multimedia file is downloaded to the proprietary high-speed memory device. As described in conjunction with FIG. 13, the downloading is preferably done by segments. Encryption may be to select segments, or to all segments.

In a fifth step, the user withdraws a handheld high-speed memory device from the public kiosk.

In a six step, the user couples a handheld high-speed memory device with a playback device. In rental embodiments, download of the encrypted video file into a mass storage device is prevented. In purchase embodiments, the user can download the encrypted file to a mass storage device integral to the playback device, or to any other massive storage unit.

In the seventh step, a user identifies a video file for viewing.

Within the decryption module is a register for storing a decryption key, or value relating thereto. In a preferred embodiment, the decryption key register is disposed within the decryption module, and is configured to resist decryption key download by a hacker. In an embodiment, the decryption key itself is encrypted with a secondary encryption during download to conceal the identity of the decryption key from a hacker. A secondary decryption key can be exchanged between the playback device and the portable memory device during a handshaking process.

In the eighth step, the playback device decrypts the encryption key, and stores it in the decryption key register of the decryption module. The decryption key register is preferably a volatile memory area, and is preferably limited to storing a single decryption key. The decryption key, or a value relating thereto, must be downloaded to the volatile region key registry in order to view or play an encrypted multimedia file corresponding to the decryption key. Download of the decryption key, or a value relating thereto, may be loaded into the volatile decryption key register by coupling the proprietary high-speed memory device with a port of the playback device.

In a nine step, the decryption key is expunged from the decryption key register within the decryption module. Expungement may be time driven, event driven, or combinations thereof. For example, the event of decoupling the proprietary memory device from the playback unit could initialize the expungement process. However, the expungement may be instantaneous or delayed. One can imagine, for example visiting a friend for Christmas vacation, downloading and encrypted video file, coupling the proprietary memory device with the playback device in order to download the necessary decryption key to the playback device, and flying home. A delay of one or two days would enable the friend to view the movie after the owner of the proprietary memory device had departed. Alternatively the expungement of the encryption key could be contingent on serial events. The first event is the withdrawal of the proprietary memory device. The second event can be the act of queuing a different movie for playback, viewing the movie which has been temporarily enabled, downloading a different memory device ID to the playback device, or combinations thereof. These examples of event driven and time driven expungement of a decryption key from a decryption module are only offered as examples however, and are not intended to limit the spirit and scope of the appended claims, which fully comprehend the expungement of a decryption key by alternative events, delays, and combinations thereof.

In an alternative embodiment, the decryption key, or a value related thereto, including an encrypted version of the encrypted key, may be downloaded into the playback device or video display device from a playback wand. A playback wand is a digital device configured to digitally store a digital value representing at least one memory device ID (or a value derived therefrom), and to transmit that value directly or indirectly to a playback device. Embodiments of a playback wand include an I/O port configured to couple with a port of a playback device, and to receive a digital signal from the playback device. A playback wand is preferably paired with one and only one memory device ID at the time of manufacture such that the memory device ID of the paired memory device is stored within the digital storage area of the playback wand in a nonvolatile non-erasable format. A playback wand preferably includes a first encryption algorithm for confirming a connection with a playback device through an encrypted handshake. If the playback wand detects a valid encrypted handshake, it transmits the memory device ID stored therein, or a value derived therefrom. If the playback wand fails to detect and verify an encrypted handshake, it will either output a false memory device ID, will not output any signal in its place. By these features, the playback wand is configured to frustrate attempt bys hackers to identify the memory device ID stored therein, thereby offering another layer of protection to copyright holders of multimedia files.

The principal distinctions between a playback wand and its corresponding proprietary handheld high-speed memory device to which it is paired, is that the playback wand has significantly less digital storage capacity, thereby reducing the cost of the playback wand. Additionally, a playback wand could be substantially smaller than a handheld high-speed memory device. However, any of the features of the hand held high speed memory device may be present in the playback wand. Alternatively, a playback wand may have any number of unique features distinct from the hand held high speed memory device. Because a playback wand need only download a decryption code, and possibly a few hand shake responses, the playback wand need not be high speed. It can, however, communicate with the playback device through a proprietary port which may include a mechanical interlocking, hardened materials, and other design features to prevent detection and reading of the decryption code stored therein.

It can be further appreciated that the unique device ID from which the encryption and decryption keys are derived does not need to be stored within a high-speed memory device in embodiments utilizing a playback wand, further reducing the ability of a hacker to discover the unique device ID from which the encryption and decryption keys are derived. The unique device ID can be stored exclusively in the playback wand, and in a lookup table of the network. The playback wand can be paired to a high-speed download device in a highly visible user friendly manner such as color schemes, icons, or alphanumeric characters. The high-speed download device only needs to store a publicly disclosed identifier which can be downloaded to a kiosk to retrieve the corresponding device ID stored by the network. In this embodiment however, playback of a multimedia file could not be initiated by the high-speed memory device. This feature could create frustration among users seeking to play a multi media file at a friends house. The user would have to bring both the high-speed memory device in which the video file is stored, and the playback wand to initiate play of the multimedia file. The additional security gained by eliminating the unique device ID from the high-speed memory device must be weighed against a loss of utility and flexibility for the user.

Regardless of whether or not unique device ID is stored within the high-speed memory device, significant advantages inure to the consumer from the playback wand embodiment. A first advantage is the protection against a loss of the proprietary high-speed memory device. Because proprietary high-speed memory devices are continually transported to public areas by a user, they are subject to being misplaced, lost, or stolen. If the portable high-speed memory device were the only means for downloading the encryption key to the playback device, a loss of this device could represent the loss of any number of encrypted multimedia files. A playback wand however, could be stored in a permanent location in, on, or near a playback device, and even tethered to the storage location by a lanyard to prevent loss. In a playback wand embodiment, loss or theft of a portable high-speed memory device does not prevent a user from viewing encrypted films, and does not represent catastrophic loss.

Advantages of the playback wand embodiment to the consumer, however, can erode the protection afforded to copyright holders. If both a playback wand and its corresponding high-speed memory device store the unique device ID, file sharing could occur where in two separate users at two distinct locations could view to separate video files which had been encrypted according to the same device ID. Copyright holders and legislators would have to determine whether this very limited potential for file sharing unreasonably erodes the protection that should be afforded to copyright holders.

Throughout this disclosure, specific details of downloading an encryption key to a playback device are offered for the sake of brevity and clarity. The appended claims comprehend embodiments utilizing a playback wand, and embodiments wherein download an encryption key is done directly from the portable high-speed playback device.

Embodiments utilizing a "memory device ID" to generate an decryption key, as described above, provide consumers with an advantage which is not available in the embodiments utilizing a "playback device ID" to generate a decryption key. Specifically, a user can play a multimedia file on any playback device, and is not restricted to a single playback device. However, both the "memory device ID" embodiment and the "playback device ID" embodiment protect the interests of both a consumer, and a copyright holder. A consumer could, in either embodiment, store multiple "backup" copies on an encrypted multimedia file on any number of computers or mass storage devices to protect against loss, theft, digital corruption, or device malfunction of a storage device in which multiple encrypted files have been stored. At the same time, these embodiments offer maximum protection of intellectual property rights of the copyright holders.

Figure 15:
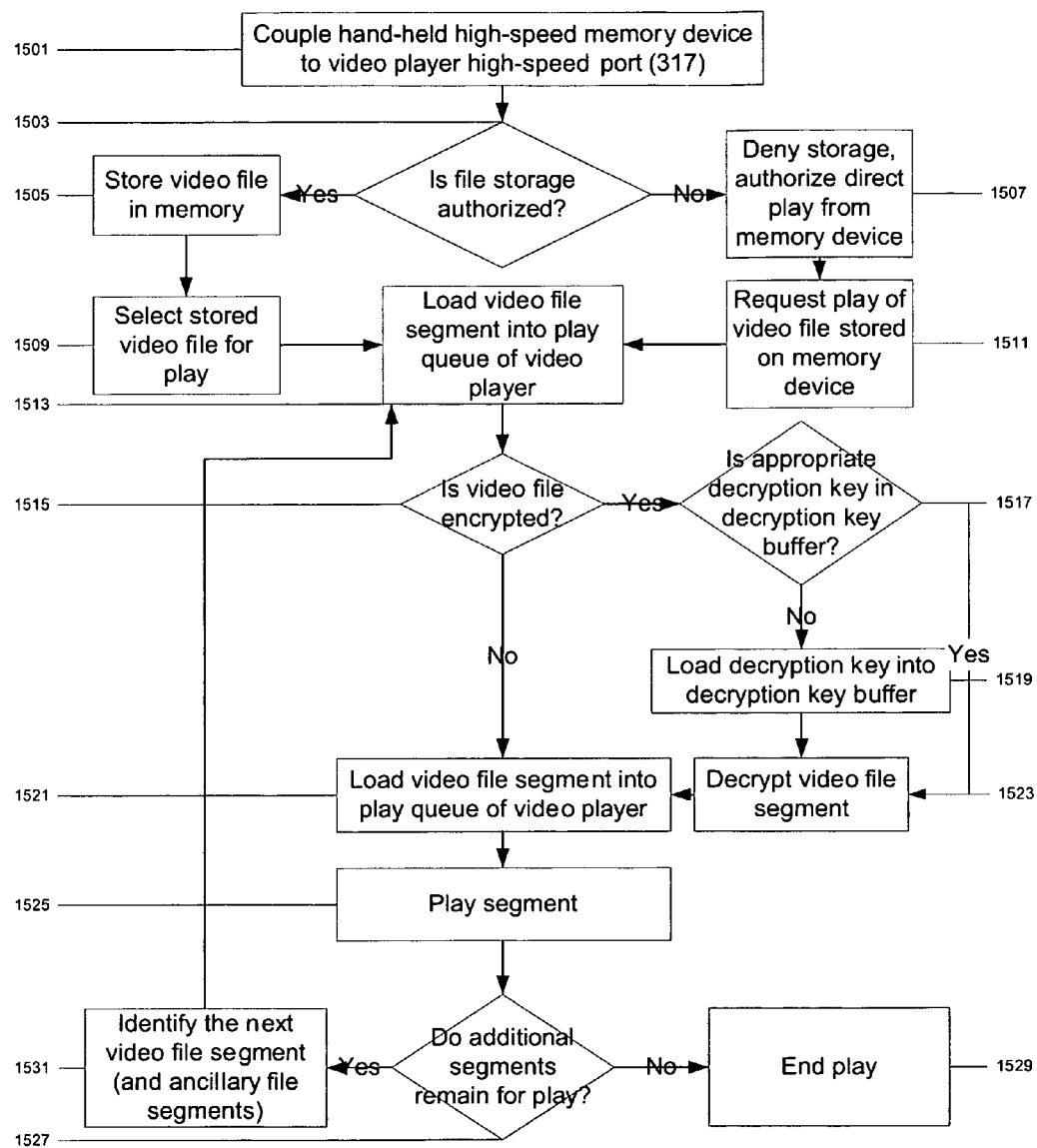
FIG. 15 depicts an embodiment of a process by which the portable high-speed memory device stores and/or plays a video file.

FIG. 15 discloses a process for playing an encrypted file on a video player 305. In step 1501, the portable high-speed memory device 131 is coupled to the high-speed port 317 of the video player 305. In step 1503, if the file within a portable high-speed memory device is authorized for storage, then in step 1505, the video file is stored in memory. The memory can be memory device 335 resident within the video player 305, or may alternatively be an external memory device, such as memory device 333 within the personal computer 321.

In step 1509, a user selects one of video files stored in memory for play.

If, in step 1503, the video file stored on the portable high-speed memory device is a rental, and not authorized for permanent storage by the user, then, in step 1507, the hand held memory device will refuse to download the file. The rented video file within the portable high-speed memory device 131 is authorized only for direct play through the video player 305.

In step 1511, the user initiates the process of playing (displaying/performing) the video files stored within the portable high-speed memory device, and the video file is queued for play on the video screen 323 as well as outputting the soundtrack to audio Speakers.

Whether a video file is selected for play from the memory 335 of the video player 305, the memory 333 of the personal computer 321, or directly from the portable high-speed memory device 131, in step 1513, play is commenced when a segment of the video file (and corresponding ancillary file segments) are loaded into one or more play queues of the video player 305.

If, in step 1515, the video file has been watermarked or encrypted, then, in step 1517, the a determination is made as to whether the decryption key associated with the video file has been loaded into the decryption key buffer of the video player (including decryption key storage directly within the video display device 323) of FIG. 3. If, in step 1515, the video file has only been watermarked, no action is necessary in step 1517.

If the decryption key has not been loaded into the decryption key buffer of the playback device, then in step 1519, the decryption key is loaded into the decryption key buffer. If a file has been watermarked in lieu of, or in addition to encryption, in step 1519, a search is made of a Local List of Pirated Watermarks to determine if the watermark of the queued video has been pirated.

In step 1523, the a decryption module 341 within the video player, or alternatively, a decryption module 339 within the video display device decrypts the encrypted file segment(s) according to the decryption key. It is recalled that the decryption key may be derived, at least in part, from the unique device ID 337 of the video display device 323, the unique device ID of the video player 305, the unique device ID of the proprietary high speed memory device 131, or the unique device ID of a playback wand. In watermark embodiments, step 1523 may alternatively include authorizing play of the file segment based upon the validity of the watermark.

In step 1521, the decrypted (from step 1523) or unencrypted (from step 1515) file segment is loaded into a play queue of the video player.

In step 1525, the video segment is displayed (played) by the video display device 323. Audio and other ancillary files may also be played at this time.

In step 1527, if no additional file segments remain for play, then, in step 1529, the process ends. If, in step 1527, additional segments remain for play, then in step 1531, the video player identifies the next file segment (and ancillary file segments) awaiting play. The process returns to step 1513.

By embedding an decryption algorithm at the transistor level of a decryption module, such as an integrated circuit package of the video player 305, there is no application that can be pirated for reverse engineering. The use of non-erasable and non-readable algorithms will therefore significantly impair a hacker from "reverse engineering" the decryption, further impeding unlawful copying and distribution of copyrighted material. The decryption process of FIG. 15, however, is intended only as an example. The appended claims comprehend alternative watermarking and decryption schemes and processes.

Figure 16:
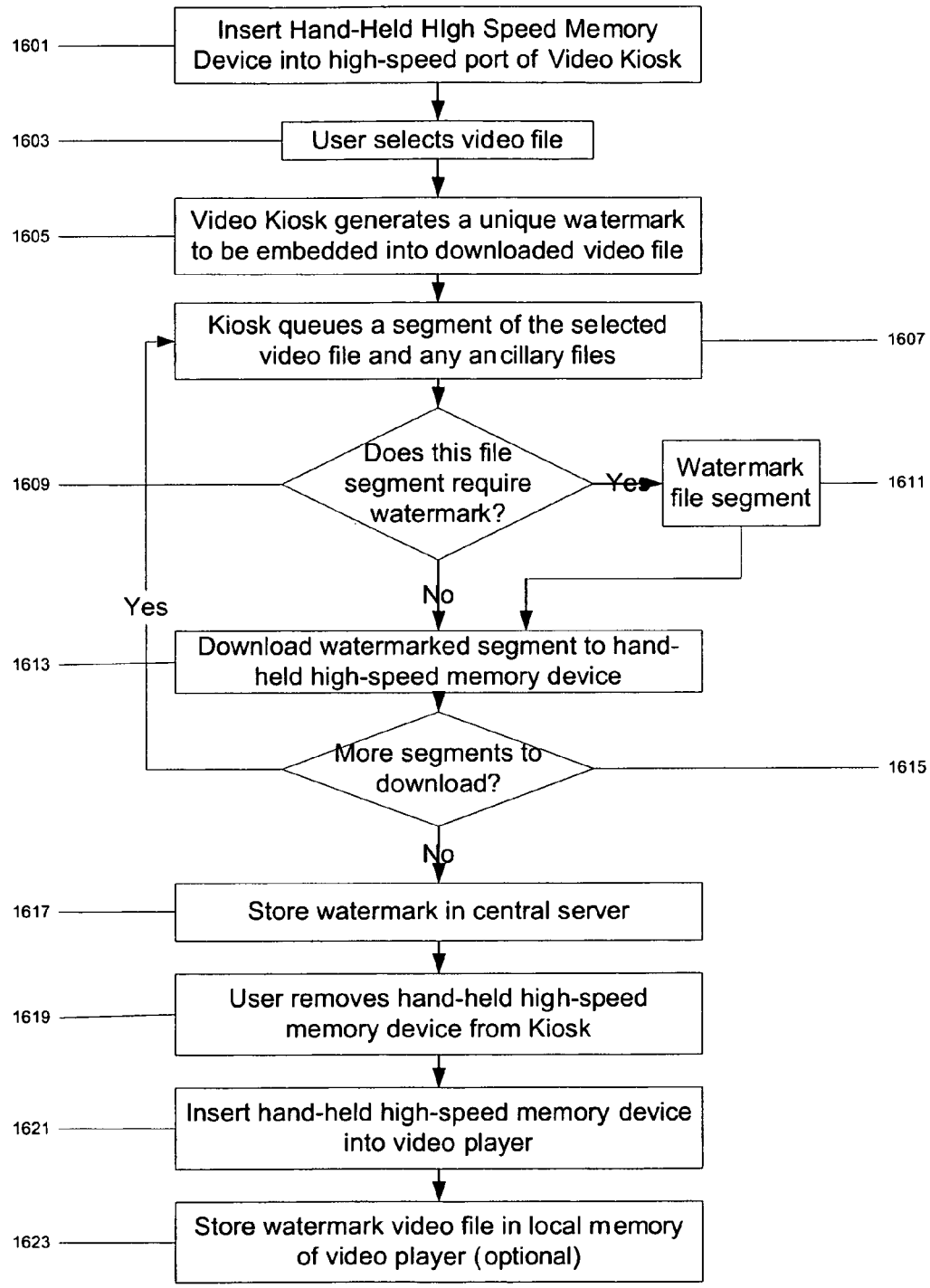
FIG. 16 describes a process for watermarking video files downloaded into a portable high-speed memory device.
Figure 18:
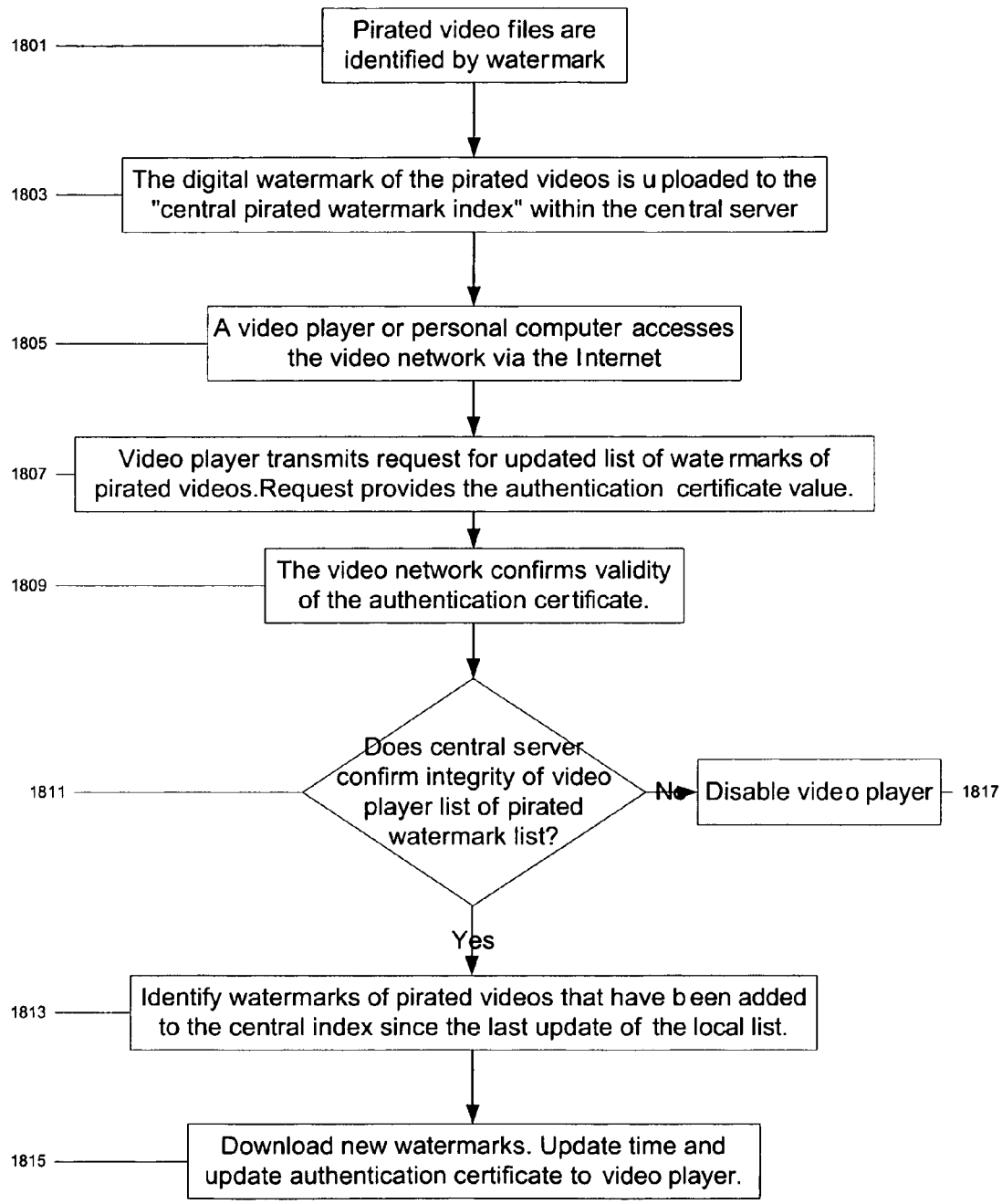
FIG. 18 describes a process for Internet download of data relating to pirated watermarks from a network storage location to a data storage device and a mid-user or an end-user.

FIGS. 16-22 are directed to embodiments utilizing a watermark in place of, or in conjunction with, an encryption scheme. FIG. 16 is directed to the process of watermarking a file during the download of a digital video file from a kiosk to a portable high-speed recording device 131.

In step 1601, the portable high-speed memory device 131 is inserted into the high-speed port 113 of the video kiosk 105.

In step 1603, the user selects a video file for viewing.

In step 1605, the video kiosk generates a unique digital watermark to be incorporated in the download of the digital video file. The watermark may be generated, at least in part, from the unique device ID 130 of the portable memory device 131, the unique device ID 129 of a select video player 305, the unique device ID of the video kiosk 105 performing the download, the time and date of the download, or combinations of these values. Generation of watermarks, however, are not limited to these data sources. These values and identifiers are offered by way of example, and are not intended to limit the way in which watermarks can be generated.

Steps 1301, 1303, 1305, 1309, 1311, and 1313, described in conjunction with FIG. 13 may also be incorporated into the process described in FIG. 16.

In step 1607, a segment of the selected video file and/or ancillary files and selectable parameters are placed in a queue for download.

In step 1609, a determination is made as to whether the queue video segment is designated for watermarking. If the queued segment is designated for watermarking, then in step 1611, a watermark is added to the file segment, and in step 1613, the file segment, the watermark, and any associated ancillary files or selectable parameters are downloaded into the portable high-speed memory device.

A watermark may be incorporated into a video file in such a manner that it is visually displayed on one or more "frames" or "scans" of a video picture. The watermark display may be sufficiently fast that it is unnoticeable to a viewer, and inserted at regular intervals, or even random intervals, into various frames of the video output file. An advantage of projecting a watermark as a visible display as described above can be appreciated by understanding one of the common video piracy techniques used today. Video pirates will often take a high-definition hand-held video recorder into a theater, and record the movie as it is projected on the screen. This "analog" video recording is then combined with the soundtrack, and distributed on the black market. Although the quality of such analog recordings is typically far below those which are copied through direct digital file transfer, as the recording quality of hand-held "camcorders" continues to improve, the commercial viability of movies pirated by "analog" techniques continually increases. It can therefore be appreciated that, if watermarks can be detected only through a digital examination of a file, video files which have been pirated through an "analog" process (such as a theater recording as described above) are basically impervious to watermark detection on the digital level. Accordingly, the ability of international authorities to track and confiscate black-market videos, may in certain cases, require a "visible" watermark. As noted above, a visible watermark need not be readily detectable to a casual viewer. As watermarking becomes increasingly sophisticated, video piracy will also increase in sophistication. In an embodiment, watermarking may include multiple watermarks, including the invisible watermarks that may only be detected digitally, and visible watermarks.

It is understood that the order of steps described in FIG. 16 are offered by way of example, and are not intended to be fixed. For example, a file segment can be downloaded into the portable high-speed memory device prior to the generation of watermark. Subsequently, a watermark may be generated in downloaded separately. The steps of FIG. 16, therefore, are offered simply as illustrations to enable one skilled in the art to make and use the claimed invention. The content in order of these a specific steps are not intended to limit the scope of the appended claims.

In step 1615, the video kiosk determines if there are any more file segments remaining for download. Remaining files may include video files, ancillary files, selectable parameters, and watermarks. If file segments remain, the process returns to step 1607.

In step 1617, the watermark is a stored in a Central Transaction Record File 1700 (FIG. 17) in a data table along with selected data such as the video ID (e.g., the movie title) the user ID of the person who performed the download, and the device ID 129 of the portable high-speed memory device used in the download process. The information of table 1700 is offered only by way of example, and other information may also be cross-linked to the watermark within the Central Transaction Record File.

An embodiment of the Central Transaction Record File 1700 is depicted in FIG. 17. The download record in 1700 is depicted as a data table which includes column 1701 storing the date of a video download, column 1703 storing the watermark of a video download, column 1705 recording the video kiosk at which the download occurred, column 1707 recording the unique device ID 129 (FIG. 1) of the portable high-speed memory device 131, and column 1709 recording the video file ID which might be depicted descriptively, such as a movie title. Because multiple "Tarzan" movies have been stored within the video system 101, within column 1709 of FIG. 17 the particular video ID is depicted as "Tarzan 0038". Because only one movie entitled "Goldfinger" is stored within the video network, the video file ID of this movie is "Goldfinger 001". For database purposes however, video IDs need not be descriptive, and may simply comprise a string of characters assigned by the central server to optimize storage identification and retrieval of various video files. The data categories depicted in the embodiment of FIG. 17 are offered by way of example. Other database information can be cross-linked to the General Video File Download Record 1700.

Returning now to FIG. 16, in step 1619, the user withdraws the portable high-speed memory device from the video kiosk 105. In step 1621, user inserts the portable high-speed memory device into the high-speed port 313 of a video player 305. In step 1623, the digital video file, along with ancillary files such a the video file identifier, selectable parameters, and the unique digital watermark, are downloaded into the memory 335 of the video player 305, or an external memory 333 such as might be followed within the personal computer 321 of the user.

A watermark can help identify a mass-pirated video file, such as might be distributed through the black market on DVDs. Positive identification of pirated video files can assist law enforcement authorities in securing the necessary court orders for rapid confiscation of black-market DVDs or other unlawful recordings.

In addition to copyright enforcement, the methods set forth in FIGS. 18 through 22 disclose embodiments of a process by which digital watermarking may render pirated DVDs virtually useless in the marketplace.

In step 1801, a pirated video file is identified by network security. In step 1803, the digital watermark of the pirated video file is uploaded to the Central Pirated Watermark Index 1900 (FIG. 19) within the central server 118 (FIG. 1).

Referring briefly to the central pirated watermark index 1900 of FIG. 19, the first column 1901 includes a listing of all invalid or pirated watermarks. The second column 1903 of the index includes the video file ID associated with the watermark. Column 1905 of the index designates whether the watermark is authentic or not. In the example of FIG. 19, both pirated watermarks corresponding to the video file "Spiderman I" are designated as authentic. This means that these files of the movie "Spiderman I" were originally downloaded off the video network according to the listed watermarks, but was unlawfully distributed after being downloaded. Invalid watermarks can be further distinguished according to the type of infraction, or the extent of the infraction. For example, the type of unlawful distribution may be identified by type and grade. If video files are being unlawfully duplicated without cost, it would be designated as an "unlawful distribution." If investigation determines that a copyrighted video is being distributed for profit, it is designated as an "unlawful sale." Similarly, the extent of unlawful distribution can be graded. For example, quantities of seven to twenty five would be graded "level 1." Quantities of twenty six to one hundred would be graded a "level 2," and so forth. The type of violation and the extent of the copyright violation can be used to determine the action taken by the network. A remedial action may begin by notifying a user that a multimedia file which he downloaded had been copied too frequently, and will be de-activated if it is copied again. More severe infractions can result in de-activation of a multi-media file, being barred from network use, civil action, or criminal complaint. On the other hand, data within column 1905 discloses that the watermark for "Gone With the Wind" is not authentic. This means that more sophisticated video piracy was involved, wherein the watermarks corresponding to Gone With the Wind were not created by the network, but rather, were created on the black market. According to the example of FIG. 19 therefore video pirates distributing "Gone With the Wind" have attempted to mimic network protocols for watermarking by embedding the booklet watermark in a digital file of "Gone With the Wind", and have distributed, or attempted to distribute this file on the black market. This level of sophistication would be more likely to trigger civil or criminal action. Column 1907 discloses the download date of the video files that were downloaded from the video network. Because "Gone With the Wind" was not originally downloaded from the video network 101, it has not been assigned a download date in column 1907. Column 1909 discloses the date that the copyright infringement was discovered.

This date, or an equivalent date, could be used in the process of updating local user files with the identity of the invalid watermarks. If a user's last update of the invalid watermarks was Jan. 12, 2008, the next time that the user logs onto the network 101 and updates the local listing of invalid watermarks, the system can identify any watermark (2009, FIG. 20) dating from Jan. 12, 2008 onward. By utilizing information in column 1909 in this manner, a user update of invalid watermarks need not include the complete listing of watermarks, but need only include invalid watermarks added to the index since the last user update. The data columns of FIG. 19 are offered by way of example, and are not intended to limit the appended claims. Other data columns may be include within or cross linked to the index 1900 of FIG. 19. For example, the index may include the user ID of the person who downloaded a video that was later pirated, the country in which unlawful duplication or distribution is believed to have originated, the governmental entities assisting in the policing of the infringed video file, etc. The listing of specific data columns in conjunction with FIG. 19, therefore, is offered by way of example, and should not be construed so as to limit the scope of the appended claims.

The network can become alerted to unlawful distribution in a variety of ways. According to one embodiment, a proprietary high speed memory device may retain a count of how many times it has downloaded a watermark into a playback device or storage device. To prevent bypassing of a proprietary high speed memory device by simply duplicating a multimedia file by computer, embodiments are envisioned wherein the proprietary high speed memory device comprises a proprietary port that will not couple with a personal computer, and wherein all storage and playback devices are also proprietary, and not able to interface with a standard computer. Whenever the proprietary high speed memory device is linked to the network, it updates the network as to the number of downloads performed.

According to an alternative embodiment, a proprietary high speed memory device may, when coupled to a playback device, query a playback device for its "local watermark index" of stored files. Subsequently, when coupled to the network, the proprietary high speed memory device will automatically upload the local watermark index to the network, and identify the playback device on which the files are stored. By maintaining a record of all watermarks within the central server, the network is able to monitor and track unlawful distribution of a video file. It can readily be appreciated that, even apart from encryption, the watermarking tracking system described herein, by monitoring copyright infringement and taking appropriate action could reasonably protect the intellectual property rights of various interests. When the watermarking and encryption processes described herein are combined, intellectual property rights for multimedia files receive unparalleled protection.

Returning to FIG. 18, in step 1805, an "auto update" module within the video player 305 or the personal computer 321, accesses the video network via the Internet. For brevity and clarity, the following examples will largely reference Internet communications is being initiated by the video player 305, and data storage and data retrieval as taking place within the local memory 335 of the video player 305. These details are offered by way of example only, and are not intended to limit the scope of the appended claims. Many of the functions attributed to the video player 305 in the following examples, can, in alternative embodiments, be conducted by other devices, such as the personal computer 321 of FIG. 3 FIG. 3, and its component parts, such as the disk drive storage 333.

In step 1807, once communication has been established with the video network 101 (FIG. 1), the auto update module initiates a "Pirated Watermark Update Request". The request can also include information needed to verify the authenticity and integrity of the requesting video player 305 and its contents. The information sent by a video player 305 to the central server 118 in the request may include, but is not limited to, the unique device ID of the video player or computer initiating the request, the date and time of the last update of pirated watermarks, and the authentication certificate issued by the central server 118 during the last update. The requesting video player may also send the "last" watermark it received, or a sequential number identifying the last watermark correlated with the last watermark, to assist the central server in determining where the last update stopped, and where to begin the new update to the local list of pirated video files 2000 (FIG. 20).

Figure 20:
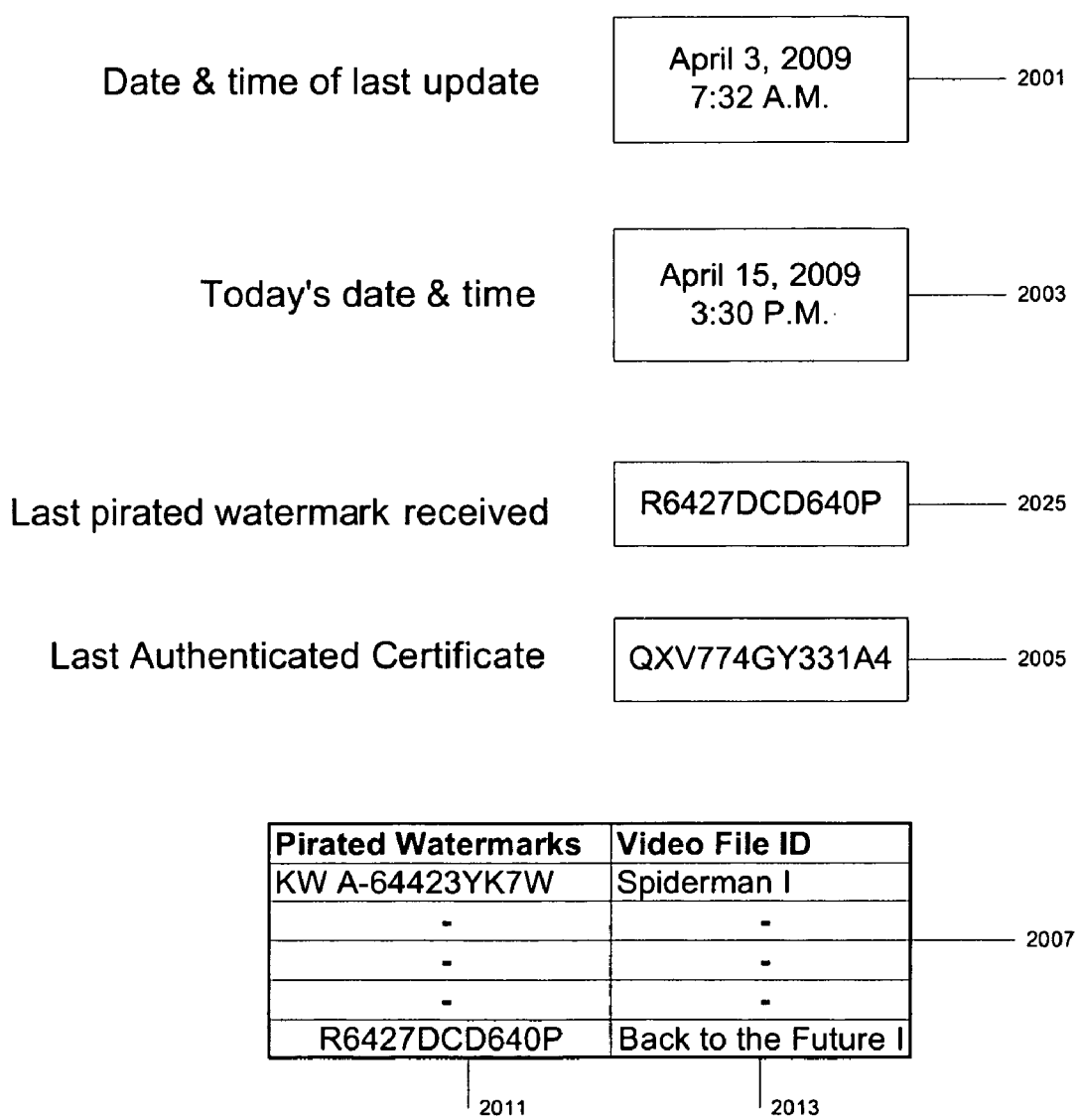
FIG. 20 depicts a data table for storing the watermarks of pirated videos within an user-end device such as a video player or personal computer.

Because step 1809 discloses a comparison between data in FIG. 20 and data in FIG. 21, the contents of these data tables is discussed in conjunction with step 1809. Referring briefly to FIG. 20, the "Local Pirated Watermark Index" 2000 depicts an embodiment of a data table stored within the memory of a user device such as memory 335 of video player 305, or the memory 333 of personal computer 321. The Local Pirated Watermark Index 2000 includes a data table 2009 comprising a list of pirated watermarks 2011 and have been disclosed to the user device, along with their corresponding video file IDs 2013. The index 2000 also includes a time and/or date field 2001 for storing the time and/or date on which the list of pirated watermarks 2011 was last updated by the video network 101, a time and/or date field 2003 depicting the current time and/or date, a digital value 2005 representing the authentication certificate issued by the central server at the time of the last update, and the sequential number 2025 of the "last" watermark received during that update.

The Central Pirated Watermark Update Index 2100 within the central server 118 contains some or all of the information in FIG. 20 corresponding to every video player 305 that has been purchased by a consumer, or that has accessed the video network 101. The update index 2100 is illustrated by way of example is including a first column 101 for storing the unique device ID of those video players that have been purchased by consumers, or those that have accessed the network at some time. The second column 2103 lists the last update time and/or date of the user device (e.g., the video player 305) corresponding to the referenced video ID of column 2101. The third column 2105 lists a sequential number or timestamp corresponding to the "last" pirated a watermark with which the corresponding video player was updated. The fourth column 2107 lists the last authentication certificates issued to the respective video players.

Returning to FIG. 18, in step 1809, the video network compares the data received from the requesting user device (such as video player 305) as discussed in conjunction with FIG. 20, with data stored in the Central Pirated Watermark Update Index 2100 of the central server 118, as discussed in conjunction with FIG. 21. If, in step 1811, the data received in the update request does not match the data corresponding to the requesting video player which is stored within the Central Pirated Watermark Update Index 2100, user device requesting the watermark update demonstrates evidence of tampering, and in Step 1812, various security measures may be taken in conjunction with this evidence. The security measures of step 1812 may include, at the very least, refusal to issue a new update time 2001 and/or authentication certificate 2005 requesting device. As will be appreciated in conjunction with FIG. 22, this refusal will, in certain embodiments, eventually disable a user device such as video player 305 from playing video files stored therein. Additional security steps within step 1812, may include, but not limited to, immediately disabling the video player 305 by means of a digital signal (or disabling within a personal computer evidencing tampering an application or module used for video playback), flagging the identity of a user whose video rentals have been played by (or stored in) the device showing evidence of tampering, notifying a user of the discovered tampering, restricting the functionality a portable high-speed memory device linked to the video player, notifying civil authorities, or combinations of the above actions.

The confirmation of a user device as depicted in steps 1809 and 8011, (involving a comparison of data in FIGS. 20 and 21), is offered by way of example. Other tests may also be conducted to confirm the authenticity of the video player and the integrity of the list of pirated watermarks within that video player in conjunction with, or in place of, step 1809. For example, the central server requests that the video player identify all watermarks it currently contains for pirated copies of a particular movie, such as "Butch Cassidy and the Sundance Kid," that were added to the Local List of Pirated Video Files 2000 (FIG. 20) during or prior to the last update. If a hacker had expunged these watermarks from the Local List of Pirated Watermarks within the video player, such an inquiry by the central server would discover this form of tampering. None of these examples relating to steps 1809 and 1811, however, is intended to be limiting. From the above steps, it can readily be appreciated that a wide variety of handshakes, pings, cyclical redundancy checks, file inquiries, search engines, and the like, can be incorporated in place of, or in conjunction with the above steps in ensuring that a video player 305 or computer 321 has not been tampered with.

If, in step 1811, the central server 118 confirms the integrity of the requesting video player 305 (and the data stored therein), then the central server continues the update process. This begins in step 1813, wherein the central server identifies, within the Central Pirated Watermark Index 1900, those watermarks that have been added since the last update time 2001 of the requesting user device. As noted, the update time and date 2001 of that last update, or a sequential identifier or timestamp 2025 associated with the "last watermark" may be used to identify the "new" watermarks within the Central pirated watermark Index.

In step 1815, the updated list containing the most recently pirated watermarks, the file identifiers (movie titles etc.), and the timestamps or sequential numbers associated with the respective watermarks, are downloaded to the requesting video player 305, and stored in the Local List of Pirated Video Files 2000. The central server 118 generates a new timestamp for the update time, and a new authentication certificate corresponding to the timestamp. These are also sent to the video player 305 (or a computer) and stored in their respective fields 2001, 2005 (FIG. 20).

Figure 22:
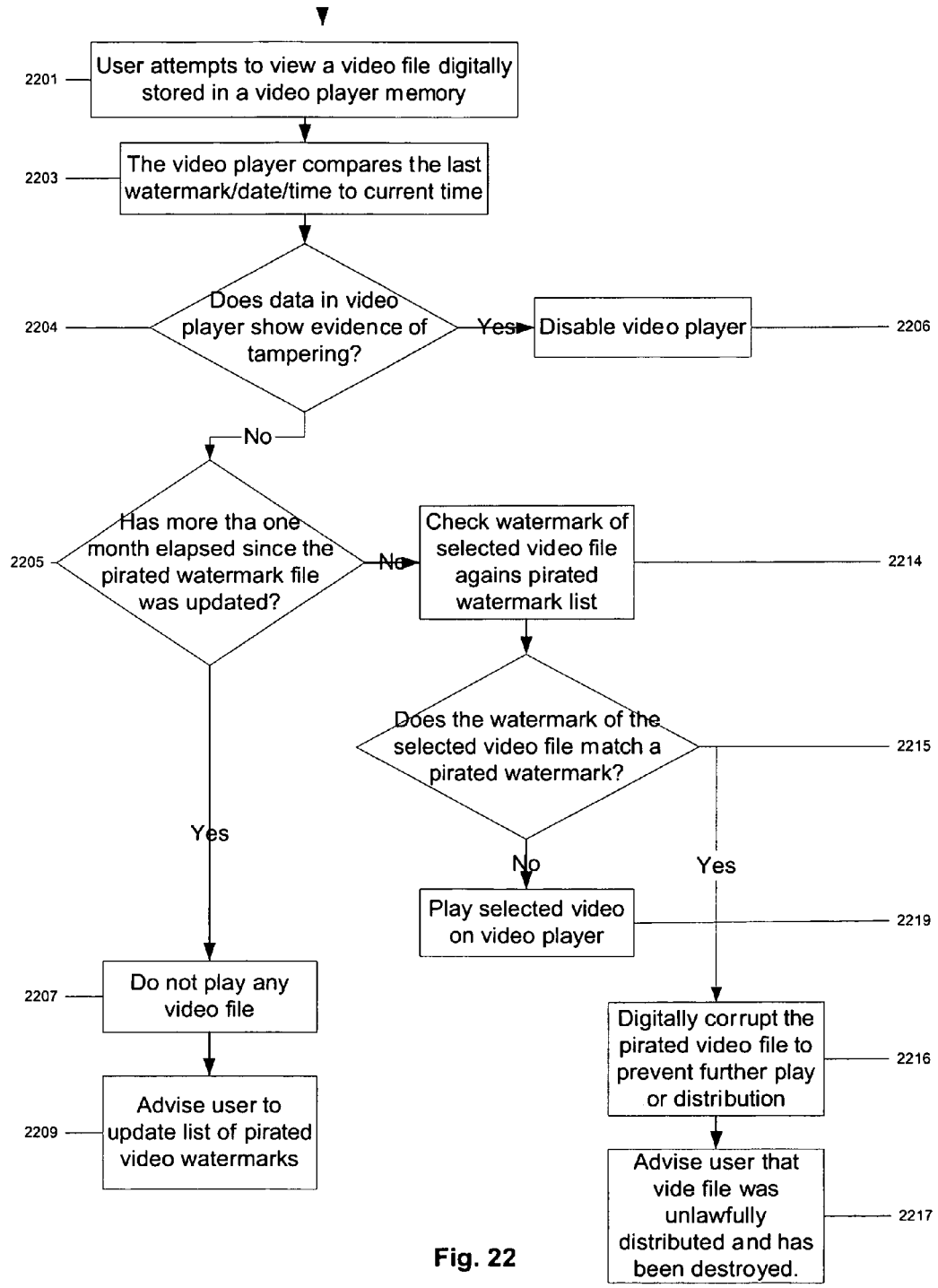
FIG. 22 describes a digital rights management process for controlling the use or display of pirated videos.

FIG. 22 illustrates a process by which intellectual property rights of copyright holders and content providers are protected through the watermark system described above. In step 2201, a user selects a stored video file for viewing through video player 305. The selected video file may be stored in any user controlled digital memory area, such as digital memory 335 of the video player 305, or in the data storage member 333 of a personal computer 321.

In step 2203, the video player compares its last watermark update time and/or date (shown in field 2001 of FIG. 20) to the present time and date (shown in field 2005 a FIG. 20). Those skilled in the art will appreciate that a false time may be programmed into a digital device such as the video player, thereby frustrating the time comparison. Various security modules and safeguards can be incorporated to prevent abuse of the time lapse comparison described herein, such as a dedicated clock that is separate from the system clock of the computer, and that is inaccessible to hackers.

If, in step 2204, a determination is made that data into video player shows evidence of tampering, then appropriate action is taken. An example of such action is illustrated in step 2206, where the video player is digitally disabled.

If, in step 2204, data within the video player does not show evidence of tampering, then, in step 2205, a determination is made as to whether too much time has elapsed since the last update. If the elapsed time since the last update exceeds the allowable time, then in step 2207, the video player 305 (or application module within user computer 321) will be disabled from playing movies or video files digitally stored therein.

In the step 2209, the user is notified that video files stored within the memory of a specified user device can no longer be played until the watermark list is updated through an internet connection. Notification can take any known format, such as a text message on an LCD display, an output to a video display, or even a simple light on the video player with a physical notification of the update requirement printed proximate the light. In an embodiment, notification described in step 1809 may be done prior to an invalid attempt to access a video file within the memory. For example, an LED or LCD may continually display the amount of time that has passed since the last watermarked update, or the remaining time before a watermark update is required.

If, in step 2205, the last update time 2001 (FIG. 20) is within the required time period for watermark update, then, in step 2214, the video player 203 compares the watermark of the video file selected for play with the watermarks stored in column 2011 of the Local List of Pirated Video Files 2000 (FIG. 20).

In the step 2215, if the watermark of the selected file matches a watermark in column 2011, indicating that the selected file is an unlawful or pirated video file, then, in step 2216, the user device such as video player 305 or computer 321 digitally corrupts the pirated video file. In step 2217, the user advised that the file was unlawfully distributed, and has been destroyed.

If, in step 2215, the watermark of the selected video file does not match any watermark in the list of unlawful or pirated video files, then, in step 2219, the video player 305 commences play of the selected video file.

By the process described above, a video player 2003 must access the internet on a regular basis, according to a predetermined time frame, in order to maintain the capacity to present stored video files for playback on a video player 305. Because the video player 305 is a proprietary device, security measures built into the video player 305 can be more easily designed to frustrate would-be hackers. However, applications stored on a personal computer can be safeguarded in a variety of ways. Parity checks, cyclical redundancy checks, self executing modules, limited user access, and other techniques can help ensure that pirated watermarks are not expunged or altered by the user.

In an embodiment that may be used in conjunction with, or in place of the process described in FIG. 22, the updated list of pirated video files to be downloaded to the portable high-speed memory device 131 every time the memory device is inserted in the kiosk. The update process is completed prior to the loading of any new video file onto the portable high-speed memory device, thereby ensuring that the portable high-speed memory device cannot be withdrawn from the kiosk after receiving a video file but prior to update. The same safeguards described in conjunction with FIGS. 20 and 22 to be used in conjunction with a portable high-speed memory device. The date and time of the last update 2001 the present date and time 2003, the last pirated watermark received 2025, and the last authentication certificate 2005, could be loaded into the portable high-speed memory device. If the portable high-speed memory device showed evidence of tampering, the local kiosk could digitally disable the portable high-speed memory device, and to generate appropriate reports for storage, processing, and action by administrators of the video network.

It will be recalled that multiple hand-held high-speed memory devices may be used in conjunction with a single video player. In embodiments in which an updated list of pirated watermarks is downloaded into the portable high-speed memory device, a synchronization process may be conducted between a portable high-speed memory device and a video player 305. During synchronization, a determination is made as to whether the video player or the portable high-speed memory device has the most recently updated with a listing of pirated videos. The device with the most recent information acts as a data source for updating the pirated watermark list of the other device. The date and authentication certificates could also be transferred along with the device ID, thereby identifying the source of the last watermarked update.

According to a preferred embodiment, the watermark of every file downloaded by the network is unique, thereby allowing individually pirated video files to be listed in a central index of pirated watermarks. At the same time, a subset of the data within every watermark allows each watermark to be correlated with a particular unique device ID. The advantage of this can be appreciated by the following example. A user has purchased over one thousand encrypted video files, such as games, high definition DVDs, etc., representing a significant investment of money, as well as the labor to establish the collection. If the unique device ID used in encryption is associated with a playback enabling device such as a hand held high speed memory device or playback wand, and the device were lost, the entire set of encrypted files could become inaccessible. Against his contingency, the network may protect the interests of the user the following two embodiments. In a first embodiment, the user is able to purchase a playback device with the original device ID, thereby granting the user access to the full collection of encrypted files. In a second embodiment, the user purchases a playback device with a new device ID, and files a report about the lost playback enabling device. The network generates a list of all of the digital files originally encrypted by the lost device, and linking that list of digital files to the new device ID, such that the user may replace the entire collection for free, or a substantially reduced cost, being encrypted according to the new device ID.

If every watermark allows for identification of the device ID used in watermarking, unlawful file sharing could easily be identified in either of the above embodiments. As discussed previously, each time a watermarked video is replayed, time and date of that reply is stored in a local table of the playback device, and the network is regularly updated with this information, either through internet connection with the playback device, or through a hand held high speed memory device. In the first embodiment, if two videos and then decrypted and played simultaneously at two different locations, the network could determine that unlawful file sharing or distribution has occurred. In the second embodiment, if encrypted file according to the first device ID is ever again play back, the "lost" playback enablement device has either been found, or was falsely reported as being lost in the first place. Copyright policing is easier in the second embodiment, because no calculations of travel distance and exact playback times are required to positively identify unlawful usage.

When the determination of unlawful file sharing or unlawful distribution has been made, the network has the option of them sending a letter to the user regarding unauthorized file sharing, billing the client for unauthorized use of video files, initiating criminal or civil action for unlawful distribution of copyrighted material, or adding to the Central Index of Pirated Watermarks the watermark portion correlating to the playback enabling device associated with the unlawful file sharing. As that watermark portion gradually populates the Local Indexes of Pirated Watermarks, all playback devices will gradually become disabled from further playback of those video files. From this example, a highly flexible and responsive means of enforcing copyrights and protecting the interests of copyright holders can be achieved through a watermarking system wherein each watermark is uniquely distinct, but wherein watermarks associated with a common device ID can be commonly identified by a portion of the watermark.

By encrypting movies on a "one to one" basis according to a unique device ID, unlawful file sharing among casual users can be curtailed. Through the use of tamper resistant decryption modules located within a video display device, sophisticated hackers will be frustrated in their attempts intercept unencrypted video signals which could be used to generated unencrypted black market DVDs. Finally, even if a hacker were able to generate an unencrypted copy of an encrypted movie or video game, the watermarking techniques described within this disclosure would remain embedded within the video file, thereby providing an avenue for tracing pirated movies and professional hackers, policing public performances of pirated watermarked movies, and electronically hampering the display or use of decrypted watermarked movies.

The Multi-Station Video Kiosk

Figure 24:
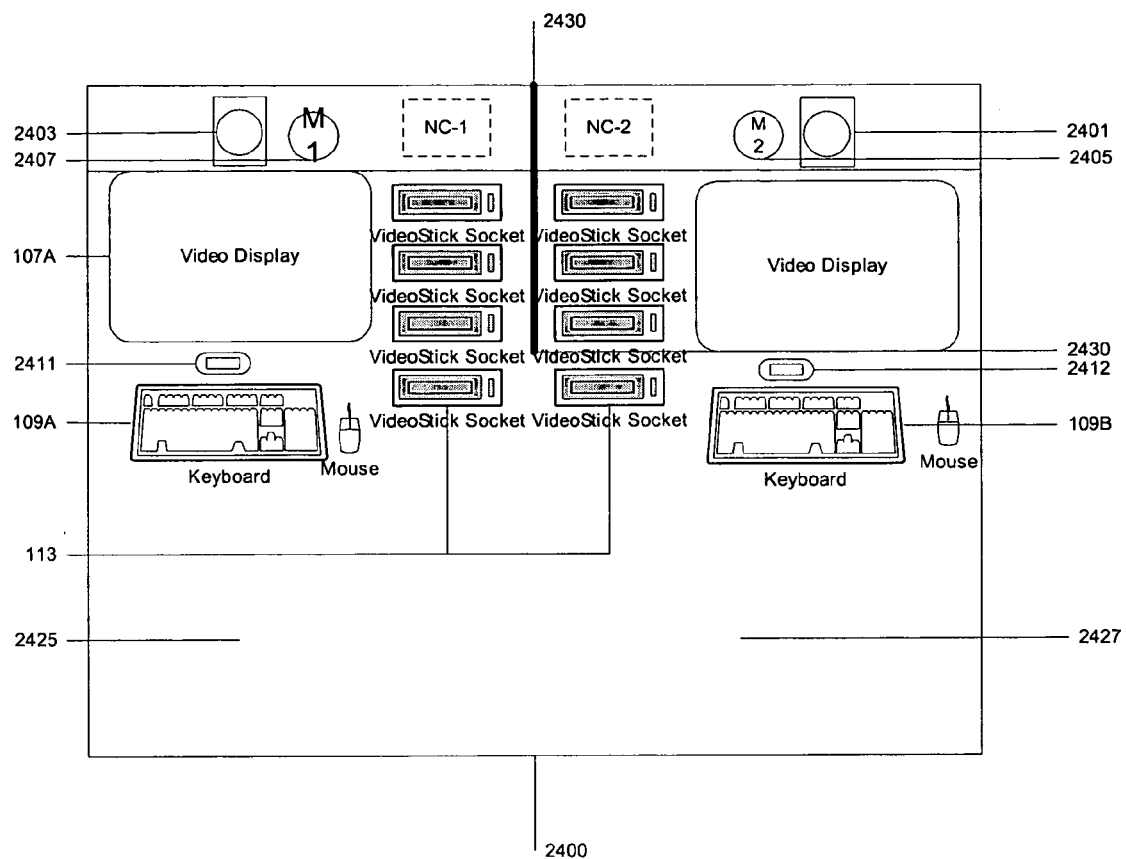
FIG. 24 depicts an embodiment of a multi-station video kiosk for use in conjunction with the video network of FIG. 1.

FIG. 24 illustrates an embodiment of a "multi-station video kiosk" 2400 including a first user station 2425, a second user station 2427, a plurality of high-speed ports 113-A through 113-H, and an acoustic barrier 2430. The first user station 2425 includes a directional speaker 2403, a display screen 2405 a keyboard input 2413 and a card reader CR1. The second user station 2427 has a directional speaker 2401, a video display screen 2407, a keyboard input 2415 and a card reader CR2. The multi-station video kiosk includes a request index 2430 within a memory portion of the multi-station video kiosk, the operation of which is described in conjunction with FIG. 25.

The directional speaker 2403 is configured such that it directs an audio output to a user standing at keyboard 109A with minimal distraction to a user standing at keyboard 109B. Similarly, the directional speaker 2401 is configured such that it directs an audio output to a user standing at a keyboard 109A with minimal distraction to a user standing at keyboard 109B. The directional effects of each of the speakers can be achieved by a variety of methods and apparatuses, including the position of a speaker, a primary direction in which a speaker is pointed, the volume at which a speaker operates, the distances separating user stations 2425, 2427, the size, shape, and position of the acoustic barrier 2430 separating adjacent user stations, the material from which the acoustic barrier is comprised, and noise cancellation features. In an embodiment, noise cancellation is achieved by microphones M1 and M2, and noise cancellation circuits NC1 and NC2. Microphone M1 is positioned to pick up the acoustic output of speaker 2401, and provide this information to noise cancellation circuitry NC1, which is configured to produce an acoustic output on speaker 2403 that will cancel, at least in part, sound from speaker 2401 bleeding over into user station 2425. Similarly, microphone M2 is positioned to pick up the acoustic output of speaker 2403, and to provide this information to noise cancellation circuitry NC2, which is configured to produce an acoustic output on speaker 2401 that will cancel, at least in part, sound produced by speaker 2403 bleeding over into user station 2427. Other noise cancellation methods, apparatuses, and systems may also be incorporated, and the specific noise cancellation devices described herein are offered only as examples.

Figure 25:
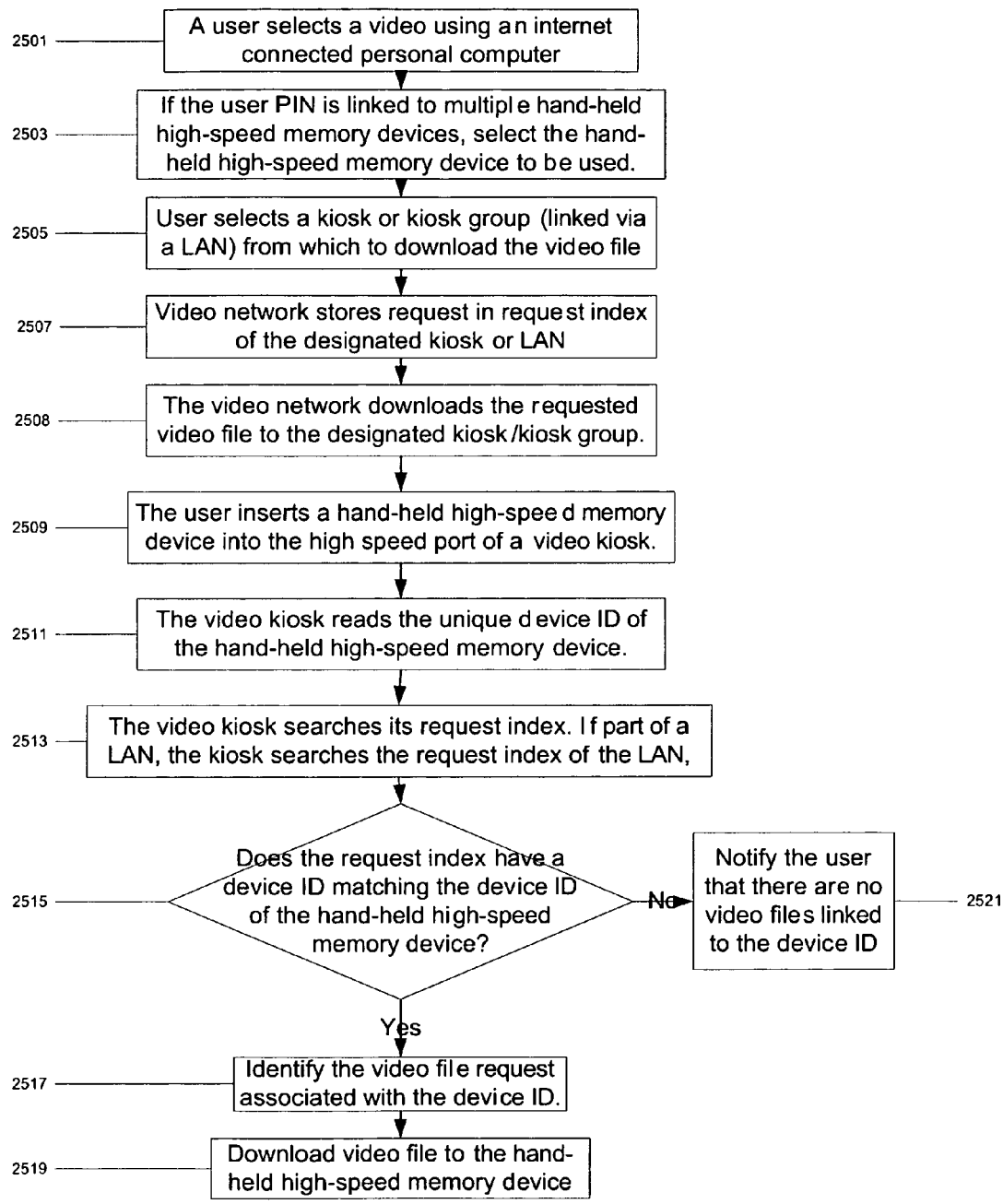
FIG. 25 describes an embodiment of a process by which a user can select a video file available on the network of FIG. 1 by means of personal computer, and subsequently download the video file from the video kiosk.

Multiple high-speed ports 113-A through 113-H allow a plurality of users to download video files even while other users are occupying one or even all of the user stations 2425, 2427. A request index 2430 can be used to store multiple pending requests, and associate them with respective portable high-speed memory devices 131 that may be inserted into any one of the plurality of high-speed ports 113-A through 113-F. FIG. 25 illustrates a method by which multiple users may download video files from a multi-port kiosk such as depicted in FIG. 24.

In step 2501, a user selects a video by means of a personal computer via the Internet.

In step 2503, if a user PIN is designated for more than one portable high-speed memory devices, the user specifies an identification of the portable high-speed memory device that will be used for the file download.

In step 2505, the user selects a video kiosk, or a kiosk in group (communicating over a LAN) from which to download the requested video file.

In step 2507, the video network stores the user request in a request index within the designated kiosk, or within a request index within the designated LAN. An example of a request index 2430 is depicted in FIG. 24.

In step 2509, the user inserts a portable high-speed memory device into a high-speed port of a multi-port kiosk, or a video kiosk within a LAN.

In step 2511, the selected high-speed port within the video kiosk reads the unique device idea of the portable high-speed memory device.

In step 2513, the video kiosk searches its request index for a matching device ID to that of a portable high-speed memory device list of 2509. That video kiosk is part of a LAN, to kiosk searches the request index of the LAN for a matching device ID.

In step 2515, the video kiosk determines whether or not a matching device ID is stored within its request index, or within the request index of an associated LAN.

If, in step 2515, a matching device ID is found, then, in step 2517, the video kiosk identifies the video file requested in association with the device ID.

In step 2519, the video file is downloaded to the portable high-speed memory device.

By the above-described process of FIG. 25, it will be appreciated that the user does not need to access the keyboard of a video kiosk in order to receive a video file download. By ordering a video file over the Internet, the request can be stored within the request index 2430 of the video kiosk or a local area network. Video download can be achieved through simple insertion of a portable high-speed memory device into a high-speed port of the kiosk or LAN. To eliminate the need for individual monitors 107-A, 107-B for each high-speed port, embodiments are envisioned wherein status indicators, such as LEDs, can indicate the status of a video download. Examples of download statuses can include, but are not limited to, retrieving user request data, download in process, download completed, requested video not yet available, requested video is at another kiosk, and user request not found. A requested video may be in a different video kiosk because of user error, or because of limited storage space at the video kiosk originally designated in the user request. Because of the inconvenience and potential annoyance which might be associated with arriving at a kiosk, and learning that a requested video has been delivered to a different kiosk, embodiments are envisioned wherein such alternate kiosk download is accompanied by a text message, automated voice message, pager, or other user notification means. The user notification means will preferably be selected by the user, and stored within the video network system.

The Portable High-Speed Memory Device

In an embodiment, the functionality of the portable high-speed memory device may be incorporated into a common physical structure with a cellular telephone, a PDA (Pocket Digital Assistant), portable computing device, portable music players such as the iPod, portable cameras, or combinations thereof. By this "combined functionality" embodiment, the usefulness of the video network described herein is greatly enhanced. For example, it is unlikely that most users would carry a "single function" portable high-speed memory device on their person the majority of the time. As a consequence, if a user ordered a video file such as a feature-length movie from their office computer, the user could not typically download the video on the way home from work. Rather, the user would have to go home, pick up his or her portable high-speed memory device, and then walk or drive to a video kiosk. Most individuals, however own a portable computing device such as a cell phone or music player which they carry them most of the time. Through a multifunctional embodiment, however, a user in possession of an integrated device (such as a portable high-speed memory device integrated with a cell phone), would typically be able to stop at a video kiosk on the way home from work and download a movie. No additional trip home would be required in order to pick up a memory device, and no special planning would be required to bring the memory device to work that day.

According to an embodiment, a memory element within the portable high-speed memory device 131 is removable, thereby facilitating upgrades to higher density memories. In a similar manner, embodiments of the high-speed memory device 131 are envisioned having auxiliary memory ports for receiving additional memory modules, thereby allowing a user to flexibly upgrade the available memory within a portable high-speed memory device. The memory modules, and the auxiliary memory ports will preferably include high-speed electrical connectors as described or referenced herein.

High Speed Download Technology

Although microprocessor speeds have continued to increase, the advantages of these increased speeds have not always been realized. Microprocessors are often coupled with adjacent elements which transmits signals originating from the microprocessor. The physical coupling of distinct electrical complements cannot normally be accomplished to the exacting size and scale found within a microprocessor. These "macro connections" and a signal paths extending outward from a microprocessor often degrade signal quality by a variety of problems including parasitic capacitance, signal reflections and a signal skew.

Figure 33A:
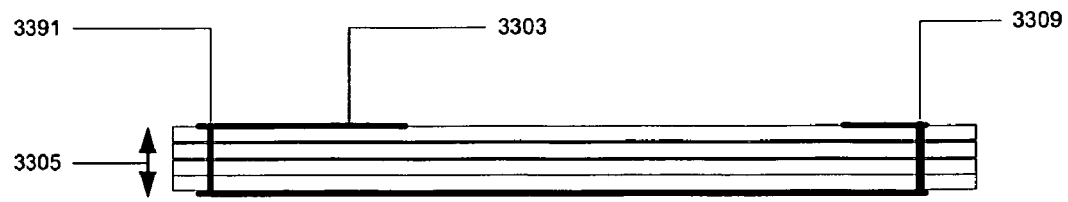
FIG. 33-A depicts a side elevational view of a prior art embodiment of a multi-layer electronic device.
Figure 33B:
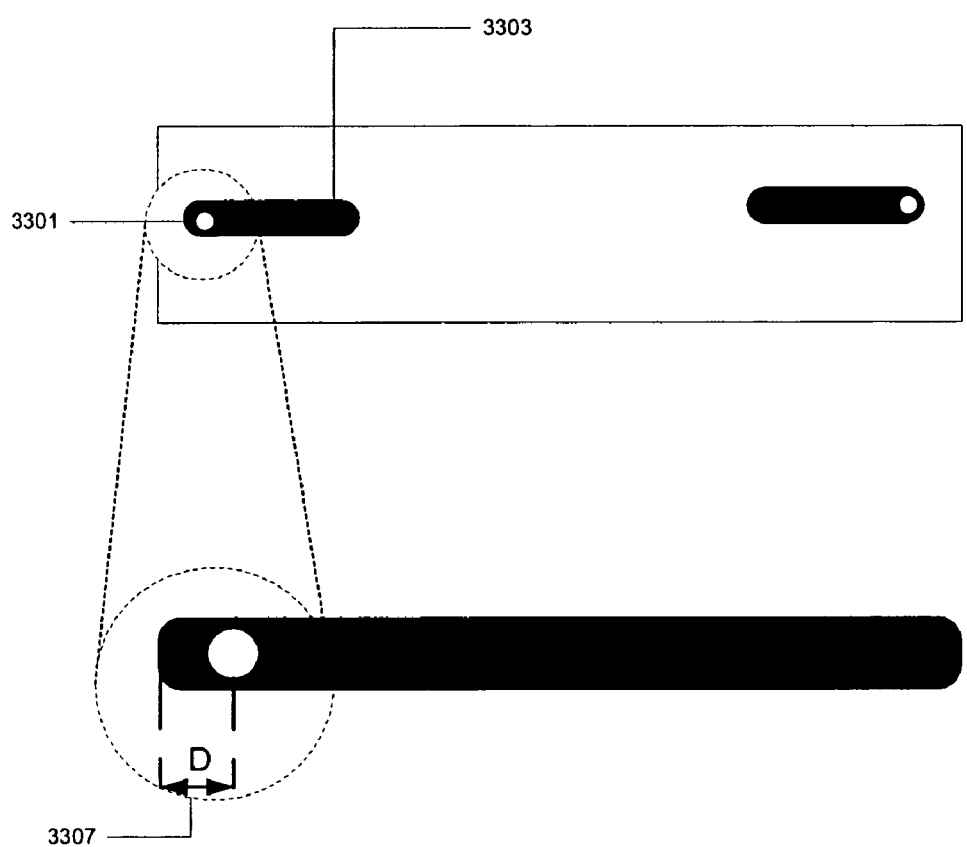

Signal reflections or "signal bounce" are often induced at the juncture of signal trace lines and conductive vias. FIGS. 33A through 33C depict a printed circuit board including multiple laminate layers 3305, and a copper signal trace 3303 coupled between conductive via 3309 and conductive via 3301, thereby establishing a signal path between these two conductive vias. Due to limitations in current manufacturing techniques, the point at which a signal trace 3303 coupled with a conductive via 3301 often results in a conductive stub 3307 extended beyond the signal path. In signal transmission, an open circuit will result in signal reflection or signal bounce. Although the conductive via 3301 affords a path for signal conductivity, stub 3307 nevertheless acts as a separate signal Path terminating in an open circuit, thereby inducing signal reflection. At lower frequencies, of up to 100 megahertz, the signal degradation induced by these reflections is usually modest. However, as transmission frequencies increase, signal degradation and interference becomes progressively greater as a result of these the reflections. For a high-speed video download of a feature-length, and particularly a high-definition feature-length film to gain wide consumer acceptance, however, download speeds will preferably be in excess of 3 gigabits per second, more preferably in excess of 5 gigabits per second, even more preferably in excess of 8 gigabits per second, and even more preferably in excess of gigabits per second. In an embodiment, download speeds in excess of 15 gigabits per second and particularly in excess of 20 gigabytes per second will be utilized to significantly reduce the amount of time the consumer must wait at a video kiosk to receive a video download. However, if the video downloads were attempted at these speeds in conjunction with the prior art technology as illustrated in FIG. 33, signal reflections emanating from stub D would render the entire download process unworkable.

A second and related problem inherent in prior art technology is that of signal skew. When signals generated simultaneously within a microprocessor are transmitted down separate signal traces of a printed circuit board, signal traces having different lengths will result in a time differential in the time the respective signals reach their destination points. As the clock speeds of microprocessors increase, however, the time between successive signals decreases, and the physical distance between successive signals on a single path also decreases. Slight differences of, perhaps, a millimeter, have little impact at slower clock speeds. However, as clock speeds increase, signal skew as potential of resulting in simultaneous reception along separate signal paths of digital signals originating during different clock cycles. Digital signaling becomes fundamentally unworkable at this point.

Figure 34:
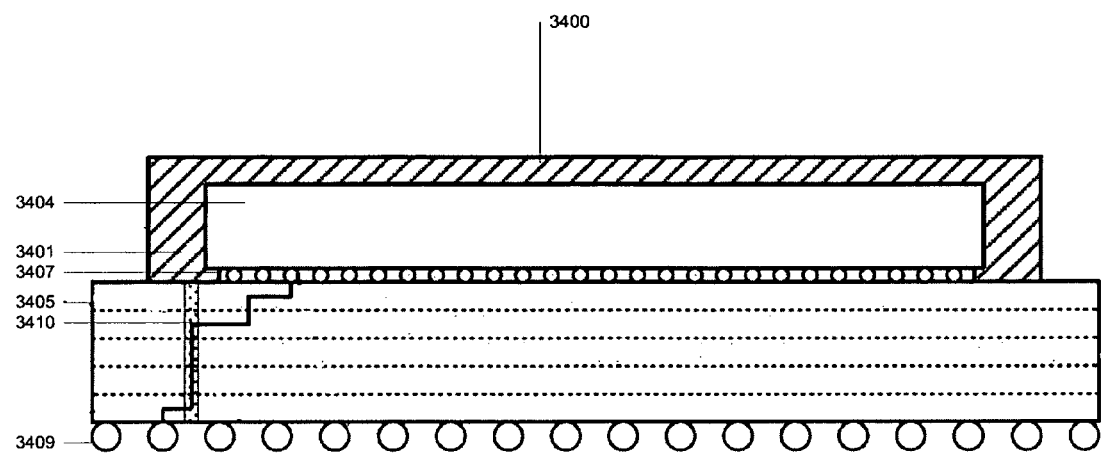
FIG. 34 is an enlarged view of the reflective stub shown in FIG. 33-B.

To keep pace with the demand for ever faster signaling rates, integrated circuit (IC) packaging has evolved from relatively band-limited technologies such as wire-bonded packages to the prior-art flip-chip package 3400 illustrated in FIG. 34. The flip-chip package 3400 includes an integrated circuit die 3403 mounted pad-side down on a multi-layer substrate 3405 and enclosed within a non-conductive housing 3401. Signal routing structures 3410 are disposed within the multi-layer substrate 3405 to redistribute signals from the relatively dense arrangement of die pads 3407 to a more dispersed ball grid array (BGA) 3409 on the underside of the package. The individual contact balls of the BGA 3409 may then be soldered to counterpart landings on a printed circuit board.

While generally providing better performance than wire-bonded packages, the flip-chip package 3400 presents a number challenges to system designers as signaling rates progress deeper into the gigahertz range. For example, the number of layers needed in substrate 3405 for signal redistribution has steadily increased in response to increased numbers of die pads 3407, making the flip-chip package 3400 more complex and costly. Also, through-hole vias 3410 (i.e., vias that extend all the way through the multi-layer substrate) are often used to route signals through the substrate. Unfortunately, unused portions of the vias (e.g., region 3412) constitute stubs that add parasitic capacitance and produce signal reflections, both of which degrade signal quality, as illustrated in conjunction with FIGS. 33A through 33C. Although back-drilling and other techniques may be used to reduce the stub portions of the vias, such efforts further increase manufacturing costs and may not be suitable or possible for some package substrate constructions.

Another challenge presented by signal redistribution within the multi-layer substrate 3405 is that differences in routing distances tend to introduce timing skew between simultaneously transmitted signals. That is, signals output simultaneously from the die 3403 arrive at the BGA contacts 3409 at different times, reducing the collective data-valid interval of the signals. In many systems, a single control signal, such as a clock or strobe, is used within a signal receiving device to trigger sampling of multiple simultaneously transmitted signals. Consequently, compression of the collective data-valid interval due to signal skew ultimately limits the maximum signaling rate that can be achieved in such systems without violating receiver setup or hold-time constraints. To avoid such skew-related problems, intricate routing schemes are often employed within the multi-layer substrate 3405 to equalize the die-to-contact path lengths, further increasing the complexity and cost of the integrated circuit package 3400.

Figure 35:
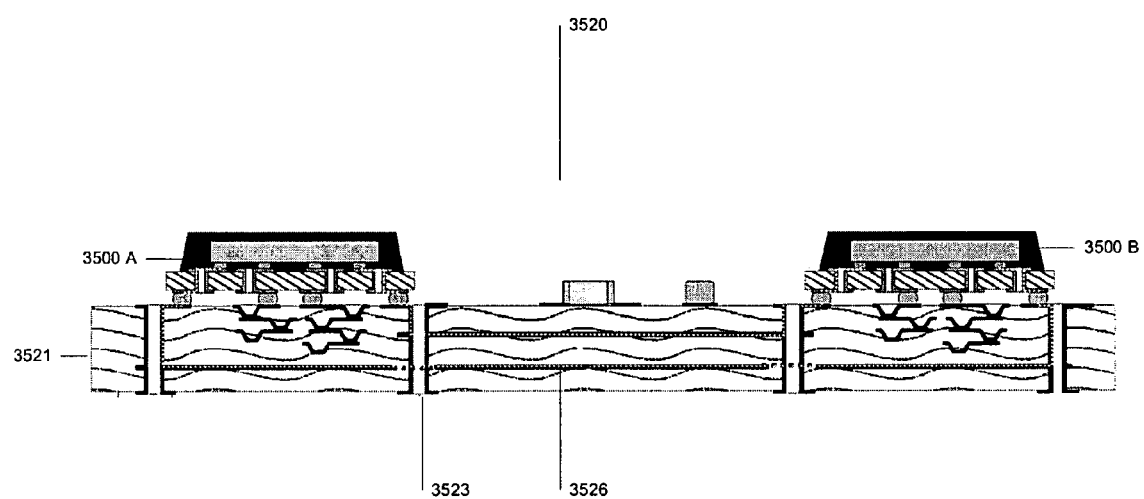
FIG. 35 depicts a side elevation view of a prior art embodiment of a conductive trace coupled to a conductive via in a layered electrical device.

FIG. 35 illustrates a prior art signaling system 3520 that includes two flip-chip packages 3500A and 3500B coupled to one another via signal routing structures disposed within a multi-layer printed circuit board (PCB) 3521. From a high-speed signaling perspective, many of the problems resulting from signal redistribution in the integrated circuit packages 3400 also result from the multi-layer signal routing within the PCB 3521. For example, through-hole vias 3523 are often used to conduct signals between PCB layers, presenting stub capacitance and signal reflection problems. Also, the lengths of the signal paths routed between the integrated circuit packages 3300A and 3500B tend to be different due to different PCB ingress and egress points and different PCB submergence depths of the various traces 3526, thereby introducing timing skew. As with the integrated circuit packages 3400 themselves, a number of techniques may be used to reduce via stubs, and routing strategies may be used to equalize path lengths, but these solutions tend to increase system complexity and cost. These, and other limiting factors inherent in present technological applications are addressed by the United States Patents and Patent Applications incorporated herein by reference at the beginning of this application. These high speed technologies may be used to form high speed connections and high speed signaling paths for use in conjunction with the portable high-speed memory device 131 of FIGS. 1 and 3, the high speed port 113 of FIGS. 1 and 24, and the high speed port 313 of FIG. 3. The stair step technology presented in conjunction with FIGS. 39A-42 and discussed earlier also eliminates connection stubs, and is useful in reducing or eliminating signal skew, signal bounce, or introducing unwanted impedance into a signal path.

Multiple Video Parameter Download

As discussed above, video files can be stored with selectable parameters, allowing a user to delete, "bleep out," or censor various scenes or dialogue, examples of which include nudity, sexual situations, profanity, explicit sexual dialogue, and violence. In an embodiment, selectable parameters are flexibly defined, rather than limited to a fixed set of definitions. For example, a documentary on the Holocaust may include scenes which, though not technically "violent," may be profoundly troubling or disturbing. Such scenes could be time stamped by a content provider according to the same standards that other controllable parameters would be time stamped. However, intuitive terms could be assigned by the content provider to such scenes, e.g., "Graphic Holocaust Scenes." By including fixed terms, such as "nudity" or "profanity," as well as allowing for flexible terminology by content providers, greater system utility can be achieved for both content providers and system users. Controllable parameters will be divided into at least two general categories, categories using audio timestamps, and categories using video timestamps. Circumstances are envisioned wherein alternative parameter designations may be desirable. For example, parents may desire to view in an un-edited version of the movie, while censoring certain portions for their children's viewing. In an embodiment, alternative parameters can be selected for download in conjunction with a video file, with user selection of the alternative parameters required prior to viewing.

Within FIG. 26, the movie title "Drug Deal Gone Bad" has been selected by the user, and is displayed on the video screen 107 of a video kiosk 105. A first set of selectable parameters 2607 listed includes profanity, violence, nudity, sexual situations, and "other." As discussed above, specific name for the selectable parameter designated as "other" may be chosen by a content provider, and need not be limited to the generic term "other." A row of boxes 2603 designated as "edited version" maybe check marked by a "mouse-click" or some other action via user interface. A row of boxes 2605 designated "an edited version" may also be check marked by a mouse-click or equivalent action. A user may select both edited and unedited versions at the time of download from a video kiosk, thereby allowing the user to play either version as desired. If edited and unedited versions are both selected, a fillable text box 2609, the user may enter the password necessary to view the unedited version. When a user attempts to view this video any subsequent time, the video player 305 or related software would request a password for viewing the unedited version. The viewer would have the option of entering the password in a text box, or selecting the option "View edited version," and continue with the viewing of the video file. By this or equivalent embodiments, parents can enjoy the unedited versions of movies, while ensuring that their children would not have access to objectionable material.

The embodiments are also envisioned wherein multiple user PINs (personal identification numbers) and/or passwords are stored in a single portable high-speed memory device 131. A parent can assign a password to each of the children, thereby allowing them to download video files to the portable high-speed memory device. The portable memory device 131 could then be programmed in a manner similar to be embodiment of FIG. 26, designating which user passwords may download unedited video files, and which user passwords may download only edited video files.

In the example of FIG. 26, notation appears indicating that an edited version censoring "violence" is not available, and a large default checkmark appears in the box for the unedited version, alerting the viewer to the fact that the movie will contain graphic violence. The lack of an unedited version regarding violence may be due to a variety of reasons. For example, the content provider may have believed that the costs involved in producing a version edited for violence in compliance with the digital standards set forth for the system would not be retrieved through increased rentals or sales. Alternatively, the content provider may have regarded the violent scenes as essential to the movie, and therefore, not available in an edited format.

Still referring to FIG. 26, five different languages are available for the audio portion of the movie, but no subtitles available in any language. Parameter selection and need not be exclusive. As noted, parents may choose to view an unedited version of a movie, while allowing their children to watch an edited version. Timestamps, control commands, and other appropriate digital markers may be downloaded during the video selection and download process according to any categories selected by the user. According to an embodiment, a higher fee may be assessed for downloading multiple languages. Another controllable parameter illustrated in FIG. 26 is the option to store the video file on the hard drive. A notice is posted directly below this a selectable parameter, notifying a user that an additional $1.75 will be charged for downloading a version that may be stored on a permanent storage member such as memory device 335 within the video player 305. Embodiments are envisioned for permanent storage locations may include a hard drive of a user's computer, or other user storage devices unrelated to the video player 305.

FIG. 27 illustrates an example of a download history stored within the portable high-speed memory device 131. The history shows that Dad has downloaded a sequence of video files, from "Dirty Harry" on Jul. 1, 2008 to "The Guns of Navarone" on Apr. 15, 2010. The letter designation (M) indicates a feature-length movie. The download history shows that mom has downloaded a sequence of video files from "Terms of Endearment" on Jul. 5, 2008 to "Steel Magnolias" on Apr. 17, 2010. Emily has downloaded a sequence of movies from "Legally Blonde" at Sep. 9, 2008 to "Legally Blonde 2" on Dec. 10, 2010. The download history shows that Jeff downloaded the movie "Dogs of War" on Aug. 22, 2008, the video game "Space Invaders 2" on Jan. 31, 2009, and the video game "Dungeons and Dragons" on Mar. 4, 2010. On Apr. 17, 2010, Jeff downloaded a "Triple X" movie. Because the download history is recorded within the portable high-speed memory device 131, Jeff's parents are able to discover his viewing of inappropriate movies, and take appropriate action. The download history of FIG. 27 includes only the ID of the party performing a download, the nature of the video file (i.e., movie, game, etc.) the title or name of the game or movie, and the date of the download. These categories are offered as examples, and are not intended to limit a download history. Other categories could be included in download history, including by way of example, but not limited to the cost of each download, the credit card on which each charge was applied, whether a video file was downloaded for permanent storage or one-time viewing, the time required for the video download to complete, the user IDs of anyone who viewed the video file by direct play from the digital file within the portable high-speed memory device 131, etc.

Gaming

The portable high-speed memory device 131, and video player 305, may store and/or play video files such as feature-length films in standard and high-definition, television shows or TV commercials, as well as video games. Selectable parameters such as those exhibited in FIG. 26 may be adapted to video games. As noted in FIG. 26, the category "other" could be filled by any term a content provider thought was appropriate for a controllable parameter. In a similar manner, controllable parameters many tailored for individual video games. Because the executable options associated with the video game are more complex than simply skipping over a nude scene in a movie, standards may have to be occasionally upgraded to accommodate the options and parameters of the video games. For example, games may be configured to operate at a certain speed, accommodate single or multiple players, allow for members to be on opposing teams, or confront the player with various challenges or "levels of play." In an embodiment, a parameter selection module is stored within the firmware of the portable high-speed video device 131, thereby facilitating device upgrades through firmware updates. Upgrades may also be done at the application level, or hardware level. Considered as an example, a video game comprising the parameters described above. In addition to these parameters, however, a video game developer has developed a game which allows three or more teams compete simultaneously. If this possibility had not been envisioned, or facilitated by the existing parameter selection module, a revised parameter section module would have to be developed and downloaded into the portable high-speed memory device 131. These upgrades will be able to address industry advances within cinema, computer gaming, and other video industries. Embodiments are also envisioned, where a parameter selection module is embedded in a video player 305, and/or downloaded to a personal computer 321. Parameter control modules can variously be software applications, firmware, or even hardware and fixed circuitry members.

Interconnected Blogosphere

Figure 28:
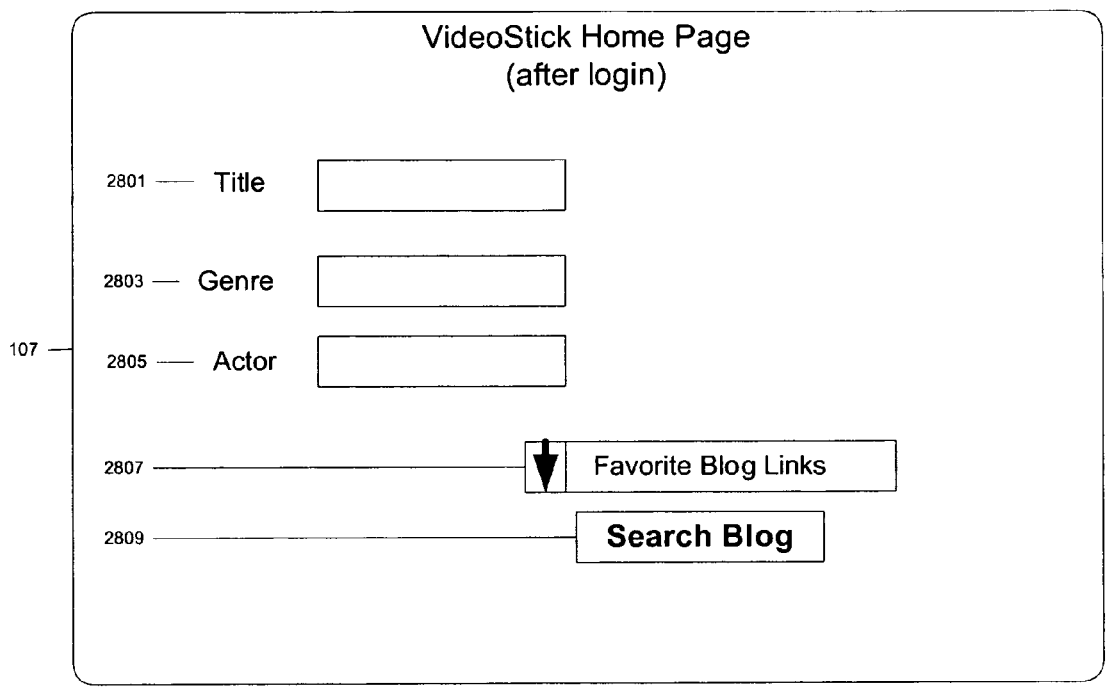
Figure 29:
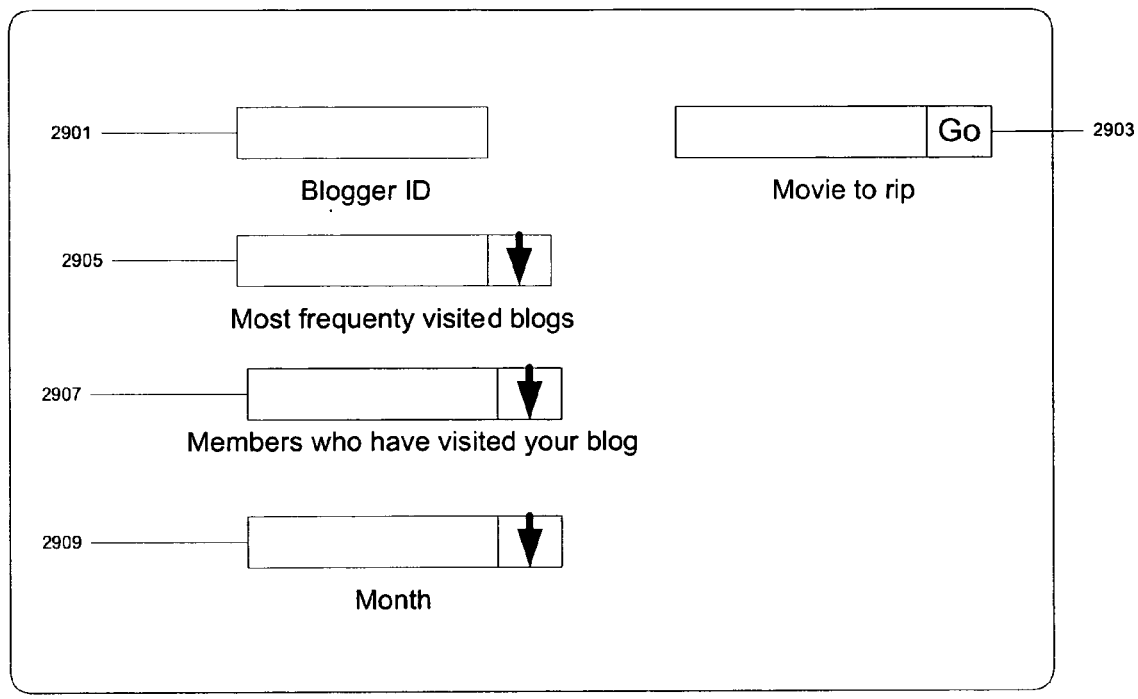
FIG. 29 is an embodiment of the video screen display of a blogosphere portal accessible through the video network of FIG. 1.
Figure 30:
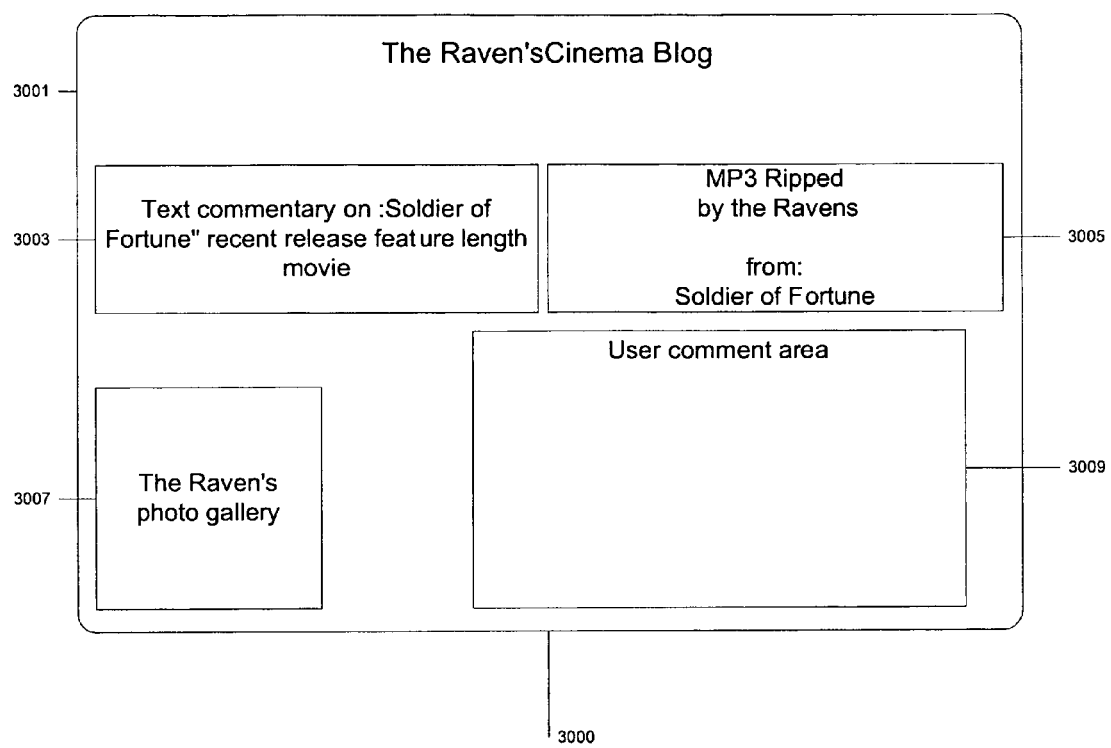
FIG. 30 depicts a video screen display of the homepage of a blogger posted on the video network of FIG. 1.

FIGS. 28-30 illustrate an embodiment of a "blogosphere" that can be incorporated within the video network 101 described herein. FIG. 28 illustrates the contents of a video screen 107 immediately after a user has logged in. The contents of the screen are offered only as an illustration of a URL site after login. The URL site depicted in FIG. 28 includes search fields for searching for video files. Fillable text box 2801 allows a user to keystroke the title of a feature-length movie, and the approximate titles of sporting events, political speeches, etc. Fillable text box 2003 as a pull-down tab 2803 that allows a user to search for a feature-length film, athletic event, political speech, TV serial, TV commercial etc. by genre. Fillable text box 2805 includes a pull-down tab which allows a user to search for a performer such as an actor, actress, athlete, film director, coach or political figure featured in the requested video file. Embodiments of elements 2001, 2003, and 2005 were also described in conjunction with FIG. 7.

The video screen 107 of FIG. 28 also includes links, or other Internet devices by which a user can search for "blogs" on the video network. Element 2807 depicts a pull-down menu 2807 including links to the favorite blog sites of the user. The pulldown list 2807 of FIG. 28 may be limited to a predetermined number of favorite blog links, or maybe open-ended in the number of links in may contain. The user may navigate, via Internet connection, to a selected blog by "clicking" on one of the links in the pulldown list.

The search field 2809 depicts an alternative means by which a user can search for other user blogs on the video network entering the "network name" or "blogger ID" of a blog link the user desires to visit. In an embodiment, only intra-network blogs may be searched by Internet search elements 2807 and 2809, thereby allowing the video network to exercise a measure of control over the blogs which are easily accessible to the video network. Because it is understood that sophisticated computer users will almost always find a way of circumventing network controls, and posting pornographic or otherwise objectionable material on intra-network blogs, according to an embodiment, blog searches may only be conducted via personal computer, and not at video kiosks. By this limitation, the video network can further control the content of network video screens publicly displayed at video kiosks 105.

FIG. 29 depicts an example of video screen 107 that includes pull-down menu 2905 for displaying the most frequently visited blog sites on the video network, pull-down menu 2907 for displaying the blogger IDs of network members who have visited the user's blog, and a date field 2909 which allows the user to narrow the members listed in field 2907 to a particular month. (A blogger is a member of the video network who has prepared a portal, such as an HTML page, that is accessible to other members of the video network 101.) In addition to narrowing searches by timeframe, as is specifically illustrated in FIG. 29, embodiments are envisioned for narrowing searches by other categories, such as film genre (science fiction, "Western", etc.) film director "Stanley Kubrick, Woody Allen, etc.), blogger personality (analytical, sarcastic, funny, politically incorrect, etc.) A user may define themselves according to these various categories by a biographical sketch that is filled out and submitted in conjunction with the user's blog. Blogs may be integrated with e-mail, text messaging, or other communication means, including intra-network communication means by which individuals having similar interests may meet. For example, a user could effectively ask "who has visited my own blog within the last month" and receive an answer to that question by accessing pull-down tabs 2907 and 2909.

Text box 2913 allows a user to enter the name of a video file such as a feature-length movie or sporting event, from which the user would like to "rip" a scene, or portions of multiple scenes, for display on the user's blog. "Ripping" is a term commonly associated with copying video or audio files, typically in a compressed form. Network limitations (as well as limitations by specific content providers) could determine the maximum number of seconds a feature-length film, sporting event, or other video file that may be "ripped" for display on a user's blog.

FIG. 30 depicts an example of a blog posted on the video network. The banner 3001 identifies it as the blog of a network member going by the name of "The Raven". The extent to which an individual member may personally post, or privately disclose his actual name, or other personal information is determined by network policy. Policies may range from the very liberal, wherein the user is allowed to post his full name and contact information on the "homepage" 3000 of his cinema blog, the very strict, wherein the exchange of personal information is strictly prohibited, and blog postings are screened to enforce this policy. The upper right-hand portion 3005 of The Raven's homepage 3000 is a "link" activating an MP3 video ripped from various movies, sporting events, political speeches, and other video files on the video network. The upper left-hand portion 3003 of FIG. 30 includes a text commentary by The Raven, discussing the feature-length movie "Soldier of Fortune," or comments on multiple movies or subjects. The lower left-hand section 3007 of FIG. 30 includes a JPEG photograph of The Raven. The JPEG photograph may also act as a link, which, when clicked-on by a mouse, stylus, or other user interface device, may access other postings by The Raven such as a photo gallery or personal contact information, or may form a navigational link to another URL site. Fields, 3003, 3005, and 3007, are "read only". That is to say, a network member viewing The Raven's blog may view the text commentary 3003, photograph 3007, or video "trailer" produced by The Raven. A visitor however, may not alter the contents of these three fields. In contrast, field 3009 is a "read/write" field, wherein network members 103 may post comments and/or pictures or videos, thereby interacting with The Raven's presentation and commentary.

The links, displays, executable programs, and other entities displayed or described in conjunction with FIG. 30 are offered only as an example of some of the web-based concepts that may be incorporated into a user's blog. These examples are not intended to limit the scope of the intra-network blogosphere described herein, and in the appended claims, which comprehend the full scope of web-based processes, programs, activities, and so forth. Embodiments of the blogosphere described herein, include "closed," "open," and "semi-open," architectures. A close architecture would prohibit users from posting links to URL addresses outside of the video network 101. A semi-open architecture would allow user's blogs to include links to URL addresses outside of the video network, but would not allow non-members (including members who have not signed in) to access the intra-network blogosphere. An open architecture would allow users to post blogs which include links to URL sites outside of the video network 101, and also allow nonmembers (including members who are not signed in) to access the video network, and/or the intra-network blogosphere. Nuances of these various architectures are also envisioned to ensure that the video network 101 and the intra-network blogosphere remain wholesome and fit for use by the general public, including minors. Various filters and screening devices could be incorporated to this end.

Figure 31:
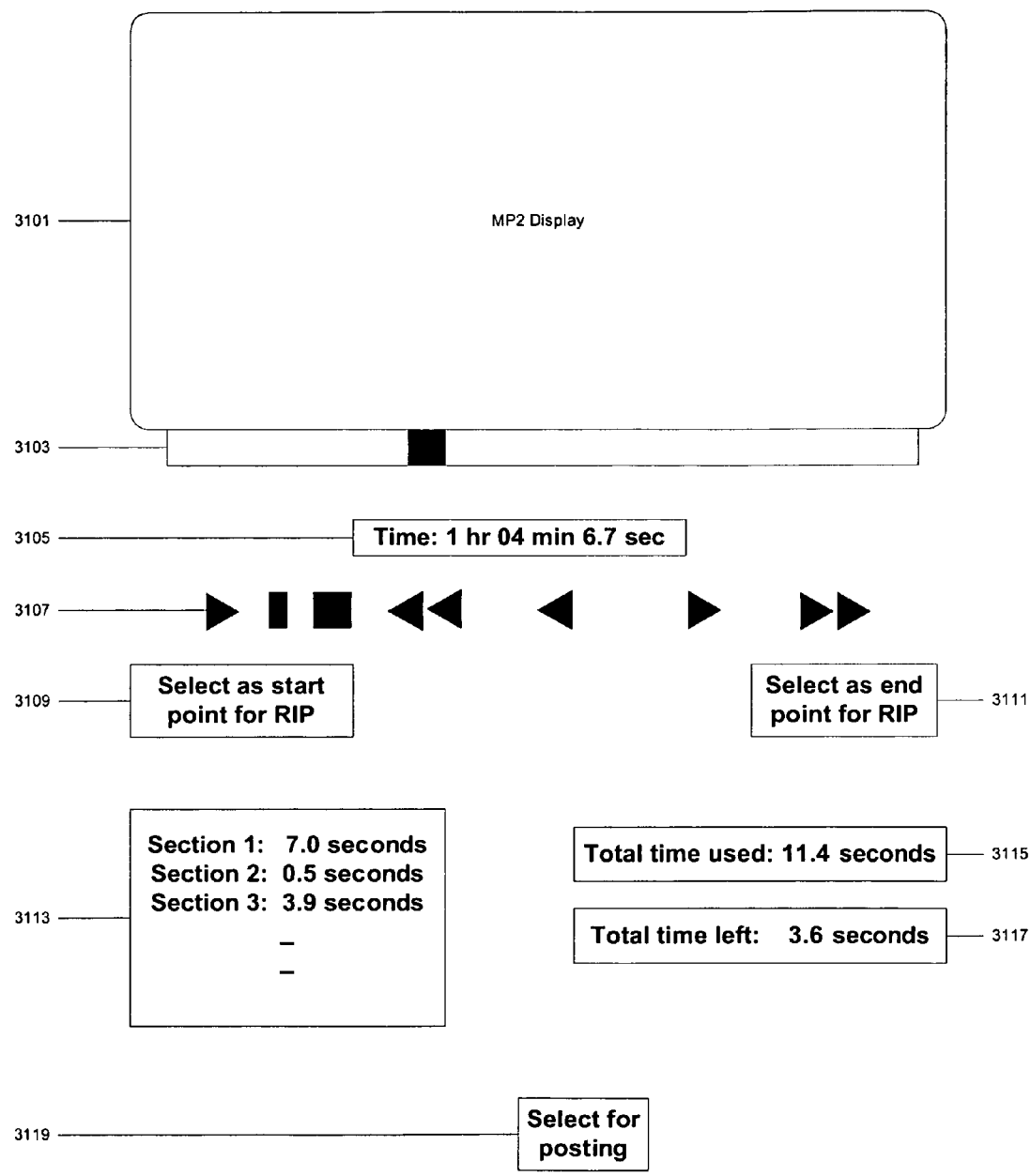
FIG. 31 depicts a video screen display of a "ripper" for piecing together segments of a video file to create a "trailer" or "video-short" for display on a user blog within the network of FIG. 1.

FIG. 31 illustrates an embodiment of a user interface screen 3100 allowing a user to access and operate a "ripper module" that may be utilized in conjunction with the video network 101 described herein. The user interface screen 3100 includes a "picture within a picture" 3101 on which the movie "Soldier of Fortune" is displayed in MPEG-1, MPEG-2, MPEG-4, or some other digitized format. Throughout this disclosure, references to MPEG ("Motion Picture Experts Group) or MP3" (the audio layer of MPEG-1, layer III) technologies are offered solely for example, and are not intended to limit embodiments of compressed or uncompressed video and audio file and display formats that may be used in conjunction with the embodiments described herein. The various user interface elements 3103, 3105, 3107, 3109, 3111 and 3019, described in greater detail below, may be activated by any known means, including cursor-and-mouse, or touch screen.

In an embodiment, DVD or high-definition files on feature-length movies stored on the video network are processed at the time they are added to the network, thereby forming a compressed version of the same video file. When a user prepares a "movie trailer" for display on a network blog, "rips" are taken from the compressed video format, thereby providing faster Internet access, file searching, and file transfers. Uncompressed video files, however, and even high definition video files may be displayed within field 3101.

A slide bar 3103 beneath field 3101 allows a user to fast-forward or fast reverse the video file to a particular section. Time-stamps within the video file are used to generate a time display 3105, corresponding to a particular scene of the video file visible within field 3101. Other virtual controls 3107, such as reverse, fast reverse, forward, fast-forward, stop, and pause, may also be included for controlling the video display within 3101. When a user "ripping" a video file has arrived at a particular scene he desires to rip, selectable interface button 3109 is engaged, thereby indicating the beginning point of a rip. The user may advance the video to an ending point of the rip by means of a slide bar 3103 or control buttons 3107. By activating "button" 3111 "select as ending point for rip," the user completes a rip which is added to listing 3113.

Elements 3113 of FIG. 31 depict the number of sections which the user has "ripped" from the selected movie. The duration of each section is also listed. Element 3117 displays the total time used by the combined ripped sections 3113. Element 3117 displays the total time remaining, according to network restrictions of how much time a user may "rip" from a video file for display on the user's intra-network blog. According to the example of FIG. 31, the user has been limited to a 15 second rip from the movie "Soldier of Fortune." Time limitations may be imposed by the network, by the content providers, or cooperatively by both. After a user has completed the construction of a "custom-trailer" (the video-short composed by the network member, as described by the table 3113), the user may engage button 3119, thereby posting the "custom-trailer" on his or her blog.

Content Providers may digitally identify "no copy zones" which are exempted from ripping through the video network and applications running thereon. For example, the NFL may determine that the touchdown pass from Joe Montana to Dwight Clark against the Dallas Cowboys in Jan. 10, 1982 is of historic significance and worthy of digital protection. As a consequence, the video file of that January $10^{th}$ game stored on the video network will include a no copy zone digitally bracketing the Joe Montana throw and Dwight Clark catch, thereby preserving the marketability of this video portion for the NFL.

Under Title 17 of the United States Code §103, "derivative works" which are lawfully produced are copyrighted when "fixed in any tangible medium of expression, now known or later developed, from which they can be perceived, reproduced, or otherwise communicated . . . " under the terms of Title 17 of the United States Code §102. The video network as described herein therefore provides gifted individuals a forum to showcase their talents to various content providers such as the NFL or Hollywood. By including a "favorites" list, or multiple "favorites" lists according to the athletic event or film genre, video network 101 described herein provides a showcase of talent to content producers seeking individuals gifted in film editing.

The elements described in FIGS. 28-31 are offered only by way of example. Other features which may be incorporated into the blogosphere of the video network 101 described herein may include, but are not limited to, intra-network e-mail between video members, a means for attaching data files to intra-network e-mailings, such as data files containing the custom trailers described in conjunction with FIG. 31, means for forwarding intra-network e-mailings to other network members, means for blocking intra-network e-mail from identified network members, means by which a first network member may block a second network member from writing on a read/write portion of the first network member's blog, means for a network member to create and post a blog on the network, and a means for attaching hyperlinks to specific text portions or data files, such as a list of hyperlinks to a user's 103 "favorite blogs" on the network 101.

Configurable Screens

Figure 32:
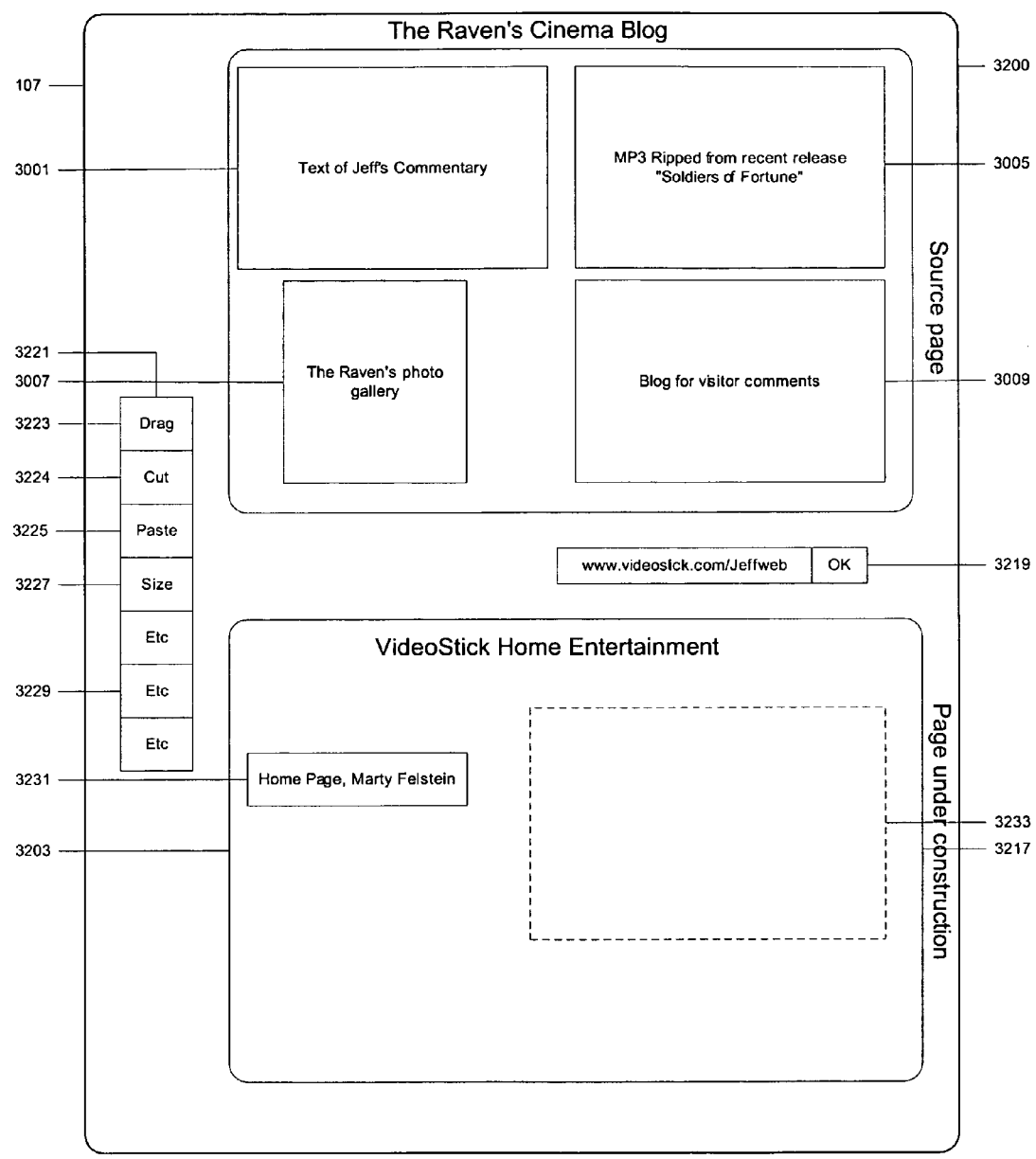
FIG. 32 depicts a video screen display of an application for constructing an HTML page comprising video portions collected from a variety of different HTML pages.

FIG. 32 depicts an application by which a user (a network member) can construct a "homepage" (or "interior" pages) according to his or her own preferences. The outer border of FIG. 32 represents the border of a video screen such as screens 107 and 323 of FIGS. 1 and 3. The "screens within a screen" 3201, 3203 are displayed in vertical orientation to each other. The orientation depicted in FIG. 32 is offered by way of example. Alternative embodiments include, but are not limited to, a horizontal orientation, and a "tiled" or overlapping orientation.

The upper "screen within a screen" 3201 at the top of FIG. 32 depicts the "source screen" from which various images and links may be drawn in the construction of the custom homepage 3203 depicted as the bottom "screen within a screen." According to the example in FIG. 32, user Marty Feldstein is currently using The Raven's homepage 3201 as the current source page.

The dark arrow 3211 near the center of the upper screen within a screen 3001 represents a mouse operated "click-and-drag" tool for selecting a portion of the display within the upper screen 3201, and for dragging that selected portion to the lower pages section 3203 under construction. The field bordered by dotted line 3233 represents the target area into which field 3005 (the ripped MP3 link of "Soldiers of Fortune") will be deposited. The banner "Homepage, Marty Feldstein" 3231 has already been placed on the lower page under construction 3203. Tool palette 3221 includes a variety of tools offered as examples of construction tools that might be used in constructing a user homepage. The tool palette includes, by way of example, a drag text-frame tool 3223 including a bold arrow-icon, a text cut tool 3224, and paste tool 3225, a "size" tool 3227, etc.

Beneath the source screen 3201 is URL address field 3219 with activation button. The user is able to navigate to different URL addresses for use as the "source" page 3201 by entering a URL address within this field 3217, and clicking on okay 3219 or hitting the "enter" key of a computer keyboard.

Safeguards are envisioned, whereby a user is prohibited from placing any video or audio file on a custom homepage or blog, if the video or audio file has not been ripped from within the video network. By this safeguard, the video network could prevent a user from posting racist, pornographic or otherwise offensive video and audio files.

In addition to, or in place of the homepage construction tools depicted in FIG. 32, embodiments are envisioned whereby a user could utilize existing website construction software within the context of the video network while remaining subject to the safeguards described above. This includes embedded modules of existing webpage construction applications. A user-fee could be charged for use of such an application in the construction of a user's webpage or blog win in the video network. This user-fee could be a flat fee, such as a specific cost for each page generated, or cost charged against the total number of minutes used in webpage construction. Alternatively, software producers seeking to gain market exposure could provide embedded webpage construction modules to the video network 101 for free, or even pay a fee to the video network in exchange for the right to embed such a Web construction module. By embedding a limited use module of a commercial webpage application within video network 101, a software producer could gain market recognition, and establish a user familiarity with of their product. The advertising value and market presence represented by this embodiment could be of great value to a software company. Safeguards could be programmed into the commercial webpage development application module to ensure that it could not be used outside of the environment of the video network 101, thereby preventing unauthorized use of a commercial web development application, and preserving the potential consumer base for sales of such an application.

Figure 38:
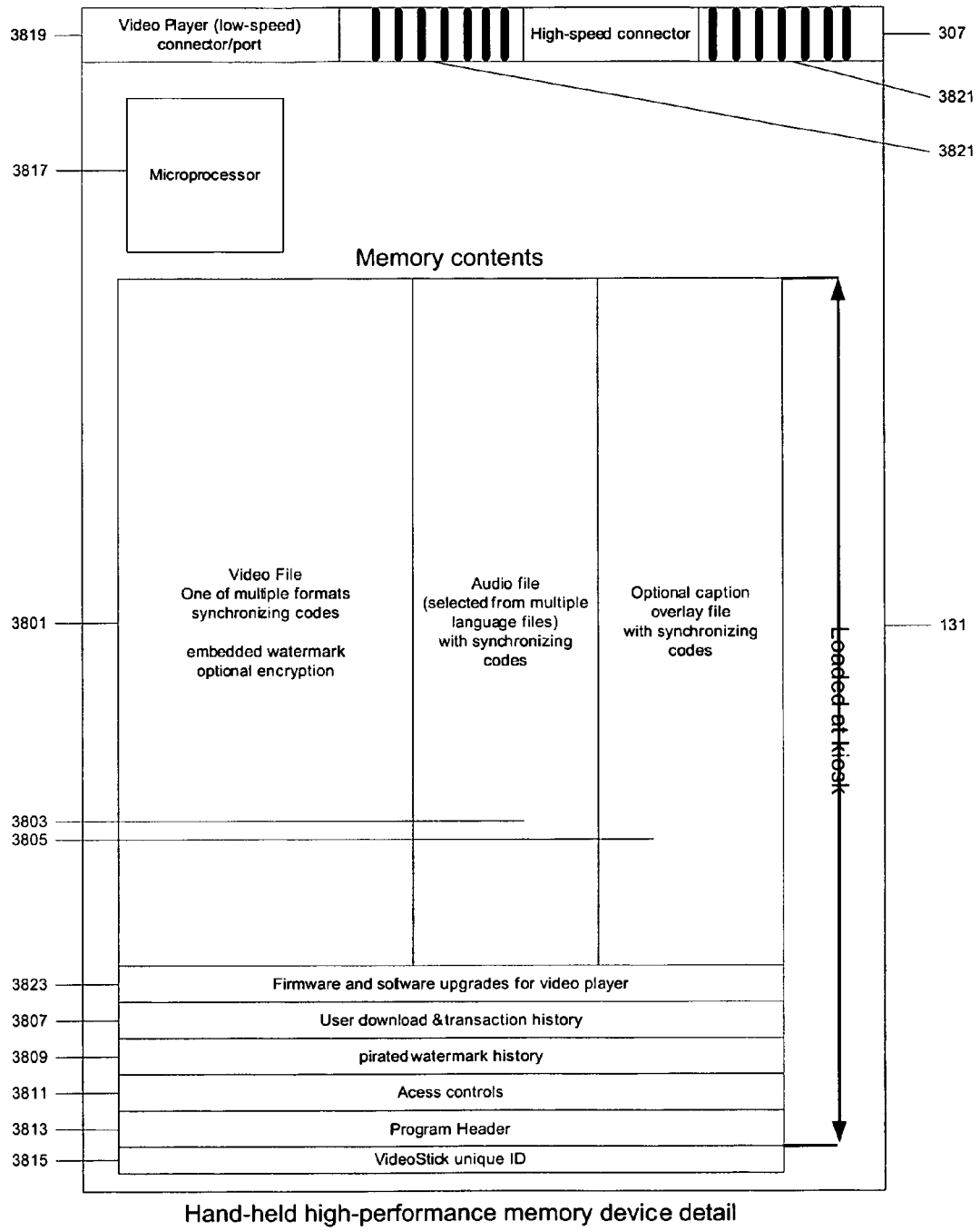
FIG. 38 depicts a portable memory device 131 of FIG. 1, including data stored therein.

FIG. 38 depicts an embodiment of a portable memory device 131 as shown in FIGS. 1 and 3. The portable memory device includes high-speed connectors 307 for interfacing with complimentary high-speed connectors 308 on a video player 305 or video display device 323 of a user, or a high speed download port of a video kiosk 105. The portable memory device of FIG. 38 also includes a low-speed port 3819. It will be appreciated that, in commercial applications, a high speed connection such as facilitated by high-speed connectors 307 will be necessary to allow consumers to download a video file in a public kiosk in a very short period. However, in viewing the video file, the necessary download rate from the hand-held high-speed memory device 131 to a video player 305 or a personal computer 321 may not be as critical as download speeds in a public kiosk. As long as a download speed exceeded the natural playing speed of a video file, a consumer could view a video file through a connection to low-speed port 3819. An embodiment of the high speed electrical contacts 3821 visible on the high-speed connector strip 307 are discussed in the patents and patent applications which are incorporated herein by reference. However, the high-speed connector is not limited to electrical connection. Other high-speed conductive interface is are envisioned, including, but not limited to, optical, infrared, and RF. Similarly, the low-speed connection port 3819 may be electrical, optical, infrared, RF, or any other known means of signal propagation.

An important consumer advantage inures from manufacturing video display devices which include a download port of high speed connectors 308 configured to couple with a hand held proprietary high speed memory device 131. As electronic devices multiply, an ever increasing number of "boxes" as stacked above, beneath, behind, or next to many TVs. These boxes include cable TV devices, digital memory and playback devices, DVD players, CD players, VHS and Betamax tape players, game boxes, AM/FM tuners and amplifiers, and even an occasional turntable for purists who prefer to listen to vinyl LP recordings. Many consumers cringe at the prospect of adding yet another "box" to the tangled web of electronics that sits atop their TV. In embodiments wherein a video display screen is equipped with a high speed port for receiving a high speed hand held memory device, a consumer may store encrypted video recordings on a computer or external "drive," and load a single digital video file (including related ancillary files, as would correspond to a feature length movie) onto the hand held proprietary high speed memory device. In this way, a consumer would have the option of viewing a cinematic movie distributed through methods or apparatuses described herein without adding yet another "box" astride their TV set.

A microprocessor 3817 processes data stored within the hand-held high-speed memory device 131. As discussed below, the various data storage areas include the necessary hardware, bus access, firmware, and application data necessary to utilize the data stored therein. Firmware and application data may be updatable as standards are upgraded, thereby upgrading the hand-held high-speed memory device 131. In an embodiment, firmware and application upgrades are automatically made when a user inserts their hand-held high-speed memory device into a video kiosk 105. In an alternative embodiment, if firmware and application upgrades are available, during kiosk insertion, the user is prompted by video or audio output in a kiosk, and asked if the user would like to upgrade specific firmware or application data at that time. In conjunction with the notice, the user is provided an estimated download time or costs for the upgrade. The user then has an option to select which upgrades they desire, to postpone, or to reject application and firmware upgrade.

Data storage area 3823 is configured to store firmware and/or application data for upgrading firmware and applications within a video player 305 or computer 321 of the user. A video or audio prompt from a kiosk may describe the nature of the available upgrades, and give a user an option of downloading or rejecting the upgrades. It will be appreciated that, if the user accepts application or firmware upgrades for a video player 305 computer 321 be stored in the hand-held high-speed memory device, when the hand-held high-speed memory device is coupled to the video player and/or the computer 321 of the user, such application and firmware upgrades may be automatically downloaded, or controlled by the user according to a prompt reminding the user of the upgrades available on the hand-held high-speed memory device.

Data storage area 3801 is designated for storing a video file in various formats, including DVD and high-definition, synchronizing codes, embedded watermarks, and encryption algorithms and data. Data storage area 3803 is configured to store audio files (including multiple languages linked to a single video file), various timestamps and synchronizing codes to synchronize audio data and video data stored in data storage area 3801. Data storage area 3805 is configured to store text captions linked to various video files, including text captions in multiple languages linked to the same video file. Data storage area 3807 provides storage area for user download and transaction history. Data storage area 3809 provide storage area for historical network data such as a general listing of pirated watermarks. Data storage area 3811 provide storage for access controls, including primary and secondary user IDs, wherein a primary user may designate access limits for secondary users.

Data storage area 3813 provides storage for program headers. Data storage area 3815 stores the unique device ID of the proprietary high speed memory device, thereby distinguishing and identifying each proprietary high speed memory device sold. The unique device ID may be embedded at the chip-level during fabrication, or programmed into a non-erasable digital medium. A device ID may include, but is not limited to revision data, assembly location, batch number, date of manufacture, and the retail "brand" identifying a name of a company marketing the proprietary high speed memory device.

The foregoing description has offered many specific details for the purpose of enabling one skilled in the art to make and use the invention. For example, is used throughout disclosure, the term "Internet" is not intended to limit applications to any known specific Internet protocol. Additionally, the term "Internet" is not intended to be limited to any specific transmission channel. Embodiments are envisioned where in greater or lesser portions of the operations described herein is performed via the Internet, are conducted on an intranet, local area network (LAN) wide area network (WAN), limited access communication paths such as a privately owed fiber-optic network, and combinations of these network types. Moreover, the term "Internet" includes, but does not limit the embodiments described herein to currently known transmission techniques such as electrically conductive paths, fiber optic channels, and wireless signal routing including but not limited to radio, microwave, line of sight laser transmissions. Rather, transmission formats which are currently undiscovered, or not currently used in Internet communications, are fully comprehended within the scope of the term "Internet." Similarly, the term "kiosk" is not limited to an island-type structure. Embodiments are envisioned wherein kiosks for distributing video files are constructed in a manner similar to an automatic teller machine (ATM) mounted within the wall of a financial institution. Accordingly, these and other specific details are intended to be enabling and descriptive, and are not intended to limit the scope of the appended claims.

What is claimed is:

1. An automated inventory management system for managing an inventory of digital multimedia files, the system comprising:
    a network with a plurality of digital storage units for storing digital multimedia files, including first and second digital storage units;
    a first plurality of digital multimedia files distributed among the plurality of digital storage units, including a first digital multimedia file stored in both first and second digital storage units;
    a first cache management index comprising i) a list of identifiers corresponding to a plurality of multimedia files stored within the first digital storage unit, ii) a plurality of status designators, each status designator designating a status of a corresponding digital multimedia file within the first digital storage unit, including a first and second unprotected status designator designating the status of corresponding first and second digital multimedia files, and a first time-sensitive protected status designator designating the status of a third digital multimedia file, iii) a first time stamp associated with the first time-sensitive protected status designator; and, a first cache management algorithm configured to a) update the status designator of the third digital multimedia file to an unprotected status designator when a clock time is greater than or equal to the first time stamp; and b) selectively purge unprotected digital multimedia files from the first digital storage unit.

2. The automated inventory management system of claim 1, wherein the first digital storage location is geographically separated from the second digital storage location by at least 10 kilometers.

3. The automated inventory management system of claim 1, wherein the first and second unprotected status designators comprise distinct first and second relative priority values, and wherein the cache management algorithm is configured to select for purging from among a plurality of files identified by relative priority values, a digital multimedia file having a lowest relative priority value.

4. The automated inventory management system of claim 1, the first cache management algorithm further configured to update the status designator of the third digital multimedia file to an unprotected status designator upon a download of the third multimedia file from the first digital storage unit to a portable digital memory device.

5. The automated inventory management system of claim 1, wherein the first cache management algorithm is further configured to evaluate an amount of available storage space within said first storage unit prior to a determination to selectively purge an unprotected digital multimedia file from the first digital storage unit.

6. The automated inventory management system of claim 1, wherein the first cache management algorithm is further configured to evaluate a volume of data scheduled for upload into the first storage unit prior to a determination to selectively purge unprotected digital multimedia files from the first digital storage unit.

7. The automated inventory management system of claim 4, wherein the portable digital memory device is associated with a predetermined digital ID stored in the first cache management index and corresponding to the third multimedia file.

8. The automated inventory management system of claim 1, wherein first cache management index is digitally stored within ten meters of the first storage unit.

9. The automated inventory management system of claim 1, further comprising a central server in communication with the plurality of digital storage units.

10. The automated inventory management system of claim 9, wherein the first cache management algorithm is configured to update a status designator of a multimedia file according to a command received from the central server.

11. The automated inventory management system of claim 9, wherein the first cache management algorithm is configured to digitally store a multimedia file in the first storage unit in response to a command from the central server.

12. The automated inventory management system of claim 9, wherein the first cache management algorithm is configured to erase a multimedia file from the first storage unit in response to a command a command from the central server.

13. The automated inventory management system of claim 9, wherein the central server further comprises a central cache management index, said central cache management index including a list of identifiers representing respective multimedia files stored within the network, the central cache management index further correlating each identifier to one or more digital storage units in which a corresponding multimedia file is stored.

14. The automated inventory management system of claim 13, wherein the central cache management index defines a minimal number of digital storage units in which the corresponding multimedia digital file is stored.

15. The automated inventory management system of claim 13, wherein the central cache management index defines a total number of digital storage units in which a copy of a digital file is stored at a particular moment in time.

16. The automated inventory management system of claim 13, wherein the central cache management index is further configured to designate at least one digital storage location in which the third multimedia file is stored with a protected status that is not time sensitive.

17. The automated inventory management system of claim 1, the first digital storage unit further including a fourth digital multimedia file identified by a fourth digital identifier and having a protected status that is not time sensitive.

18. The automated inventory management system of claim 1, wherein the first cache management index identifies digital multimedia files stored within the first digital storage unit, and wherein the second storage unit has a second cache management index identifying digital multimedia files stored within the second storage unit.

* * * * *